United States Patent [19]
Dwivedi et al.

[11] Patent Number: 5,620,791
[45] Date of Patent: Apr. 15, 1997

[54] BRAKE ROTORS AND METHODS FOR MAKING THE SAME

[75] Inventors: Ratnesh K. Dwivedi, Wilmington; John T. Burke, Hockessin, both of Del.

[73] Assignee: Lanxide Technology Company, LP, Newark, Del.

[21] Appl. No.: 370,122

[22] Filed: Jan. 9, 1995

Related U.S. Application Data

[63] Continuation of Ser. No. 127,655, Sep. 27, 1993, abandoned, which is a continuation-in-part of Ser. No. 122,038, Sep. 15, 1993, abandoned, which is a continuation-in-part of Ser. No. 866,781, Apr. 3, 1992, abandoned.

[51] Int. Cl.$^6$ .............................. B32B 5/16; F16D 69/00; F16D 13/60
[52] U.S. Cl. ................ 428/323; 188/251 R; 188/251 M; 188/218 XL; 192/107 M; 428/325; 428/329; 428/331
[58] Field of Search ...................... 428/323, 329, 428/331, 325, 614, 615, 627, 629; 188/251 R, 251 M, 218 XL; 192/107 M; 501/88, 89; 420/528, 548

[56] References Cited

U.S. PATENT DOCUMENTS

| | | | |
|---|---|---|---|
| 2,999,564 | 9/1961 | Frichette, Jr. | 188/251 M X |
| 3,364,976 | 1/1968 | Reding et al. | 164/63 |
| 3,547,180 | 12/1970 | Cochran et al. | 164/61 |
| 3,718,441 | 2/1973 | Landingham | 29/182.1 |
| 3,724,613 | 4/1973 | Bermingham | 188/218 XL |
| 3,791,493 | 2/1974 | Yamaguchi et al. | 428/614 |
| 3,915,699 | 10/1975 | Umehara et al. | 75/208 R |
| 3,970,136 | 7/1976 | Cannell et al. | 164/108 |
| 4,290,510 | 9/1981 | Warren | 188/218 |
| 4,341,840 | 7/1982 | Prewo | 428/408 |
| 4,345,675 | 8/1982 | Ritsema | 188/73.43 |
| 4,404,262 | 9/1983 | Watmough | 428/539.5 |
| 4,409,298 | 10/1983 | Albertson et al. | 428/614 |

(List continued on next page.)

FOREIGN PATENT DOCUMENTS

| | | |
|---|---|---|
| 0351237 | 10/1993 | European Pat. Off. . |
| 2700112 | 7/1978 | Germany .............. 188/251 M |
| 59-173234 | 10/1984 | Japan . |
| 5279770 | 10/1993 | Japan . |
| 2249558 | 5/1992 | United Kingdom . |
| 2257213 | 1/1993 | United Kingdom . |
| WO9117278 | 11/1991 | WIPO . |
| 9312359 | 6/1993 | WIPO . |

OTHER PUBLICATIONS

L. H. McCarty, "Metal Matrix Composite Cuts Race Car's Unsprung Weight," Design News, pp. 168–169, Oct. 1990, Cahners Publishing Company, Inc., Newton, MA.

R. Ostvik and W. Ruch, "Friction and Wear Properties of Aluminum Matrix Composites," Proceedings of The International Conference On Light Metals: Advanced Aluminium and Magnesium Alloys (Eds. T. Kahn and G. Effenberg), pp. 675–685, date and location of conference: Jun. 20–22, 1990, Amsterdam, The Netherlands, ASM Europe, Rue de L'Orme 19, 1040 Brussels, Belgium.

(List continued on next page.)

Primary Examiner—Hoa T. Le
Attorney, Agent, or Firm—Jeffrey R. Ramberg

[57] ABSTRACT

This invention relates to metal and ceramic matrix composite brake rotors comprising an interconnected matrix embedding at least one filler material. In the case of metal matrix composite materials, the at least one filler material comprises at least about 26% by volume of the brake rotor for most applications, and at least about 20% by volume for applications involving passenger cars and trucks. In a preferred embodiment of the present invention, the metal matrix composite brake rotor comprises an interconnected metal matrix containing at least about 28% by volume of a particulate filler material and more preferably at least about 30% by volume. Moreover, the composite rotors of the present invention exhibit a maximum operating temperature of at least about 900° F. and preferably at least about 950° F. and even more preferably at least about 975° F. and higher.

20 Claims, 15 Drawing Sheets

U.S. PATENT DOCUMENTS

| | | | |
|---|---|---|---|
| 4,473,103 | 9/1984 | Kenney et al. | 164/97 |
| 4,713,360 | 12/1987 | Newkirk et al. | 501/87 |
| 4,753,690 | 6/1988 | Wada et al. | 428/614 X |
| 4,759,995 | 7/1988 | Skibo et al. | 428/614 |
| 4,818,734 | 4/1989 | Kantner et al. | 501/128 |
| 4,828,008 | 5/1989 | White et al. | 164/66.1 |
| 4,851,375 | 7/1989 | Newkirk et al. | 501/88 |
| 4,862,945 | 9/1989 | Greanias et al. | 164/63 |
| 4,865,806 | 9/1989 | Skibo et al. | 420/129 |
| 4,871,008 | 10/1989 | Dwivedi et al. | 164/6 |
| 4,930,606 | 6/1990 | Sporzynski et al. | 188/218 XL |
| 4,935,055 | 6/1990 | Aghajanian et al. | 164/66.1 |
| 4,940,679 | 7/1990 | Claar et al. | 501/96 |
| 4,956,137 | 9/1990 | Dwivedi | 264/60 |
| 4,961,461 | 10/1990 | Klier et al. | 164/461 |
| 4,998,578 | 3/1991 | Dwivedi et al. | 164/6 |
| 5,000,247 | 3/1991 | Burke | 164/97 |
| 5,017,526 | 5/1991 | Newkirk et al. | 501/89 |
| 5,028,392 | 7/1991 | Lloyd et al. | 420/528 |
| 5,028,494 | 7/1991 | Tsujimura et al. | 428/614 |
| 5,040,588 | 8/1991 | Newkirk et al. | 164/97 |
| 5,042,561 | 8/1991 | Chandley | 164/63 |
| 5,141,819 | 8/1992 | Aghajanian et al. | 428/545 |
| 5,183,632 | 2/1993 | Kiuchi et al. | 419/48 |
| 5,188,164 | 2/1993 | Kantner et al. | 164/97 |
| 5,199,481 | 4/1993 | Corwin et al. | 164/98 |
| 5,261,511 | 11/1993 | Libsch et al. | 188/72.4 |
| 5,325,941 | 7/1994 | Farinacci et al. | 188/218 XL |
| 5,372,222 | 12/1994 | Rhee et al. | 188/218 XL |

OTHER PUBLICATIONS

R. Ostvik and S. Brusetuang, "*Some Results from Development of Al PMMC Materials for Tribological Application*," 9th Annual SAE [Society of Automotive Engineers, Warrandale, PA] Brake Colloquium and Engineering Display, date and location of conference: Oct. 13–16, 1991, New Orleans, Louisiana, USA (transcript of presentation provided by R. Ostvik, Senior Research Scientist, SINTEF, The Foundation for Scientific and Industrial Research of the Norwegian Institute of Technology, N–7034 Trondheim, Norway).

S. Kennerknecht, Cercast Group, "MCC Studies via the Investment Casting Process", The Materials Information Society, Montreal, Quebec, Canada, Sep. 17–29, 1990, pp. 87–100.

"Cast Aluminum–Matrix Composites for Automotive Applications", Pradeep Rohatgi, JOM Apr. 1991, pp. 10–15.

D. E. Hammond, "Castable Composites Target New Applications", Modern Casting, vol. 80, No. 9, pp. 27–30, Sep. 1990, American Foundrymen's Society, Inc., Des Plaines, IL.

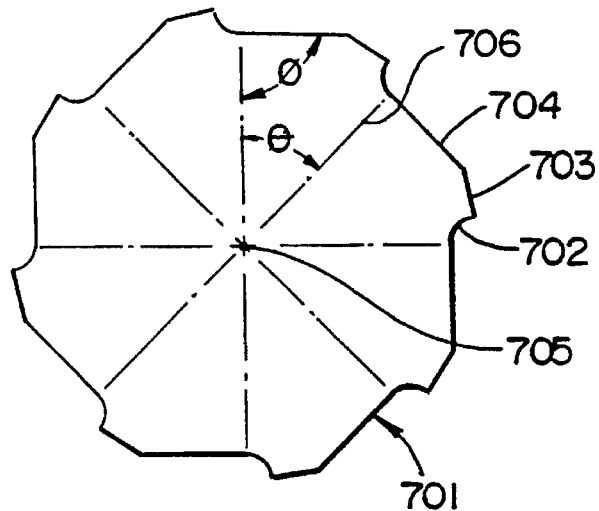
Fig. 7
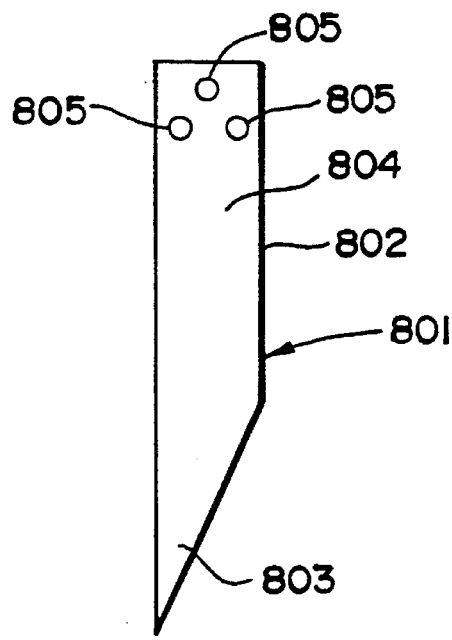
Fig. 8
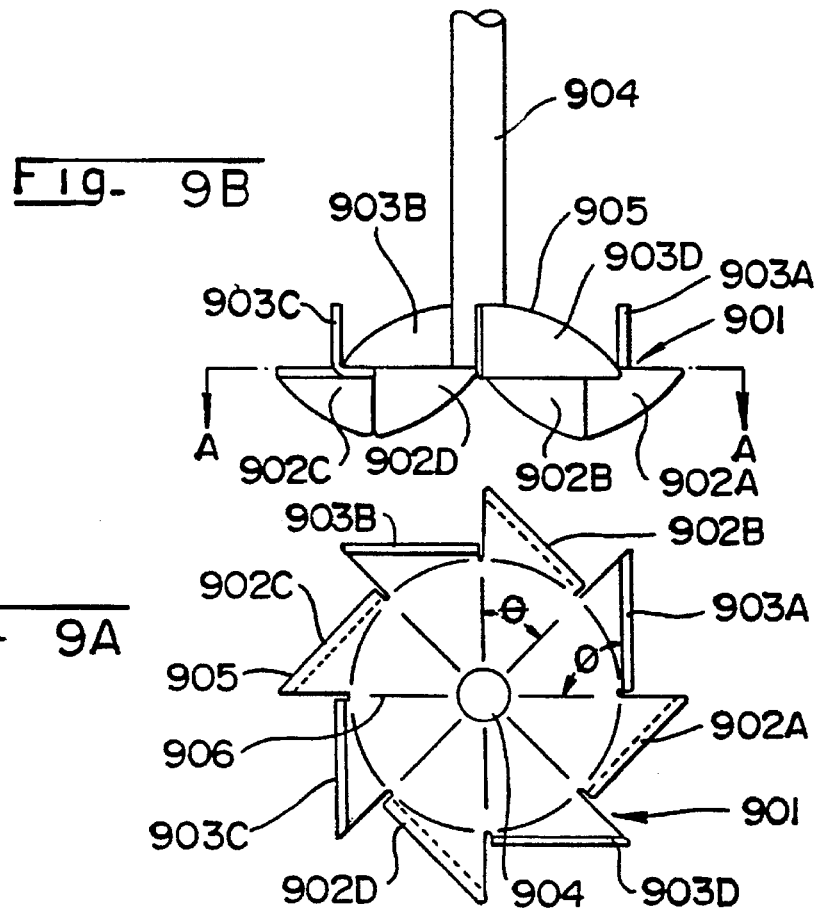
Fig. 9B
Fig. 9A

BRAKE ROTORS AND METHODS FOR MAKING THE SAME

CROSS-REFERENCE TO RELATED APPLICATIONS

This is a continuation of application(s) Ser. No. 08/127,655 filed on Sep. 27, 1993, abandoned which is a continuation-in-part of U.S. Ser. No. 08/122,038, filed on Sep. 15, 1993, and now abandoned, which was a continuation-in-part of U.S. Ser. No. 07/866,781, filed on Apr. 3, 1992, and now abandoned.

FIELD OF THE INVENTION

This invention relates to metal and ceramic matrix composite brake rotors comprising an interconnected matrix embedding at least one filler material. In the case of metal matrix composite materials, the at least one filler material comprises at least about 26% by volume of the brake rotor for most applications, and at least about 20% by volume for applications involving passenger cars and trucks. In a preferred embodiment of the present invention, the metal matrix composite brake rotor comprises an interconnected metal matrix containing at least about 28% by volume of a particulate filler material and more preferably at least about 30% by volume. Moreover, the composite rotors of the present invention exhibit a maximum operating temperature of at least about 900° F. (482° C.) and preferably at least about 950° F. (510° C.) and even more preferably at least about 975° F. (524° C.) and higher.

BACKGROUND OF THE INVENTION

Recent efforts to improve the fuel economy and emissions levels of air and ground vehicles have created a need for new materials which can provide weight savings to the vehicle without sacrificing performance levels. The immediate desirability of such materials is enhanced when the weight savings can be acheived by directly substituting the materials for current materials in existing designs. Moreover, the long-term desirability of such materials is maximized when the unique properties of the materials provide the possibility of improved designs and performance for vehicle components.

Traditionally, automotive brake rotors have been made from cast iron which provides good wear resistance and excellent high temperature properties. However, cast iron is dense relative to other candidate materials and, therefore, a cast iron brake rotor is relatively heavy. A heavy brake rotor is considered to be undesirable for at least three reasons. The first reason is that a heavy brake rotor contributes to the overall weight of the vehicle and thus reduces its fuel efficiency and correspondingly increases its emissions levels. The second reason (relevant mainly to passenger cars and trucks) is that a brake rotor is part of the "unsprung" weight of a vehicle (i.e., the weight of a vehicle that is below the springs) and, as such, contributes to the noise, vibration and harshness (commonly known in the automobile industry as "NVH") associated with the operation of the vehicle. When the unsprung weight of a vehicle is reduced, the NVH properties are usually improved. The third reason is that a brake rotor is a part of a vehicle that requires rotation during use and, accordingly, a heavier brake rotor requires the use of additional energy to increase and decrease the rotational speed of the rotor. In addition, the ability of a heavier brake rotor to cause undesirable vibration during rotation is greater than that associated with a lighter brake rotor.

The search for a material to replace cast iron in brake rotors has identified several possible candidates and their advantages and limitations. Each of these materials and its relevant advantages and limitations is discussed below.

Steel has been considered as a brake rotor material because of its excellent strength to weight properties. Although denser than cast iron, the superior strength of steel enables the use of smaller brake rotors which could result in weight savings. However, at the present time, the weight savings that have been obtained with steel brake rotors have been minimal.

Titanium has also been considered as a brake rotor material. The excellent strength to weight properties of titanium, as well as its high temperature properties, would enable titanium brake rotors to satisfy all of the requirements discussed above for a desirable brake rotor material. However, the high cost of titanium has prevented its widespread use as a brake rotor material in most non-aerospace applications.

Various polymeric materials have also been considered as brake rotor materials. These materials have the advantage of being relatively inexpensive but they have not been able to achieve the high temperature strength necessary to perform adequately as a brake rotor material.

Various ceramic materials have also been considered as brake rotor materials. Although many ceramic materials have demonstrated excellent wear resistance properties and the ability to withstand extremely high temperatures, the brittle nature of most ceramic materials has precluded the widespread use of ceramic brake rotors. Although the use of new processing techniques and the inclusion of reinforcing materials has created a new generation of ceramic and ceramic matrix composite materials with increased strength and reduced brittleness that perform well as brake rotor materials, the present production cost of such materials relative to other available materials has not been able to justify, for most ground vehicles, the weight savings that many of these materials can provide relative to cast iron. However, some of these new ceramic and ceramic matrix composite materials are being tested for use as brake rotor materials in heavier ground vehicles and/or in vehicles that demand increased performance from their brake rotors. In these situations, the higher cost of such materials is justified by their ability to provide increased performance.

Aluminum and magnesium alloys have also been considered as brake rotor materials. These metals show excellent strength to weight properties but their high temperature properties are not adequate for most brake rotor applications. Specifically, brake rotor tests using both magnesium and aluminum rotors have demonstrated that unacceptable amounts of surface scoring and rotor warpage occur after repeated braking cycles. These problems can be partially alleviated by incorporating various alloying elements into the magnesium and aluminum metals and/or heat treating the final brake rotors before use. However, the use of such additives and/or techniques raises the cost of the brake rotors and can cause the rotors to display undesirable side effects, such as increased brittleness and high temperature instability. Accordingly, the use of alloying additives and heat treatment techniques, either alone or in combination, has not been able to produce commercially viable brake rotors for most of the current brake rotor applications.

Recent attempts to reduce or eliminate the problems associated with using aluminum and magnesium as brake rotor materials have been directed toward the production of various types of aluminum and magnesium metal matrix composite materials. These materials generally consist of a metal matrix having embedded therein one or more reinforcing materials. Several techniques for forming metal matrix composites have been developed, some of which use pressure or a vacuum to push or draw a molten metal into a mass or preform of reinforcing material (hereinafter sometimes referred to as "filler material" or "filler"). Other techniques for forming metal matrix composite materials do not require the use of pressure or a vacuum to enable the molten metal to infiltrate the filler material. Such infiltration techniques are sometimes referred to as "spontaneous infiltration" techniques. Representative methods for forming metal matrix composites and/or casting metals can be found in the following Patents:

U.S. Pat. No. 5,028,392, which issued on Jul. 2, 1991, in the names of Lloyd et al., and entitled "Melt Process For the Production of Metal-Matrix Composite Materials With Enhanced Particle/Matrix Wetting";

U.S. Pat. No. 5,028,494, which issued on Jul. 2, 1991, in the names of Tsujimura et al., and entitled "Brake Disk Material For Railroad Vehicle";

U.S. Pat. No. 4,865,806, which issued on Sep. 12, 1989, in the names of Skibo et al., and entitled "Process For Preparation of Composite Materials Containing Nonmetallic Particles In A Metallic Matrix";

U.S. Pat. No. 4,759,995, which issued on Jul. 26, 1988, in the names of Skibo et al., and entitled "Process For Production of Metal Matrix Composites By Casting and Composite Therefrom";

U.S. Pat. No. 4,961,461, which issued on Oct. 9, 1990, in the names of Klier et al., and entitled "Method and Apparatus For Continuous Casting of Composites";

U.S. Pat. No. 4,473,103, which issued on Sep. 25, 1984, in the names of Kenney et al., and entitled "Continuous Production of Metal Alloy Composites";

U.S. Pat. No. 4,404,262, which issued on Sep. 13, 1983, in the name of Watmough, and entitled "Composite Metallic and Refractory Article and Method of Manufacturing the Article";

U.S. Pat. No. 3,970,136, which issued on Jul. 20, 1976, in the names of Cannell et al., and entitled "Method of Manufacturing Composite Materials";

U.S. Pat. No. 3,915,699, which issued on Oct. 28, 1975, in the names of Umehara et al., and entitled "Method For Producing Metal Dies or Molds Containing Cooling Channels By Sintering Powdered Metals";

U.S. Pat. No. 3,718,441, which issued on Feb. 27, 1973, in the name of Landingham, and entitled "Method For Forming Metal-Filled Ceramics of Near Theoretical Density";

U.S. Pat. No. 5,042,561, which issued on Aug. 27, 1991, in the name of Chandley and entitled "Apparatus and Process for Countergravity Casting of Metal With Air Exclusion";

U.S. Pat. No. 4,862,945, which issued on Sep. 5, 1989, in the names of Greanias et al. and entitled "Vacuum Countergravity Casting Apparatus and Method With Backflow Valve";

U.S. Pat. No. 3,547,180, which issued on Dec. 15, 1970, in the name of Cochran, and entitled "Production of Reinforced Composites"; and U.S. Pat. No. 3,364,976, which issued on Jan. 23, 1968, in the names of Reding et al., and entitled "Method of Casting Employing Self-Generated Vacuum".

The entire disclosures of all of the above-listed U.S. Patents are expressly incorporated herein by reference.

An example of a metal matrix composite brake rotor can be found in U.S. Pat. No. 5,028,494, which issued on Jul. 2, 1991, in the names of Tsujimura et al. (hereinafter referred to as the '494 Patent). In the '494 Patent, an aluminum composite material is produced as a brake disk material for railroad vehicles. In the method of the '494 Patent, reinforcement particles of alumina, silicon carbide, mica or the like are dispersed and mixed into a molten aluminum alloy. The reinforcement particles are 5 to 100 microns in diameter, and are dispersed uniformly in the alloy in an amount of 1 to 25% by weight (i.e., about 0.7% to about 18.4% by volume for alumina reinforcement material; about 0.8% to about 22.0% by volume for silicon carbide reinforcement material and about 1.0% to about 25.7% by volume for mica reinforcement material). It is stated in the '494 Patent that the brake disk material produced by the method disclosed in the '494 Patent is "light in weight and has high strength, good thermal conductivity and high wear resistance."

Thus, it can be deduced from the above information that metal matrix composite materials are currently being examined and tested for use as brake rotor materials. Moreover, it should be noted that the metal matrix composite brake rotors currently being produced for the railroad vehicle industry (as evidenced by the '494 Patent) use an aluminum metal matrix with a reinforcement material loading of up to about 26% by volume.

It has been unexpectedly discovered that brake rotors produced from metal matrix composites having reinforcement loadings of at least about 26% by volume, and preferably at least about 28% by volume, demonstrate unexpectedly enhanced performance in comparison to materials with lower reinforcement loadings (i.e., reinforcement loadings lower than about 26% by volume). Specifically, many metal matrix composite brake rotors produced with less than about 26% by volume of reinforcement material have been unable to meet industry performance requirements in certain tests known as "fade tests" (discussed in detail later herein) wherein the brake rotor is repeatedly tested under cyclical braking conditions (e.g., the brake rotor is mounted on a vehicle braking system or a dynamometer and used to brake a vehicle from about 60 mph to 0 mph several times and then from about 80 mph to 0 mph for a required number of times or until failure). Such brake rotors exhibit unacceptable surface scoring (i.e.,surface disfigurements, such as scratches or grooves) after the fade tests and, in some cases, portions of the brake rotors (e.g., the cooling fins and/or the rotor surface which contacts the brake pad) were deformed and appeared to have been melted during the tests.

In contrast, metal matrix composite brake rotors having reinforcement loadings greater than about 26% by volume, and preferably greater than about 28% by volume, have easily survived the above-described fade tests with acceptable levels of surface scoring and no significant deformation. Further, it has been determined that the ability of a rotor to withstand certain standard industry tests which simulate some of the most severe conditions experienced by automotive rotors can be discussed in terms of the maximum operating temperature ("MOT", discussed in detail later herein) which a rotor can withstand prior to experiencing at least some undesirable surface melting. The rotors of the present invention exhibit an MOT of at least about 900° F. (482° C.), and preferably at least about 950° F. (510° C.) and even more preferably at least about 975° F. (524° C.), and, even more preferably, about 1000° F. (538° C.) and higher.

Moreover, it has been discovered that certain ceramic matrix composites can also achieve the aforementioned MOT's and higher. Certain preferred techniques for forming ceramic matrix composites are discussed herein.

Accordingly, the increasing demand for higher fuel efficiency and reduced emissions has created a need for brake rotors on ground vehicles that are capable of satisfying current performance requirements while providing weight savings to the overall vehicle with respect to the brake rotors currently in use. The present invention provides brake rotors that can satisfy these needs.

DESCRIPTION OF COMMONLY OWNED PATENTS AND PATENT APPLICATIONS

A novel method of making a metal matrix composite material is disclosed in Commonly Owned and Copending U.S. patent application Ser. No. 08/078,146, filed Jun. 16, 1993, as a continuation of U.S. patent application Ser. No. 07/933,609, filed Aug. 21, 1992 (now abandoned), which is a continuation of U.S. patent application Ser. No. 07/725, 400, filed on Jul. 1, 1991, now abandoned, as a continuation of U.S. patent application Ser. No. 07/504,074, filed on Apr. 3, 1990, now abandoned, as a continuation of U.S. patent application Ser. No. 07/269,251, filed on Nov. 9, 1988, now abandoned, as a continuation of Commonly Owned U.S. Pat. No. 4,828,008, which issued on May 9, 1989, in the names of White et al., and entitled "Metal Matrix Composites". According to the method of the White et al. invention, a metal matrix composite is produced by infiltrating a permeable mass of filler material (e.g., a ceramic or a ceramic-coated material) with molten aluminum containing at least about 1 percent by weight magnesium, and preferably at least about 3 percent by weight magnesium. Infiltration occurs spontaneously without the application of external pressure or vacuum. A supply of the molten metal alloy is contacted with the mass of filler material at a temperature of at least about 675° C. in the presence of a gas comprising from about 10 to 100 percent, and preferably at least about 50 percent, nitrogen by volume, and a remainder of the gas, if any, being a nonoxidizing gas, e.g., argon. Under these conditions, the molten aluminum alloy infiltrates the ceramic mass under normal atmospheric pressures to form an aluminum (or aluminum alloy) matrix composite. When the desired amount of filler material has been infiltrated with the molten aluminum alloy, the temperature is lowered to solidify the alloy, thereby forming a solid metal matrix structure that embeds the reinforcing filler material. Usually, and preferably, the supply of molten alloy delivered will be sufficient to permit the infiltration to proceed essentially to the boundaries of the mass of filler material. The amount of filler material in the aluminum matrix composites produced according to the White et al. invention may be exceedingly high. In this respect, filler to alloy volumetric ratios of greater than 1:1 may be achieved.

Under the process conditions in the aforesaid White et al. invention, aluminum nitride can form as a discontinuous phase dispersed throughout the aluminum matrix. The amount of nitride in the aluminum matrix may vary depending on such factors as temperature, alloy composition, gas composition and filler material. Thus, by controlling one or more such factors in the system, it is possible to tailor certain properties of the composite. For some end use applications, however, it may be desirable that the composite contain little or substantially no aluminum nitride.

It has been observed that higher temperatures favor infiltration but render the process more conducive to nitride formation. The White et al. invention allows the choice of a balance between infiltration kinetics and nitride formation.

An example of suitable barrier means for use with metal matrix composite formation is described in Commonly Owned and Copending U.S. patent application Ser. No. 07/934,823, filed on Aug. 24, 1992, as a continuation of Commonly Owned U.S. Pat. No. 5,141,819, entitled "Method of Making Metal Matrix Composite with the Use of a Barrier", which issued Aug. 25, 1992, in the names of Michael K. Aghajanian et al. from U.S. patent application Ser. No. 07/415,088, filed on Sep. 29, 1989, now abandoned, which was a continuation of Commonly Owned U.S. Pat. No. 4,935,055, which issued on Jun. 19, 1990, in the names of Michael K. Aghajanian et al., and entitled "Method of Making Metal Matrix Composite with the Use of a Barrier". According to the method of this Aghajanian et al. invention, a barrier means (e.g., particulate titanium diboride or a graphite material such as a flexible graphite tape product sold by Union Carbide under the trade name GRAFOIL®) is disposed on a defined surface boundary of a filler material and matrix alloy infiltrates up to the boundary defined by the barrier means. The barrier means is used to inhibit, prevent, or terminate infiltration of the molten alloy, thereby providing net, or near net, shapes in the resultant metal matrix composite. Accordingly, the formed metal matrix composite bodies have an outer shape which substantially corresponds to the inner shape of the barrier means.

The method of U.S. Pat. No. 4,828,008, was improved upon by Commonly Owned and Copending U.S. patent application Ser. No. 07/994,064, filed on Dec. 18, 1992, which is a continuation of U.S. patent application Ser. No. 07/759,745, filed on Sep. 12, 1991, now abandoned, as a continuation of U.S. patent application Ser. No. 07/517,541, filed on Apr. 24, 1990, now abandoned, which was a continuation of U.S. patent application Ser. No. 07/168,284, filed Mar. 15, 1988, now abandoned, all in the names of Michael K. Aghajanian and Marc S. Newkirk and entitled "Metal Matrix Composites and Techniques for Making the Same." In accordance with the methods disclosed in this copending U.S. Patent Application, a matrix metal alloy is present as a first source of metal and as a reservoir of matrix metal alloy which communicates with the first source of molten metal due to, for example, gravity flow. Particularly, under the conditions described in this patent application, the first source of molten matrix alloy begins to infiltrate the mass of filler material under normal atmospheric pressures and thus begins the formation of a metal matrix composite. The first source of molten matrix metal alloy is consumed during its infiltration into the mass of filler material and, if desired, can be replenished, preferably by a continuous means, from the reservoir of molten matrix metal as the spontaneous infiltration continues. When a desired amount of permeable filler has been spontaneously infiltrated by the molten matrix alloy, the temperature is lowered to solidify the alloy, thereby forming a solid metal matrix structure that embeds the reinforcing filler material. It should be understood that the use of a reservoir of metal is simply one embodiment of the invention described in this patent application and it is not necessary to combine the reservoir embodiment with each of the alternate embodiments of the invention disclosed therein, some of which could also be beneficial to use in combination with the present invention.

The reservoir of metal can be present in an amount such that it provides for a sufficient amount of metal to infiltrate the permeable mass of filler material to a predetermined extent. Alternatively, an optional barrier means can contact the permeable mass of filler on at least one side thereof to define a surface boundary.

Moreover, while the supply of molten matrix alloy delivered should be at least sufficient to permit spontaneous infiltration to proceed essentially to the boundaries (e.g., barriers) of the permeable mass of filler material, the amount of alloy present in the reservoir could exceed such sufficient amount so that not only will there be a sufficient amount of alloy for complete infiltration, but excess molten metal alloy could remain and be attached to the metal matrix composite body. Thus, when excess molten alloy is present, the resulting body will be a complex composite body (e.g., a macrocomposite), wherein an infiltrated ceramic body having a metal matrix therein will be directly bonded to excess metal remaining in the reservoir.

Further improvements in metal matrix technology can be found in commonly owned U.S. Pat. No. 5,249,621, which issued Oct. 5, 1993, in the names of Aghajanian et al. and entitled "Method of Forming Metal Matrix Composite Bodies by a Spontaneous Infiltration Process and Products Produced Therefrom" from U.S. patent application Ser. No. 07/863,894, filed Apr. 6, 1992, which is a continuation application of U.S. patent application Ser. No. 07/521,043, filed May 9, 1990, now abandoned, which is a continuation-in-part of U.S. patent application Ser. No. 07/484,753, filed Feb. 23, 1990, now abandoned, which was a continuation-in-part of U.S. patent application Ser. No. 07/432,661, filed Nov. 7, 1989, now abandoned, which was a continuation-in-part of U.S. patent application Ser. No. 07/416,327, filed Oct. 6, 1989, now abandoned, which was a continuation-in-part of U.S. patent application Ser. No. 07/349,590, filed May 9, 1989 (now abandoned), which was a continuation-in-part of U.S. patent application Ser. No. 07/269,311, filed Nov. 10, 1988, now abandoned, in the names of Michael K. Aghajanian et al. and entitled "A Method of Forming Metal Matrix Composite Bodies by a Spontaneous Infiltration Process, and Products Produced Therefrom". According to this Aghajanian et al. invention, spontaneous infiltration of a matrix metal into a permeable mass of filler material or preform is achieved by use of an infiltration enhancer and/or an infiltration enhancer precursor and/or an infiltrating atmosphere which are in communication with the filler material or preform, at least at some point during the process, which permits molten matrix metal to spontaneously infiltrate the filler material or preform. Aghajanian et al. disclose a number of matrix metal/infiltration enhancer precursor/infiltrating atmosphere systems which exhibit spontaneous infiltration. Specifically, Aghajanian, et al. disclose that spontaneous infiltration behavior has been observed in the aluminum/magnesium/nitrogen system; the aluminum/strontium/nitrogen system; the aluminum/zinc/oxygen system; and the aluminum/calcium/nitrogen system. However, it is clear from the disclosure set forth in the Aghajanian, et al. applications that the spontaneous infiltration behavior should occur in other matrix metal/infiltration enhancer precursor/infiltrating atmosphere systems.

Another related Commonly Owned and Copending U.S. patent application Ser. No. 08/083,823, filed on Jun. 28, 1993, which is a continuation of Commonly Owned U.S. Pat. No. 5,222,542, which issued Jun. 29, 1993, which is a continuation-in-part of U.S. patent application Ser. No. 07/269,308, filed Nov. 10, 1988, which issued to U.S. Pat. No. 5,000,247 on Mar. 19, 1991, and naming as sole inventor John Thomas Burke and entitled "Method For Forming Metal Matrix Composite Bodies With A Dispersion Casting Technique and Products Produced Thereby". These patent applications and patents relate to a novel method for forming metal matrix composite bodies. A permeable mass of filler material is spontaneously infiltrated by a molten matrix metal. Particularly, an infiltration enhancer and/or an infiltration enhancer precursor and/or an infiltrating atmosphere are in communication with the filler material, at least at some point during the process, which permits molten matrix metal to spontaneously infiltrate the filler material. After infiltration has been completed to a desired extent, additional matrix metal is added to that matrix metal which has spontaneously infiltrated the filler material to result in a suspension of filler material and matrix metal having a lower volume fraction of filler relative to matrix metal. The matrix metal then can be permitted to cool in situ or the mixture of matrix metal and filler material can be poured into a second container as a casting process to form a desired shape which corresponds to the second container. However, the formed suspension, whether cast immediately after being formed or after cooling and thereafter heating and casting, can be pour cast into a desired shape while retaining beneficial characteristics associated with spontaneously infiltrated metal matrix composites.

A novel method of forming a metal matrix composite by infiltration of a permeable mass of filler contained in a ceramic matrix composite mold is disclosed in Commonly Owned U.S. Pat. No. 4,998,578, which issued on Mar. 12, 1991, from U.S. patent application Ser. No. 07/380,977, filed on Jul. 17, 1989, as a continuation of U.S. Pat. No. 4,871,008, which issued on Oct. 3, 1989, from U.S. patent application Ser. No. 07/142,385, filed Jan. 11, 1988, by Dwivedi et al., both entitled "Method of Making Metal Matrix Composites". According to the method disclosed in the Dwivedi et al. Patents, a mold is formed by the directed oxidation of a molten precursor metal or parent metal with an oxidant to develop or grow a polycrystalline oxidation reaction product which embeds at least a portion of a preform comprised of a suitable filler (referred to as a "first filler") to form a ceramic matrix composite mold. The formed mold of ceramic matrix composite is then provided with a second filler and the second filler and mold are contacted with molten metal, and the mold contents are hermetically sealed, most typically by introducing at least one molten metal into the entry or opening which seals the mold. The hermetically sealed bedding may contain entrapped air, but the entrapped air and the mold contents are isolated or sealed so as to exclude or shut-out the external or ambient air. By providing a hermetic environment, effective infiltration of the second filler at moderate molten metal temperatures is achieved, and therefore obviates or eliminates any necessity for wetting agents, special alloying ingredients in the molten matrix metal, applied mechanical pressure, applied vacuum, special gas atmospheres or other infiltration expedients.

The above-discussed commonly owned patents describe a method for the production of a metal matrix composite body, which may be bonded to a ceramic matrix composite body, and the novel bodies which are produced therefrom.

A method of forming macrocomposite bodies by a somewhat related process is disclosed in Commonly Owned and Copending U.S. patent application Ser. No. 07/966,124, filed on Oct. 23, 1992, as a continuation of U.S. patent application Ser. No. 07/747,213, filed on Aug. 19, 1991 (now abandoned), as a continuation of U.S. patent application Ser. No. 07/269,464, which was filed on Nov. 10, 1988, and issued as U.S. Pat. No. 5,040,588 on Aug. 20, 1991, in the names of Marc S. Newkirk et al., and entitled "Methods for Forming Macrocomposite Bodies and Macrocomposite Bodies Produced Thereby". A continuation of U.S. Pat. No. 5,040,588, was filed on Aug. 19, 1991, as U.S. patent application Ser. No. 07/747,213, now abandoned. These applications and Patent disclose various methods relating to the formation of macrocomposite bodies by spontaneously infiltrating a permeable mass of filler material or a preform with molten matrix metal and bonding the spontaneously infiltrated material to at least one second material such as a ceramic and/or a metal. Particularly, an infiltration enhancer and/or infiltration enhancer precursor and/or infiltrating atmosphere are in communication with a filler material or a preform, at least at some point during the process, which permits molten matrix metal to spontaneously infiltrate the filler material or preform. Moreover, prior to infiltration, the filler material or preform is placed into contact with at least a portion of a second material such that after infiltration of the filler material or preform, the infiltrated material is bonded to the second material, thereby forming a macrocomposite body.

A method of forming metal matrix composite bodies by a self-generated vacuum process is disclosed in Commonly Owned and Copending U.S. patent application Ser. No. 08/085,575, filed on Jul. 1, 1993, as a continuation of Commonly Owned U.S. Pat. No. 5,224,533, which issued on Jul. 6, 1993, which was filed on May 22, 1992, as U.S. patent application Ser. No. 07/888,241, as a continuation of U.S. patent application Ser. No. 07/381,523, filed on Jul. 18, 1989, now abandoned, in the names of Robert C. Kantner et al., and entitled "A Method of Forming Metal Matrix Composite Bodies by a Self-Generated Vacuum Process, and Products Produced Therefrom". These patent applications and patent disclose a method whereby a molten matrix metal is contacted with a filler material or a preform in the presence of a reactive atmosphere, and, at least at some point during the process, the molten matrix metal reacts, either partially or substantially completely, with the reactive atmosphere, thereby causing the molten matrix metal to infiltrate the filler material or preform due to, at least in part, the creation of a self-generated vacuum. Such self-generated vacuum infiltration occurs without the application of any external pressure or vacuum.

A method of forming macrocomposite bodies by a somewhat related process is disclosed in Commonly Owned and Copending U.S. patent application Ser. No. 08/021,297, filed on Feb. 22, 1993, as a divisional of Commonly Owned U.S. Pat. No. 5,247,986, entitled "A Method of Forming Macrocomposite Bodies by Self-Generated Vacuum Techniques, and Products Produced Therefrom" which issued Sep. 28, 1993, in the names of Robert C. Kantner et al. from U.S. patent application Ser. No. 07/824,686, filed on Jan. 21, 1992, which was filed as a continuation of U.S. patent application Ser. No. 07/383,935 (now abandoned); and U.S. Pat. No. 5,188,164, issued Feb. 23, 1993, in the names of Robert C. Kantner et al. and entitled "A Method of Forming Macrocomposite Bodies by Self-Generated Vacuum Techniques using a Glassy Seal" from U.S. patent application Ser. No. 07/560,746, filed on Jul. 31, 1990, which was filed as a continuation of U.S. patent application Ser. No. 07/383,935 (now abandoned); in the names of Robert C. Kantner et al., and entitled "A Method of Forming Macrocomposite Bodies By Self-Generated Vacuum Techniques, and Products Produced Therefrom". These patent applications and patents disclose a method whereby a molten matrix metal is contacted with a filler material or a preform, optionally in contact with a second or additional body, in the presence of a reactive atmosphere, and, at least at some point during the process, the molten matrix metal reacts, either partially or substantially completely, with the reactive atmosphere, thereby causing the molten matrix metal to infiltrate the filler material or preform due to, at least in part, the creation of a self-generated vacuum. The infiltrated material may be bonded to the carcass of the matrix metal and/or the second or additional body thereby forming a macrocomposite body. Such self-generated vacuum infiltration occurs without the application of any external pressure or vacuum.

Methods of forming shaped metal matrix composite bodies by a self-generated vacuum process are disclosed in Commonly Owned and Copending U.S. patent application Ser. No. 07/803,769, filed on Dec. 5, 1991, which is a continuation of U.S. patent application Ser. No. 07/520,915, which was filed on May 9, 1990, now abandoned, in the names of Aghajanian et al., and entitled "Method of Making Metal Matrix Composite Bodies With Use of A Barrier" and commonly owned and copending International Application No. PCT/US91/03232, filed on May 9, 1991, claiming priority to U.S. patent application Ser. No. 07/520,915, and entitled "Barrier Materials For Making Metal Matrix Composites". These applications describe methods for making a metal matrix composite produced by spontaneously infiltrating a molten matrix metal into a permeable mass of filler material or a preform having at least one surface boundary established or defined by a barrier means. Specifically, an infiltration enhancer and/or an infiltration enhancer precursor and/or an infiltrating atmosphere are in communication with the filler material or preform, at least at some point during the process, which permits molten matrix metal to spontaneously infiltrate the filler material or preform up to the barrier material. A barrier material, typically, inhibits the transport of molten matrix metal beyond itself, thereby permitting the formation of shaped metal matrix composite bodies.

The barrier means disclosed in these applications may be any suitable means which interferes, inhibits, prevents or terminates the migration, movement, or the like, of molten matrix alloy (e.g., an aluminum alloy) beyond the defined surface boundary of the filler material. Suitable barrier means may be any material, compound, element, composition, or the like, which, under the process conditions of this invention, maintains some integrity, is not volatile and preferably is permeable to the gas used with the process, as well as being capable of locally inhibiting, stopping, interfering with, preventing, or the like, continued infiltration or any other kind of movement of the molten matrix metal beyond the defined surface boundary of the ceramic filler. Barrier means may be used during spontaneous infiltration or in any molds or other fixtures utilized in connection with thermo-forming of the spontaneously infiltrated metal matrix composite, as discussed in greater detail below.

The barrier materials of these applications may be a physical barrier (e.g., colloidal graphite, certain glass-forming materials, etc.), a reactive barrier (e.g., calcium carbonate, aluminum phosphate, colloidal silica, etc.), or any combination of the two (e.g., Grade A-17 alumina having an average particle size of about 3.5 microns obtained from Alcoa Industrial Products, Bauxite, Ark.). The barrier material should prevent the molten matrix metal from infiltrating beyond the desired boundaries of the filler material or preform and, preferably, provide a smooth surface finish to the final metal matrix composite body. Further, the barrier should not react or dissolve into the molten matrix metal or the filler material, unless such behavior is desired, e.g., when a reactive barrier is utilized. Any material or combination of materials which satisfy the above-described criteria for a particular matrix metal/infiltration enhancer and/or infiltration enhancer precursor and/or infiltrating atmosphere/filler material system may be utilized as a barrier material in that system.

The subject matter of this application is also related to that of several commonly owned ceramic and ceramic composite Patents and commonly owned and copending ceramic and ceramic composite Patent Applications. Particularly, these Patents and Patent Applications describe novel methods for making ceramic and ceramic matrix composite materials (hereinafter sometimes referred to as "Commonly Owned Ceramic Matrix Patent Applications and Patents").

A novel approach to the formation of ceramic materials is disclosed generically in Commonly Owned U.S. Pat. No. 4,713,360, which issued on Dec. 15, 1987, in the names of Marc S. Newkirk et al. and entitled "Novel Ceramic Materials and Methods for Making Same". This Patent discloses a method of producing self-supporting ceramic bodies grown as the oxidation reaction product of a molten parent precursor metal which is reacted with a vapor-phase oxidant to form an oxidation reaction product. Molten metal migrates through the formed oxidation reaction product to react with the oxidant thereby continuously developing a ceramic polycrystalline body which can, if desired, include an interconnected metallic component. The process may be enhanced by the use of one or more dopants alloyed with the parent metal. For example, in the case of oxidizing aluminum in air, it is desirable to alloy magnesium and silicon with the aluminum to produce alpha-alumina ceramic structures. This method was improved upon by the application of dopant materials to the surface of the parent metal, as described in Commonly Owned U.S. Pat. No. 4,853,352, which issued on Aug. 1, 1989, in the names of Marc S. Newkirk et al., and entitled "Methods of Making Self-Supporting Ceramic Materials", a European counterpart to which was published in the EPO on Jan. 22, 1986.

A novel method for producing a self-supporting ceramic composite by growing an oxidation reaction product form a parent metal into a permeable mass of filler is disclosed in commonly owned and copending U.S. patent application Ser. No. 08/017,940, filed Feb. 16, 1993, as a continuation of U.S. patent application Ser. No. 07/659,473, filed Feb. 25, 1991, which issued as U.S. Pat. No. 5,187,130 on Feb. 16, 1993, which in turn was a continuation of U.S. patent application Ser. No. 07/415,180, filed Sep. 29, 1989 (now abandoned), as a divisional of U.S. patent application Ser. No. 07/265,835, filed on Nov. 1, 1989, as a continuation of U.S. patent application Ser. No. 07/659,473, which issued as Copending U.S. Pat. No. 4,916,113, on Apr. 10, 1990, and entitled "Methods of Making Composite Articles Having Embedded Filler" which is a continuation of U.S. Pat. No. 4,851,375, issued Jul. 25, 1989, and entitled "Composite Ceramic Articles and Methods of Making the Same" all in the names of Marc S. Newkirk, et al. which was a continuation-in-part of U.S. patent application Ser. No. 06/697,876, which was filed on Feb. 4, 1985 (now abandoned).

A method for producing ceramic composite bodies having a predetermined geometry or shape is disclosed in Commonly Owned and Copending U.S. patent application Ser. No. 07/973,808, filed on Nov. 9, 1992, as a continuation of U.S. patent application Ser. No. 07/659,481, filed Feb. 25, 1991, which issued as Commonly Owned U.S. Pat. No. 5,162,273, on Nov. 10, 1992. Moreover, U.S. Pat. No. 5,162,273, issued from a continuation application of U.S. patent application Ser. No. 07/368,484, filed Jun. 19, 1989 (now abandoned), which is a continuation of U.S. patent application Ser. No. 06/861,025, filed May 8, 1986 (now abandoned). In accordance with the method in these U.S. Patent Applications, the developing oxidation reaction product infiltrates a permeable preform of filler material in a direction towards a defined surface boundary. It was discovered that high fidelity is more readily achieved by providing the preform with a barrier means, as disclosed in Commonly Owned U.S. patent application Ser. No. 07/659, 523, filed Feb. 22, 1991 (now abandoned), which is a continuation of U.S. patent application Ser. No. 07/295,488 (now abandoned) filed Jan. 10, 1989, which is a continuation of U.S. Pat. No. 4,923,832, which issued May 8, 1990, both in the names of Marc S. Newkirk et al., a European counterpart to which was published in the EPO on Nov. 11, 1987. This method produces shaped self-supporting ceramic bodies, including shaped ceramic composites, by growing the oxidation reaction product of a parent metal to a barrier means spaced from the metal for establishing a boundary or surface.

Ceramic composites having a cavity with an interior geometry inversely replicating the shape of a positive mold or pattern are disclosed in Commonly Owned U.S. Pat. No. 5,051,382, which issued Sep. 24, 1991, from U.S. patent application Ser. No. 07/329,794, filed Mar. 28, 1989, which is a divisional of U.S. Pat. No. 4,828,785, which issued May 9, 1989, both in the names of Marc S. Newkirk, et al., a European counterpart to which was published in the EPO on Sep. 2, 1987, and in U.S. Pat. No. 4,859,640, which issued on Aug. 22, 1989, a European counterpart to which was published in the EPO on Mar. 9, 1988.

The feeding of additional molten parent metal from a reservoir has been successfully utilized to produce thick ceramic matrix composite structures. Particularly, as disclosed in Commonly Owned U.S. Pat. No. 4,918,034, issued Apr. 17, 1990, which is a continuation-in-part of U.S. Pat. No. 4,900,699, issued Feb. 13, 1990, both in the names of Marc S. Newkirk et al., and entitled "Reservoir Feed Method of Making Ceramic Composite Structures and Structures Made Thereby", a European counterpart to which was published in the EPO on Mar. 30, 1988, the reservoir feed method has been successfully applied to form ceramic matrix composite structures. According to the method of this Newkirk et al. invention, the ceramic or ceramic composite body which is produced comprises a self-supporting ceramic composite structure which includes a ceramic matrix obtained by the oxidation reaction of a parent metal with an oxidant to form a polycrystalline material. In conducting the process, a body of the parent metal and a permeable filler are oriented relative to each other so that formation of the oxidation reaction product will occur in a direction toward and into the filler. The parent metal is described as being present as a first source and as a reservoir, the reservoir of metal communicating with the first source due to, for example, gravity flow. The first source of molten parent metal reacts with the oxidant to begin the formation of the oxidation reaction product. As the first source of molten parent metal is consumed, it is replenished, preferably by a continuous means, from the reservoir of parent metal as the oxidation reaction product continues to be produced and infiltrates the filler. Thus, the reservoir assures that ample parent metal will be available to continue the process until the oxidation reaction product has grown to a desired extent.

A method for tailoring the constituency of the metallic component of a ceramic matrix composite structure is disclosed in Copending and Commonly Owned U.S. Pat. No. 5,017,533, which issued on May 21, 1991, from U.S. application Ser. No. 07/389,506, filed on Aug. 2, 1989, which in turn is a continuation of U.S. patent application Ser. No. 06/908,454, filed Sep. 17, 1986 (and now abandoned), both of which are in the names of Marc S. Newkirk et al., and entitled "Method for In Situ Tailoring the Metallic Component of Ceramic Articles and Articles Made Thereby".

Moreover, U.S. patent application Ser. No. 07/904,739, filed on Jun. 26, 1992, as a continuation-in-part application of U.S. Ser. No. 07/793,933, filed on Nov. 14, 1991, which issued on Feb. 9, 1993, as U.S. Pat. No. 5,185,303, which was filed on Aug. 16, 1990, as a continuation of U.S. application Ser. No. 07/568,618, which in turn issued as U.S. Pat. No. 5,066,618 on Nov. 19, 1991, from a continuation of U.S. application Ser. No. 07/269,152, filed Ser. No. 07/269,152, filed Nov. 9, 1988 (now abandoned), which is a continuation of U.S. Pat. No. 4,818,734, which issued Apr. 4, 1989 from U.S. patent application Ser. No. 07/152,518, filed Feb. 5, 1988, in the names of Robert C. Kantner et al., which was a Continuation-in-Part Application of the above-mentioned Ser. No. 06/908,454, filed Sep. 17, 1986, having the same title and also being Commonly Owned. These Patents and the above-mentioned U.S. application Ser. No. 06/908,454, disclose methods for tailoring the constituency of the metallic component (both isolated and interconnected) of ceramic and ceramic matrix composite bodies during formation thereof to impart one or more desirable characteristics to the resulting body. Thus, desired performance characteristics for the ceramic or ceramic composite body are advantageously achieved by incorporating the desired metallic component in situ, rather than from an extrinsic source, or by post-forming techniques.

As discussed in these Commonly Owned Ceramic Matrix Patent Applications and Patents, novel polycrystalline ,ceramic materials or polycrystalline ceramic composite materials are produced by the oxidation reaction between a parent metal and an oxidant (e.g., a solid, liquid and/or a gas). In accordance with the generic process disclosed in these Commonly Owned Ceramic Matrix Patent Applications and Patents, a parent metal (e.g., aluminum, silicon) is heated to an elevated temperature above its melting point but below the melting point of the oxidation reaction product (e.g., aluminum oxide, aluminum nitride, silicon nitride, etc.) to form a body of molten parent metal which reacts upon contact with an oxidant (e.g., an oxygen containing atmosphere, a nitrogenous atmosphere, etc.) to form the oxidation reaction product. At this temperature, the oxidation reaction product, or at least a portion thereof, is in contact with and extends between the body of molten parent metal and the oxidant, and molten metal is drawn or transported through the formed oxidation reaction product and towards the oxidant. The transported molten metal forms additional fresh oxidation reaction product when contacted with the oxidant, at the surface of previously formed oxidation reaction product. As the process continues, additional metal is transported through this formation of polycrystalline oxidation reaction product thereby continually "growing" a ceramic structure of interconnected crystallites. The resulting ceramic body may contain metallic constituents, such as non-oxidized constituents of the parent metal, and/or voids. Oxidation is used in its broad sense in all of the Commonly Owned Ceramic Matrix Patent Applications and Patents and in this application, and refers to the loss or sharing of electrons by a metal to an oxidant which may be one or more elements and/or compounds. Accordingly, elements other than oxygen may serve as an oxidant.

In certain cases, the parent metal may require the presence of one or more dopants in order to influence favorably or to facilitate growth of the oxidation reaction product. Such dopants may at least partially alloy with the parent metal at some point during or prior to growth of the oxidation reaction product. For example, in the case of aluminum as the parent metal and nitrogen as the oxidant, dopants such as strontium, silicon, nickel and magnesium, to name but a few of a larger class of dopant materials, can be alloyed with aluminum, and the created growth alloy is utilized as the parent metal. The resulting oxidation reaction product of such a growth alloy, in the case of using nitrogen as an oxidant, comprises aluminum nitride.

Novel ceramic composite structures and methods of making the same are also disclosed and claimed in certain of the aforesaid Commonly Owned Ceramic Matrix Patent Applications and Patents which utilize the oxidation reaction to produce ceramic composite structures comprising a substantially inert filler (note: in some cases it may be desirable to use a reactive filler, e.g., a filler which is at least partially reactive with the advancing oxidation reaction product and/or parent metal) infiltrated by the polycrystalline ceramic matrix. A parent metal is positioned adjacent to a mass of permeable filler (or a preform) which can be shaped and treated to be self-supporting, and is then heated to form a body of molten parent metal which is reacted with an oxidant, as described above, to form an oxidation reaction product. As the oxidation reaction product grows and infiltrates the adjacent filler material, molten parent metal is drawn through previously formed oxidation reaction product within the mass of filler and reacts with the oxidant to form additional fresh oxidation reaction product at the surface of the previously formed oxidation reaction product, as described above. The resulting growth of oxidation reaction product infiltrates or embeds the filler and results in the formation of a ceramic composite structure of a polycrystalline ceramic matrix embedding the filler. As also discussed above, the filler (or preform) may utilize a barrier means to establish a boundary or surface for the ceramic composite structure.

The entire disclosures of the above-described commonly owned patents and patent applications are expressly incorporated herein by reference.

Definitions

As used in the present specification and the appended claims, the terms below are defined as follows:

"Alloy Side", as used herein, refers to that side of a metal matrix composite or ceramic matrix composite which initially contacted molten metal before that molten metal infiltrated the permeable mass of filler material or preform.

"Aluminum", as used herein, means and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Ambient Atmosphere", as used herein in conjunction with the formation of metal matrix composites by a self-generated vacuum technique, refers to the atmosphere outside the filler material or preform and the impermeable container. It may have substantially the same constituents as the reactive atmosphere, or it may have different constituents.

"Balance Non-Oxidizing Gas", as used herein in conjunction with the formation of metal matrix composites by a spontaneous infiltration technique, means that any gas present in addition to the primary gas comprising the infiltrating atmosphere, is either an inert gas or a reducing gas which is substantially non-reactive with the matrix metal under the process conditions. Any oxidizing gas which may be present as an impurity in the gas(es) used should be insufficient to oxidize the matrix metal to any substantial extent under the process conditions.

"Barrier" or "barrier means", as used herein in conjunction with the formation of metal matrix composites, means any suitable means which interferes, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered non-functional as a barrier).

Further, suitable "barrier means" includes materials which are substantially non-wettable by the migrating molten matrix metal under the process conditions employed. A barrier of this type appears to exhibit substantially little or no affinity for the molten matrix metal, and movement beyond the defined surface boundary of the mass of filler material or preform is prevented or inhibited by the barrier means. The barrier reduces any final machining or grinding that may be required and defines at least a portion of the surface of the resulting metal matrix composite product. The barrier may in certain cases be permeable or porous, or rendered permeable by, for example, drilling holes or puncturing the barrier, to permit gas to contact the molten matrix metal.

"Barrier" or "barrier means", as used herein in conjunction with the formation of ceramic matrix composites, may be any material, compound, element, composition, or the like, which, under the process conditions, maintains some integrity, is not substantially volatile (i.e., the barrier material does not volatilize to such an extent that it is rendered non-functional as a barrier) and is preferably permeable to a vapor-phase oxidant (if utilized) while being capable of locally inhibiting, poisoning, stopping, interfering with, preventing, or the like, continued growth of the oxidation reaction product.

"Bonded", as used herein in conjunction with metal matrix composites, means any method of attachment between two bodies. The attachment may be physical and/or chemical and/or mechanical. A physical attachment requires that at least one of the two bodies, usually in a liquid state, infiltrates at least a portion of the microstructure of the other body. This phenomenon is commonly known as "wetting". A chemical attachment requires that at least one of the two bodies chemically react with the other body to form at least one chemical bond between the two bodies. One method of forming a mechanical attachment between the two bodies includes a macroscopic infiltration of at least one of the two bodies into the interior of the other body. An example of this would be the infiltration of at least one of the two bodies into a groove or slot on the surface of the other body. Such mechanical attachment does not include microscopic infiltration or "wetting" but may be used in combination with such physical attachment techniques.

An additional method of mechanical attachment includes such techniques as "shrink fitting", wherein one body is attached to the other body by a pressure fit. In this method of mechanical attachment, one of the bodies would be placed under compression by the other body.

"Bronze", as used herein, means and includes a copper rich alloy, which may include iron, tin, zinc, aluminum, silicon, beryllium, manganese and/or lead. Specific bronze alloys include those alloys in which the proportion of copper is about 90% by weight, the proportion of silicon is about 6% by weight, and the proportion of iron is about 3% by weight.

"Carcass" or "Carcass of Matrix Metal", as used herein, refers to any of the original body of matrix metal remaining which has not been consumed during formation of the metal matrix composite body, and typically, if allowed to cool, remains in at least partial contact with the metal matrix composite body which has been formed. It should be understood that the carcass may also include a second or foreign metal therein.

"Cast Iron", as used herein, refers to the family of cast ferrous alloys wherein the proportion of carbon is at least about 2% by weight.

"Ceramic", as used herein, should not be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents (isolated and/or interconnected, depending on the processing conditions used to form the body) derived from a parent metal, or reduced from an oxidant or a dopant, most typically within a range of from about 1–40 percent by volume, but may include still more metal.

"Ceramic Matrix Composite" or "CMC" or "Ceramic Composite Body", as used herein, means a material comprising a two- or three-dimensionally interconnected ceramic which has embedded a preform or filler material, and may further include a parent metal phase embedded therein, possibly in a two- or three-dimensionally interconnected network. The ceramic may include various dopant elements to provide a specifically desired microstructure, or specifically desired mechanical, physical, or chemical properties in the resulting composite.

"Copper", as used herein, refers to the commercial grades of the substantially pure metal, e.g., 99% by weight copper with varying amounts of impurities contained therein. Moreover, it also refers to metals which are alloys or intermetallics which do not fall within the definition of bronze, and which contain copper as the major constituent therein.

"Dopants", as used herein in conjunction with ceramic matrix composites, means materials (parent metal constituents or constituents combined with and/or included in or on a filler, or combined with the oxidant) which, when used in combination with the parent metal, favorably influence or promote the oxidation reaction process and/or modify the growth process to alter the microstructure and/or properties of the product. While not wishing to be bound by any particular theory or explanation of the function of dopants, it appears that some dopants are useful in promoting oxidation reaction product formation in cases where appropriate surface energy relationships between the parent metal and its oxidation reaction product do not intrinsically exist so as to promote such formation. Dopants may be added to the filler material, they may be in the form of a gas, solid, or liquid under the process conditions, they may be included as constituents of the parent metal, or they may be added to any one of the constituents involved in the formation of the oxidation reaction product. Dopants may: (1) create favorable surface energy relationships which enhance or induce the wetting of the oxidation reaction product by the molten parent metal; and/or (2) form a "precursor layer" at the growth surface by reaction with alloy, oxidant, and/or filler, that (a) minimizes formation of a protective and coherent oxidation reaction product layer(s), (b) may enhance oxidant solubility (and thus permeability) in molten metal, and/or (c) allows for transport of oxidant from the oxidizing atmosphere through any precursor oxide layer to combine subsequently with the molten metal to form another oxidation reaction product; and/or (3) cause microstructural modifications of the oxidation reaction product as it is formed or subsequently and/or alter the metallic constituent composition and properties of such oxidation reaction product; and/or (4) enhance growth nucleation and uniformity of growth of oxidation reaction product.

"Filler", as used herein in conjunction with both ceramic matrix composites and metal matrix composites, is intended to include either single constituents or mixtures of constituents which are substantially non-reactive with and/or of limited solubility in the matrix or parent metal and may be single or multi-phase. Fillers may be provided in a wide variety of forms, such as powders, flakes, platelets, microspheres, whiskers, bubbles, fibers, particulates, fiber mats, chopped fibers, spheres, pellets, tubules, refractory cloths, etc., and may be either dense or porous. "Filler" may also include ceramic fillers, such as alumina or silicon carbide, as fibers, chopped fibers, particulates, whiskers, bubbles, spheres, fiber mats, or the like, and coated fillers such as carbon fibers coated with alumina or silicon carbide to protect the carbon from attack, for example, by a molten aluminum matrix metal. Fillers may also include metals.

"Impermeable Container", as used herein, in conjunction with the formation of metal matrix composites by a self-generated vacuum technique, means a container which may house or contain a reactive atmosphere and a filler material (or preform) and/or molten matrix metal and/or a sealing means and/or at least a portion of at least one second material, under the process conditions, and which is sufficiently impermeable to the transport of gaseous or vapor species through the container, such that a pressure difference between the ambient atmosphere and the reactive atmosphere can be established.

"Infiltrating Atmosphere", as used herein, in conjunction with the formation of metal matrix composites by a spontaneous infiltration technique, means that atmosphere which is present which interacts with the matrix metal and/or preform (or filler material) and/or infiltration enhancer precursor and/or infiltration enhancer and permits or enhances spontaneous infiltration of the matrix metal to occur.

"Infiltration Enhancer", as used herein, in conjunction with the formation of metal matrix composites by a spontaneous infiltration technique, means a material which promotes or assists in the spontaneous infiltration of a matrix metal into a filler material or preform. An infiltration enhancer may be formed from, for example, (1) a reaction of an infiltration enhancer precursor with an infiltrating atmosphere to form a gaseous species and/or (2) a reaction product of the infiltration enhancer precursor and the infiltrating atmosphere and/or (3) a reaction product of the infiltration enhancer precursor and the filler material or preform. Moreover, the infiltration enhancer may be supplied directly to at least one of the filler material or preform, and/or matrix metal and/or infiltrating atmosphere and function in a substantially similar manner to an infiltration enhancer which has formed as a reaction between an infiltration enhancer precursor and another species. Ultimately, at least during the spontaneous infiltration, the infiltration enhancer should be located in at least a portion of the filler material or preform to achieve spontaneous infiltration, and the infiltration enhancer may be at least partially reducible by the matrix metal.

"Infiltration Enhancer Precursor" or "Precursor to the Infiltration Enhancer", as used herein, in conjunction with the formation of metal matrix composites by a spontaneous infiltration technique, means a material which when used in combination with (1) the matrix metal, (2) the preform or filler material and/or (3) an infiltrating atmosphere forms an infiltration enhancer which induces or assists the matrix metal to spontaneously infiltrate the filler material or preform. Without wishing to be bound by any particular theory or explanation, it appears as though it may be necessary for the precursor to the infiltration enhancer to be capable of being positioned, located or transportable to a location which permits the infiltration enhancer precursor to interact within the infiltrating atmosphere and/or the preform or filler material and/or the matrix metal. For example, in some matrix metal/infiltration enhancer precursor/infiltrating atmosphere systems, it is desirable for the infiltration enhancer precursor to volatilize at, near, or, in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least a portion of the filler material or preform which enhances wetting.

"Macrocomposite" or "Macrocomposite Body", as used herein in conjunction with metal matrix composites, means any combination of two or more materials selected from the group consisting of a ceramic matrix body, a ceramic matrix composite body, a metal body, and a metal matrix composite body, which are intimately bonded together in any configuration, wherein at least one of the materials comprises a metal matrix composite body. The metal matrix composite body may be present as an exterior surface and/or as an interior surface. Further, the metal matrix composite body may be present as an interlayer between two or more of the materials in the group described above. It should be understood that the order, number, and/or location of a metal matrix composite body or bodies relative to residual matrix metal and/or any of the materials in the group discussed above, can be manipulated or controlled in an unlimited fashion.

"Matrix Metal" or "Matrix Metal Alloy", as used herein means that metal which is utilized to form a metal matrix composite (e.g., before infiltration) and/or that metal which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Matrix Metal/Infiltration Enhancer Precursor/Infiltrating Atmosphere System" or "Spontaneous System", as used herein, in conjunction with the formation of metal matrix composites by a spontaneous infiltration technique, refers to that combination of materials which exhibits spontaneous infiltration into a preform or filler material. It should be understood that whenever a "/" appears between an exemplary matrix metal, infiltration enhancer precursor and infiltrating atmosphere that, the "/" is used to designate a system or combination of materials which, when combined in a particular manner, exhibits spontaneous infiltration into a preform or filler material.

"Maximum Operating Temperature" or "MOT", as used herein, is related to the predominant failure mode of composite rotors (e.g., metal matrix composite rotors) which is by surface scuffing. As a rotor is subjected to progressively more severe conditions, the temperature of the rotor continues to rise until it reaches a temperature at which the glaze on the rotor surface breaks down and scuffing ensues. The temperature at which the breakdown occurs is referred to as the maximum operating temperature (MOT). The breakdown of a rotor is accompanied by excessive noise, sparks and dust. The rotor breakdown may be followed by rapid wear of the pads and a rise in temperature measured by the pad thermocouples. The MOT is primarily dependent on the material composition and not on the rotor design or the test conditions.

"Metal Matrix Composite" or "MMC", as used herein, means a material comprising a two- or three-dimensionally interconnected alloy or matrix metal which has embedded a preform or filler material. The matrix metal may include various alloying elements to provide specifically desired mechanical and physical properties in the resulting composite.

A Metal "Different" from the Matrix Metal or from the parent metal means a metal which does not contain, as a primary constituent, the same metal as the matrix or parent metal (e.g., if the primary constituent of the matrix metal is aluminum, the "different" metal could have a primary constituent of, for example, nickel).

"Oxidant", as used herein, means one or more suitable electron acceptors or electron sharers and may be a solid, a liquid or a gas or some combination of these (e.g., a solid and a gas) at the oxidation reaction conditions. Typical oxidants include, without limitation, oxygen, nitrogen, any halogen or a combination thereof, sulphur, phosphorus, arsenic, carbon, boron, selenium, tellurium, and or compounds and combinations thereof, for example, silica or silicates (as sources of oxygen), methane, ethane, propane, acetylene, ethylene, propylene (the hydrocarbon as a source of carbon), and mixtures such as air, $H_2/H_2O$ and $CO/CO_2$ (as sources of oxygen). The latter two (i.e., $H_2/H_2O$ and $CO/CO_2$) being useful in reducing the oxygen activity of the environment.

"Oxidation", as used herein means a chemical reaction in which an oxidant reacts with a parent metal, and that parent metal has given up electrons to or shared electrons with the oxidant.

"Oxidation Reaction Product", as used herein, means one or more metals in any oxidized state wherein the metal(s) has given up electrons to or shared electrons with another element, compound, or combination thereof. Accordingly, an "oxidation reaction product" under this definition includes the product of the reaction of one or more metals with one or more oxidants.

"Parent Metal", as used herein, means that metal(s) (e.g., aluminum, silicon, titanium, tin, zirconium, etc.) which is the precursor of a polycrystalline oxidation reaction product and includes that metal(s) as an essentially pure metal, a commercially available metal having impurities and/or alloying constituents therein, or an alloy in which that metal precursor is the major constituent. When a specified metal is mentioned as the parent or precursor metal (e.g., aluminum, etc.), the metal identified should be read with this definition in mind unless indicated otherwise by the context.

"Nonreactive Vessel for Housing Matrix Metal", as used herein, in conjunction with the formation of metal matrix composites by a spontaneous infiltration technique, means any vessel which can house or contain molten matrix metal under the process conditions and not react with the matrix and/or the infiltrating atmosphere and/or infiltration enhancer precursor and/or filler material or preform in a manner which would be significantly detrimental to the spontaneous infiltration mechanism.

"Preform" or "Permeable Preform", as used herein in conjunction with both metal matrix composite and ceramic matrix composite materials, means a porous mass of filler or filler material which is manufactured with at least one surface boundary which essentially defines a boundary for infiltrating matrix metal, such mass retaining sufficient shape integrity and green strength to provide dimensional fidelity without any external means of support prior to being infiltrated by the matrix metal. The mass should be sufficiently porous to permit infiltration of the matrix metal. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Reaction System", as used herein, in conjunction with the formation of metal matrix composites by a self-generated vacuum technique, refers to that combination of materials which exhibit self-generated vacuum infiltration of a molten matrix metal into a filler material or preform. A reaction system comprises at least an impermeable container having therein a permeable mass of filler material or preform, a reactive atmosphere and a matrix metal.

"Reactive Atmosphere", as used herein, in conjunction with the formation of metal matrix composites by a self-generated vacuum technique, means an atmosphere which may react with the matrix metal and/or filler material (or preform) and/or impermeable container to form a self-generated vacuum, thereby causing molten matrix metal to infiltrate into the filler material (or preform) upon formation of the self-generated vacuum.

"Reservoir", as used herein in conjunction with both metal matrix composite and ceramic matrix composite materials, means a separate body of metal positioned relative to a mass of filler or a preform so that, when the metal is molten, it may flow to replenish, or in some cases to initially provide and subsequently replenish, that portion, segment or source of matrix metal which is in contact with the filler or preform.

"Seal" or "Sealing Means", as used herein in conjunction with the formation of metal matrix composites by a self-generated vacuum technique, refers to a gas-impermeable seal under the process conditions, whether formed independent of (e.g., an extrinsic seal) or formed by the reaction system (e.g., an intrinsic seal), which isolates the ambient atmosphere from the reactive atmosphere. The seal or sealing means may have a composition different from that of the matrix metal.

"Seal Facilitator", as used herein in conjunction with the formation of metal matrix composites by a self-generated vacuum technique, is a material that facilitates formation of a seal upon reaction of the matrix metal with the ambient atmosphere and/or the impermeable container and/or the filler material or preform. The material may be added to the matrix metal, and the presence of the seal facilitator in the matrix metal may enhance the properties of the resultant composite body.

"Second Body" or "Additional Body", as used herein, means another body which is capable of being bonded to a metal matrix composite body by at least one of a chemical reaction and/or a mechanical or shrink fit. Such a body includes traditional ceramics such as sintered ceramics, hot pressed ceramics, extruded ceramics, etc., and also, nontraditional ceramic and ceramic composite bodies such as those produced by the methods described in Commonly Owned U.S. Pat. No. 4,713,360, which issued on Dec. 15, 1987, in the names of Marc S. Newkirk et al.; Commonly Owned U.S. Pat. No. 4,851,375, which issued on Jul. 25, 1989, from U.S. patent application Ser. No. 819,397, filed Jan. 17, 1986 in the names of Marc S. Newkirk et al. and entitled "Composite Ceramic Articles and Methods of Making Same"; Commonly Owned U.S. Pat. No. 5,017,526, which issued on May 21, 1991, from U.S. patent application Ser. No. 07/338,471, filed Apr. 14, 1989, as a continuation of U.S. patent application Ser. No. 861,025, filed May 8, 1986 in the names of Marc S. Newkirk et al. and entitled "Shaped Ceramic Composites and Methods of Making the Same"; Commonly Owned U.S. Pat. No. 4,818,734, which issued on Apr. 4, 1989, from U.S. patent application Ser. No. 152,518 filed on Feb. 5, 1988 in the names of Robert C. Kantner et al. and entitled "Method For In Situ Tailoring the Metallic Component of Ceramic Articles and Articles Made Thereby"; Commonly Owned U.S. Pat. No. 4,940,679, which issued on Jul. 10, 1990, from U.S. patent application Ser. No. 137,044, filed Dec. 23, 1987 in the names of T. Dennis Claar et al. and entitled "Process for Preparing Self-Supporting Bodies and Products Made Thereby"; and variations and improvements on these processes contained in other Commonly Owned U.S. Patent Applications and Patents. For the purpose of teaching the method of production and characteristics of the ceramic and ceramic composite bodies disclosed and claimed in these commonly owned applications and Patents, the entire disclosures of the above-mentioned applications and Patents are hereby incorporated by reference. Moreover, the second or additional body of the instant invention also includes metal matrix composites and structural bodies of metal such as high temperature metals, corrosion resistant metals, erosion resistant metals, etc. Accordingly, a second or additional body includes a virtually unlimited number of bodies.

"Second Material", as used herein, refers to a material selected from the group consisting of a ceramic matrix body, a ceramic matrix composite body, a metal body, and a metal matrix composite body.

"pontaneous Infiltration", as used herein, means that the infiltration of matrix metal into the permeable mass of filler or preform occurs without requirement for the application of pressure or vacuum (whether externally applied or internally created).

"Wetting Enhancer", as used herein in conjunction with the formation of metal matrix composites by a self-generated vacuum technique, refers to any material, which when added to the matrix metal and/or the filler material or preform, enhances the wetting (e.g., reduces surface tension of molten matrix metal) of the filler material or preform by the molten matrix metal. The presence of the wetting enhancer may also enhance the properties of the resultant metal matrix composite body by, for example, enhancing bonding between the matrix metal and the filler material.

SUMMARY OF THE INVENTION

The present invention comprises improved composite brake rotors useful for ground vehicles. Specifically, the present invention comprises a brake rotor comprising an interconnected metal or ceramic matrix embedding at least one filler material (e.g., such as a ceramic material), wherein in the case of metal matrix composites the at least one filler material comprises at least about 26% by volume of the brake rotor for most applications, and at least about 20% by volume for applications involving passenger cars and trucks. Such a brake rotor demonstrates properties which are unexpectedly superior to the properties demonstrated by brake rotors having lower volumetric percentages of filler material when such brake rotors are used in similar applications.

Although any process capable of forming metal matrix composites containing at least about 20% by volume filler material may be used to form the metal matrix composites of the present invention, a particularly preferable technique comprises contacting a molten matrix metal with a mass of filler material or a preform which is in communication with an infiltration enhancer and/or an infiltration enhancer precursor and/or an infiltrating atmosphere at least at some point during the process which permits molten matrix metal to spontaneously infiltrate the mass of filler material or preform to form the metal matrix composite (sometimes referred to herein as "spontaneous infiltration").

Without wishing to be bound by any particular theory or explanation, it is believed that when the volume percent of filler material in a metal matrix composite reaches a certain level (e.g., at least about 26% by volume, and preferably at least about 28% by volume, for most applications, and at least about 20% by volume for applications involving passenger cars and trucks, however, in some cases, even more preferably at least about 30% by volume), the overall performance level of the metal matrix composite material may be unexpectedly enhanced (i.e., in comparison to metal matrix composite materials having lower, or in some cases even higher, filler loadings and used in similar applications) to a level which renders the metal matrix composite material suitable for certain uses or applications, such as brake rotors for both the front and rear braking systems on, for example, automobiles and trucks. It is further believed that the overall performance level may be influenced by one or more of thermal conductivity, heat capacity wear or abrasion resistance, high temperature strength, stiffness, coefficient of friction, elastic modulus, yield strength, density, hardness, resistance to heat cracking, ultimate tensile strength, fatigue strength and fracture toughness.

The above disclosure is directed generally to brake rotors for ground vehicles. In view of this, the lower end of the applicable filler material range has been generally limited to about 26% by volume, where the increased performance of the brake rotors justifies their use in a wide variety of ground vehicles (e.g., automobiles, trucks, trains, trolleys, motorcycles, military vehicles and all other ground vehicles that use brake rotors). The lower end of the filler material range which may be used in the brake rotors of the present invention when the end use of the brake rotors is for passenger cars and trucks has been limited to about 20% by volume. This is because the necessary performance level for brake rotors in certain passenger cars and trucks is, typically, not as high as in other types of ground vehicles (e.g., heavy trucks, buses and trains). Accordingly, when the brake rotor of the present invention is intended for use in passenger cars and trucks (or in any other application which requires an equivalent or lesser amount of brake rotor performance), a filler material loading of at least about 20% may be necessary to achieve the required performance levels. However, in many passenger car and light truck applications, a brake rotor may require filler material loadings of at least about 30% by volume or more, depending upon the specific performance requirements that the rotor must meet. In this regard, the aforementioned physical properties which contribute to the overall performance of the rotors are related in a complex way. Specifically, the presence of one filler material verses another filler material in a rotor affects virtually all of the properties discussed above herein. Accordingly, in some cases, a greater amount of one filler material may be required to achieve similar rotor performances in comparison to a different filler material. While the complex interrelationship of properties is difficult to quantify with respect to different rotor performances, one item which is readily quantifiable is the Maximum Operating Temperature ("MOT") which a rotor can experience. For example, under a given set of testing conditions, every rotor can be caused to fail and the temperature at which such rotor fails gives an indication of which application (e.g., front brake rotor or back brake rotor for automobiles) the rotor is suited for. The rotors of the present invention reach unexpectedly high MOT's of at least about 900° F. (482° C.) and above. Specifically, rotors of the present invention readily achieve MOT's of 925° F. (496° C.), 950° F. (510° C.) 1000° F. (538° C.) and above. These MOT's have never before been achieved by prior art rotors and permit new design/weight formulation to occur. Accordingly, the present invention is a significant achievement in the rotor art because weight savings can be achieved without sacrificing performance.

The predominant failure mode of composite material brake rotors and particularly metal matrix composite brake rotors is by surface scuffing. As a brake rotor is subjected to progressively more severe conditions (e.g., high inertial loads), the temperature of the brake rotor continues to rise until it reaches a temperature at which a glaze (typically formed on the rubbing surfaces of the rotor at preburnish, for example, as Section 6.3 Preburnishment of SAE J212) on the rotor surface breaks down and scuffing ensues. The temperature at which the breakdown occurs is referred to as the Maximum Operating Temperature or MOT. The breakdown of a rotor accompanies excessive noise, sparks and dust. The rotor breakdown is followed by rapid wear of the pads and a rise in temperatures measured by the pad thermocouples (as discussed further below). The Maximum Operating Temperature or MOT is primarily dependent on the material composition and not on the rotor design or the test conditions.

The Maximum Operating Temperature or MOT of a material formed as a brake rotor or disc is determined using dynamometer tests adopted from SAE J212, "Brake System Dyanamometer Test Procedure"—Passenger Cars—SAE J212 JUN80, SAE 1980 (which is herein incorporated by reference), with some modifications. These tests are discussed in greater detail later herein.

In addition, certain rotor formulations relating to the present invention achieve performances never before thought to be obtainable with conventional materials. These rotor formulations include both novel metal matrix composites and ceramic matrix composites made by the methods discussed herein.

BRIEF DESCRIPTION OF THE FIGURES

FIG. 7 is a drawing of an impellor used to disperse filler material to make lower loaded metal matrix bodies according to the methods of Example 4.

FIG. 8 is a schematic of a baffle used in the formation of lower loaded metal matrix composite bodies as described in Example 4.

FIGS. 9A and 9B are schematics of an impellor used to form lower loaded metal matrix composite bodies according to the methods of Example 6.

DETAILED DESCRIPTION OF THE INVENTION AND PREFERRED EMBODIMENTS

Figure 1:
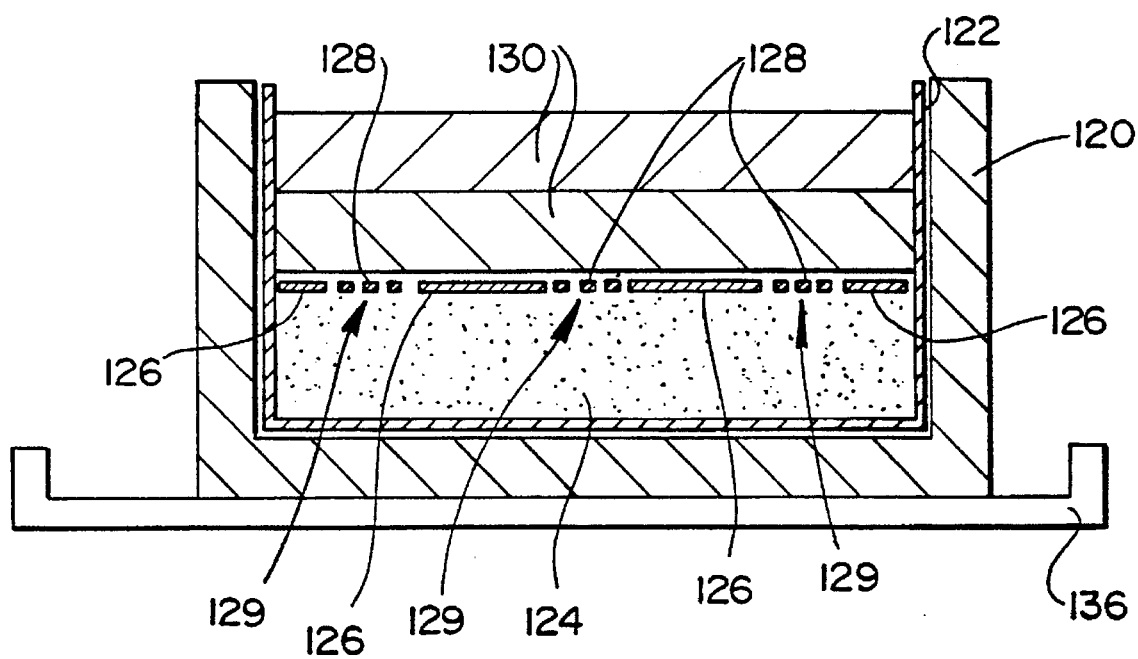
FIG. 1 is a cross-sectional schematic view of a lay-up used to fabricate the highly loaded metal matrix composite body of Example 1.

The present invention comprises improved metal matrix or ceramic matrix composite brake rotors useful for ground vehicles. Specifically, with regard to metal matrix composites, the present invention comprises a brake rotor comprising an interconnected metal matrix (e.g., aluminum) embedding at least one filler material (e.g., such as a ceramic material), wherein the at least one filler material comprises at least about 26% by volume of the brake rotor for most applications, and at least about 20% by volume for applications involving passenger cars and trucks. Such a brake rotor demonstrates properties which are unexpectedly superior to the properties demonstrated by brake rotors having lower volumetric percentages of filler material when such brake rotors are used in similar applications.

Although any process capable of forming metal matrix composites containing at least about 20% by volume filler material may be used to form the metal matrix composites of the present invention, a particularly preferable technique comprises contacting a molten matrix metal with a mass of filler material or a preform which is in communication with an infiltration enhancer and/or an infiltration enhancer precursor and/or an infiltrating atmosphere at least at some point during the process which permits molten matrix metal to spontaneously infiltrate the mass of filler material or preform to form the metal matrix composite.

Without wishing to be bound by any theory, it is believed that when the volume percent of filler material in a metal matrix composite reaches a certain level (e.g., at least about 26% by volume, and preferably at least about 28% by volume, for most applications, and at least 20% by volume for applications involving passenger cars and trucks and even more preferably, for some applications, greater than about 30% by volume), the overall performance level of the metal matrix composite material is enhanced (i.e., in comparison to metal matrix composite materials having lower filler loadings and used in similar applications) to a level which renders the metal matrix composite material suitable for certain uses or applications, such as brake rotors. It is further believed that the overall performance level may be influenced by one or more of thermal conductivity, heat capacity, wear or abrasion resistance, high temperature strength, density, stiffness, coefficient of friction, elastic modulus, yield strength, hardness, resistance to heat cracking, filler particle size, filler particle distribution, filler particle loading, filler particle geometry, ultimate tensile strength, fatigue strength and fracture toughness.

However, in many passenger car loadings and light truck applications, a brake rotor may require filler material loadings of at least about 30% by volume or more, depending upon the specific performance requirements that the rotor must meet. In this regard, the aforementioned physical properties which contribute to the overall performance of the rotors are related in a complex manner. Specifically, the presence of one filler material verses another filler material in a rotor affects virtually all of the properties discussed above herein. Accordingly, in some cases, a greater amount of one filler material may be required to achieve similar rotor performances in comparison to a different filler material. While the complex interrelationship of properties is difficult to quantify with respect to different rotor performances, one item which is readily quantifiable is the Maximum Operating Temperature ("MOT") which a rotor can experience. For example, under a given set of testing conditions, every rotor can be caused to fail and the temperature at which such rotor fails gives an indication of which application (e.g., front brake rotor or back brake rotor for automobiles) the rotor is suited for. The rotors of the present invention reach unexpectedly high MOT's of at least about 900° F. (482° C.) and above. Specifically, rotors of the present invention readily achieve MOT's of 925° F. (496° C.), 950° F. (510° C.) 1000° C.) and above. These MOT's have never before been achieved by prior art rotors and permit new design/weight formulation to occur. Accordingly, the present invention is a significant achievement in the rotor art because weight savings can be achieved without sacrificing performance.

Although the filler materials that may be used in the brake rotors of the present invention comprise a wide variety of shapes, sizes and geometries (e.g., particulate, fibers, cloth etc.), a preferred type of filler material is particulate or powdered filler material. Such filler material usually has an average diameter of about 1 to 5,000 microns and preferably has an average diameter of about 5 to 500 microns. Several tests have indicated that equiaxed or rounded filler materials may be desirable and may provide enhanced brake rotor performance.

A preferred embodiment of the present invention comprises a metal matrix composite brake rotor comprising an aluminum metal matrix embedding a silicon carbide filler material which comprises at least about 26% by volume of the brake rotor for most applications, and at least about 20% by volume for applications involving passenger cars and trucks and even more preferably, at least of 30% by volume for some more severely performed applications. The filler material may be in a wide variety of forms and sizes. A particularly preferred silicon carbide filler is silicon carbide particulate. The silicon carbide filler material may be present as a mass of filler material or a preform and at least one of an infiltration enhancer, infiltration enhancer precurser and infiltrating atmosphere may be located within the mass of filler material or preform.

Another preferred embodiment of the present invention comprises a metal matrix composite brake rotor comprising an aluminum metal matrix embedding an alumina filler material which comprises at least about 26% by volume of the brake rotor for most applications, and at least about 20% by volume for applications involving passenger cars and trucks and even more preferably, at least of 30% by volume for some more severely performed applications. The filler material may be in a wide variety of forms and sizes. A particularly preferred form of alumina filler material is particulate alumina. The alumina filler material may be present as a mass of filler material or a preform and at least one of an infiltration enhancer, infiltration enhancer precursor and infiltrating atmosphere may be located within the mass of filler material or preform.

Although the present disclosure focusses primarily upon aluminum matrix metals, it should be understood that any metal may be used as the matrix metal in the brake rotor of the present invention. Representative matrix metals include, but are not limited to, aluminum, magnesium and titanium.

Moreover, although the present disclosure focusses primarily upon metal matrix composite materials, it should be understood that macrocomposite materials which include a metal matrix composite material which is integrally attached or bonded to at least one other material (e.g., a ceramic material, a ceramic matrix composite material, a metal etc.) may be used as the brake rotor of the present invention.

Still further, ceramic matrix composite rotors made according to various methods including these methods discussed above relating to the Commonly Owned Patents and Patent Applications, also function as desirable rotors (e.g., give unexpectantly high MOT's).

The above disclosure is directed generally to brake rotors for ground vehicles. In view of this, the lower end of the applicable filler material range has been generally limited to about 26% by volume, where the increased performance of the brake rotors justifies their use in a wide variety of ground vehicles (e.g., automobiles, trucks, trains, trolleys, motorcycles, military vehicles and all other ground vehicles that use brake rotors). The lower end of the filler material range which may be used in the brake rotors of the present invention when the end use of the brake rotors is for passenger cars and trucks has been limited to about 20% by volume. This is because the necessary performance level for brake rotors in some passenger cars and trucks is, typically, not as high as in other types of ground vehicles (e.g., heavy trucks, buses and trains). Accordingly, when the brake rotor of the present invention is intended for use in passenger cars and trucks (or in any other application which requires an equivalent or lesser amount of brake rotor performance), a filler material loading of at least about 20% may be necessary to achieve the required performance levels.

However, in many passenger car and light truck applications, a brake rotor may require filler material loadings of at least about 30% by volume or more, depending upon the specific performance requirements that the rotor must meet. In this regard, the aforementioned physical properties which contribute to the overall performance of the rotors are related in a complex manner. Specifically, the presence of one filler material verses another filler material in a rotor affects virtually all of the properties discussed above herein. Accordingly, in some cases, a greater amount of one filler material may be required to achieve similar rotor performances in comparison to a different filler material. While the complex interrelationship of properties is difficult to quantify with respect to different rotor performances, one item which is readily quantifiable is the Maximum Operating Temperature ("MOT") which a rotor can experience. For example, under a given set of testing conditions, every rotor can be caused to fail and the temperature at which such rotor fails gives an indication of which application (e.g., front brake rotor or back brake rotor for automobiles) the rotor is suited for. The rotors of the present invention reach unexpectedly high MOT's of at least about 900° F. (482° C.) and above. Specifically, rotors of the present invention readily achieve MOT's of 925° F. (496° C.), 950° F. (510° C.) 1000° F. (538° C.) and above. These MOT's have never before been achieved by prior art rotors and permit new design/weight formulation to occur. Accordingly, the present invention is a significant achievement in the rotor art because weight savings can be achieved without sacrificing performance.

The predominant failure mode of composite material brake rotors and particularly metal matrix composite brake rotors is by surface scuffing. As a brake rotor is subjected to progressively more severe conditions (e.g., high inertial loads), the temperature of the brake rotor continues to rise until it reaches a temperature at which a glaze (typically formed on the rubbing surfaces of the rotor at preburnish, for example, as Section 6.3 Preburnishment of SAE J212) on the rotor surface breaks down and scuffing ensues. The temperature at which the breakdown occurs is referred to as the Maximum Operating Temperature or MOT. The breakdown of a rotor accompanies excessive noise, sparks and dust. The rotor breakdown is followed by rapid wear of the pads and a rise in temperatures measured by the pad thermocouples (as discussed further below). The Maximum Operating Temperature or MOT is primarily dependent on the material composition and not on the rotor design or the test conditions.

Figure 3:
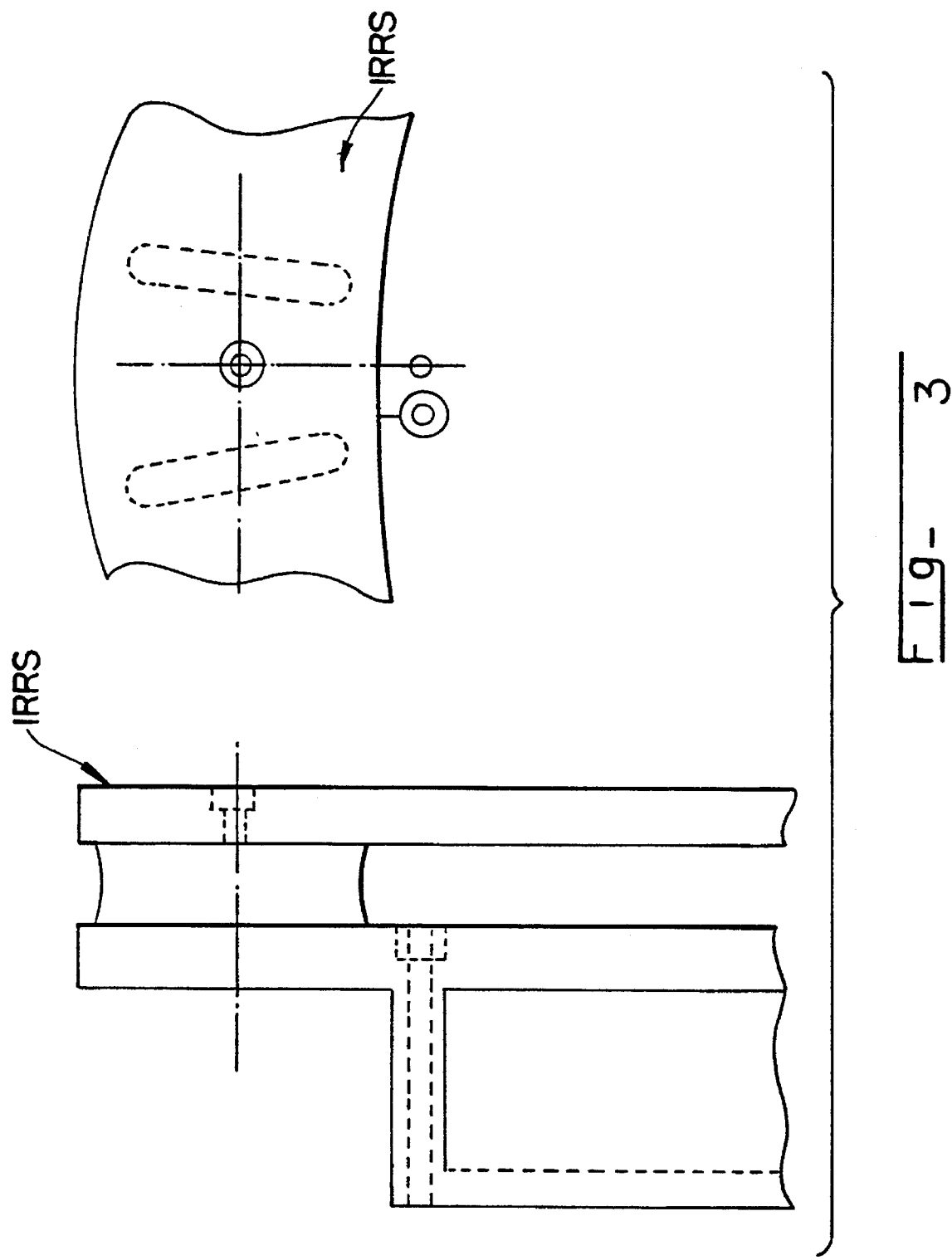
FIG. 3 is a schematic of the thermocouple placement in the rotor during the determination of the MOT and corresponds to a vented front brake rotor for the 1991 model year Ford Escort.
Figure 4A:
FIG. 4 is taken from SAE J212 and is a schematic of the thermocouple placement in the brake pad during the determination of the MOT.
Figure 4C:
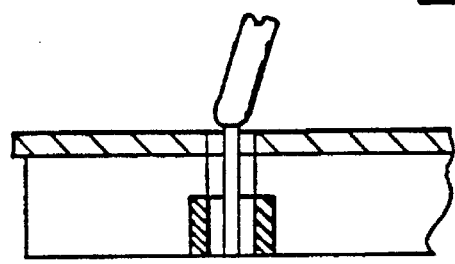
Figure 4B:
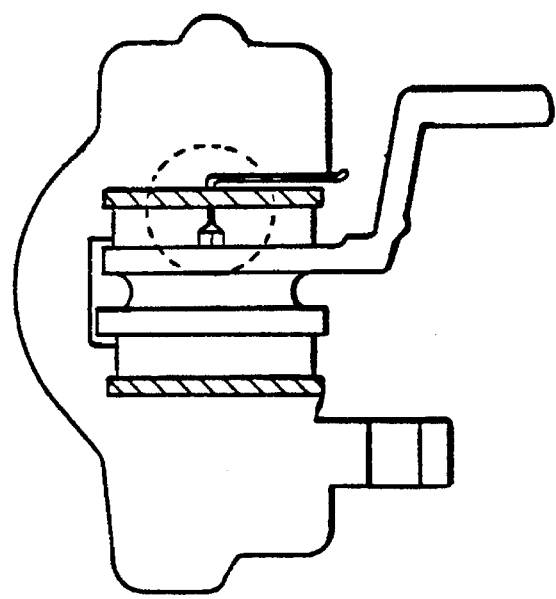

The Maximum Operating Temperature or MOT of a material as a brake rotor or disc is determined using dynamometer tests adopted from SAE J212, "Brake System Dyanamometer Test Procedure"—Passenger Cars—SAE J212 JUN80, SAE 1980 (which is herein incorporated by reference), with some modifications. The current SAE J212 test has two fade/recovery sequences, each conducted at a cooling air speed of 8 mph (12.8 km/h). In the present test, an additional fade/recovery sequence is added at a cooling air speed of 2 mph (3.2 km/h). The rubbing surface temperature of the test rotor is measured by a thermocouple located 0.040 inch (1 mm) below the surface at the center of the inboard side, since most of the failures in the metal matrix composite rotors has been determined to initiate on this side (this rubbing surface is designated as the inner rotor rubbing surface or IRRS). A second thermocouple is located at the intersection of the outer rubbing surface and the rotor hub. This thermocouple is also recessed 0.040" (1 mm) under the rotor surface. Both braking pads are fitted with thermocouples located at the center of each pad, approximately 0.040" (1 mm) under the rubbing surface. For examples of the placement of thermocouples in the brake rotor and brake pads, see FIGS. 3 and 4, respectively. FIG. 3 is a schematic of the thermocouple placement in the rotor during the determination MOT and corresponds to a vented front brake rotor for 1991 model year Ford Escort. FIG. 4 is taken from SAE J212 and is a schematic of the thermocouple placement in the brake pad during the determination of the Maximum Operating Temperature or MOT.

The Maximum Operating Temperature or MOT of a material is determined during the fade segments of the modified SAE J212 test and, therefore, the fade segments are described in detail. There are three fade segments in the test. The test conditions, except for the inertial load, during each fade segment are summarized in Table 1.

TABLE 1

Test Conditions During Fade Segments

| Test Conditions | | | |
|---|---|---|---|
| Initial IRRS Temp., °F. | 150 (65.5° C.) | 150 (65.5° C.) | 150 (65.5° C.) |
| Initial Speed, mph | 60 (97 km/h) | 60 (97 km/h) | 60 (97 km/h) |
| Deceleration, ft/s$^2$ | 15 (4.6 m/s$^2$) | 15 (4.6 m/s$^2$) | 15 (4.6 m/s$^2$) |
| No. of stops | 10 | 15 | 15 |
| Cycle Time, s | 35 | 35 | 35 |
| Cooling Air Speed, mph | 8 (12.8 km/h) | 8 (12.8 km/h) | 2 (12.8 km/h) |

An inertial load of at least that specified by Section 5.7, "Test Moment of Inertia" of SAE J212 is used during the determination of Maximum Operating Temperature or MOT for a particular rotor material. If that inertial load is insufficient to cause the failure of the rotor a higher inertial load is applied on the rotor until failure is observed. The temperature measured at failure corresponds to Maximum Operating Temperature or MOT.

The tests for determining Maximum Operating Temperature or MOT are conducted using compact dynamometers, for example, with DC drives and at commercial laboratories (e.g., Link Testing Laboratory and Greening Testing Laboratory). The speed, acceleration (or deceleration), torque, cooling air speed, cooling air temperature, rotor and pad temperatures are continuously monitored and recorded.

Before a test to determine the Maximum Operating Temperature or MOT of a rotor material, the rotor and the mating pads are thoroughly characterized for:

1. weight
2. dimensions, particularly the rotor thickness
3. surface roughness
4. density
5. microstructure and reinforcement loading After the Maximum Operating Temperature or MOT for a rotor material is determined, all of the above parameters are remeasured to assess the damage and wear to the rotor and the pads.

The following Examples demonstrate certain preferred fabrication techniques for forming brake rotors according to the present invention, however, these Examples should be viewed as being illustrative of the invention and not be viewed as limiting the scope of the invention as defined in the appended claim.

The following Examples further demonstrate the unexpected superior performance of brake rotors made according to the present invention. Specifically, never before have metal matrix composites (e.g., especially aluminum metal matrix composite materials) and ceramic matrix composite materials been fabricated to function as desirable brake rotor materials. The present invention is a significant enhancement to the art.

EXAMPLE 1

The present Example demonstrates the fabrication of cast brake rotors or discs from a metal matrix composite material produced in a "two step" process. In a first step, a highly loaded metal matrix composite is prepared by spontaneously or pressurelessly infiltrating a matrix metal into a permeable mass of filler material and thereafter solidifying the matrix metal. In a second step, the formed highly loaded metal matrix composite is reheated and dispersed into a melt of second matrix metal. The assemblies used to carry out these two steps are depicted schematically in FIGS. 1, 2A, 2B, 2C and 2D, respectively.

Specifically, in reference to FIG. 1, about 25.5 kilograms of a filler material mixture 124 comprising by weight about 98% 500 grit (average particle diameter of about 17 microns) super strong "39 CRYSTOLON®" green silicon carbide particulate (Norton Co., Worcester, Mass., and hereinafter "SiCp") and about 2 percent −100 mesh (particle diameter less than about 150 microns) magnesium powder (−100 mesh, Hart Metals Materials, Rumson, N.J.) was blended for about 15 minutes in an approximately 1 cubic foot (28.32 liter) capacity V-blender.

The interior of a graphite mold 120 having inner dimensions measuring about 7.25 inches (184 mm) square and about 7 inches (178 mm) high was lined with a graphite foil box 122 made from "PERMA-FOIL™" graphite foil (TTAmerica, Portland, Oreg.). About 4550 grams of the filler material mixture 124 were poured into the lined graphite mold 120 and levelled. An additional piece of graphite foil 126 made of "PERMA-FOIL™" graphite foil (TTAmerica, Portland, Oreg.) measuring about 7 inches (178 mm) square by about 0.015 inch (0.38 mm) thick and having five through holes 129 (only three depicted in FIG. 1) was placed on top of the levelled filler material mixture 124. A hole in the center of the graphite foil 126 measured about 1.5 inches (38 mm) in diameter while the four remaining holes, one located in the center of each quadrant of the graphite foil, measured about 1 inch (25 mm) in diameter. Magnesium powder 128 (+50 mesh, Hart Metals) was sprinkled evenly over the top of the exposed filler material mixture 124 at each of the five holes. Two ingots of a first matrix metal 130 comprising by weight about 10 percent silicon and the balance aluminum and each measuring about 6 inches (152 mm) square by about 2 inches (51 mm) thick, were stacked on top of the graphite foil 126 to form a setup. Five additional and substantially equivalent setups were then formed.

The six setups comprising the lined graphite molds 120 (only one depicted in FIG. 1) and their contents were then placed into a graphite tray 136 measuring about 22.25 inches (565 mm) wide by about 42.63 inches (1083 mm) long by about 2 inches (51 mm) high to form a lay-up.

The graphite tray 136 and its contents were placed into a retort lined resistance heated furnace. The retort door was closed, and a nitrogen gas flow rate of about 70 standard cubic feet per hour (1982 liters per hour) was established through the retort chamber at about one pound per square inch (0.0703 kilograms per square centimeter) overpressure. The furnace and its contents were then heated from about room temperature to about 200° C. at a rate of about 200° C. per hour; held at about 200° C. for about 3 hours; heated from about 200° C. to about 550° C. at about 150° C. per hour; held at about 550° C. for about 2 hours; heated from about 550° C. to about 790° C. at about 450° C. per hour; held at about 790° C. for about 16 hours; and cooled from about 790° C. to about 680° C. at about 250° C. per hour. During the heating sequence and while the nitrogen flow rate was maintained, the matrix metal alloy spontaneously or pressurelessly infiltrated the filler material mixture to produce a highly loaded metal matrix composite.

The graphite tray 136 and its contents were retrieved from the furnace at a temperature of about 680° C. and placed on a heat sink made from graphite plates. The still-molten carcasses of matrix metal were covered with a ceramic blanket insulation to establish a temperature gradient during cooling to directionally solidify the formed highly loaded metal matrix composites. After cooling to substantially room temperature, the formed metal matrix composite bodies and the carcasses of matrix metal were removed from their respective graphite boats, and the composite bodies comprising highly loaded silicon carbide reinforced aluminum metal matrix composite (hereinafter "SiCp/Al MMC") were separated from the carcasses.

Figure 2A:
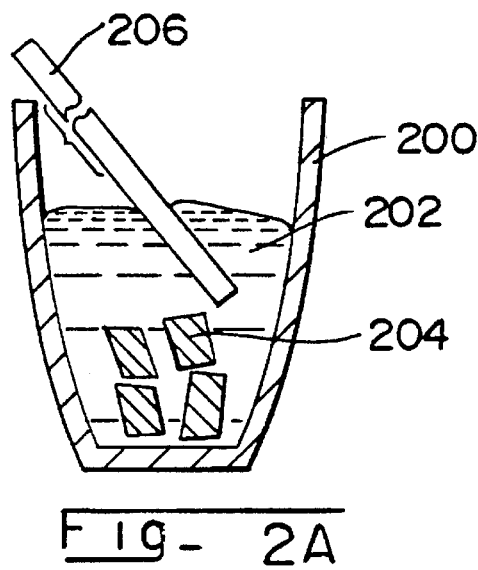
FIG. 2A is a cross-sectional schematic view which shows the introduction of the highly loaded metal matrix composite material into the melt comprising the second matrix metal contained within a crucible and the crushing of the highly loaded metal matrix composite material.
Figure 2B:
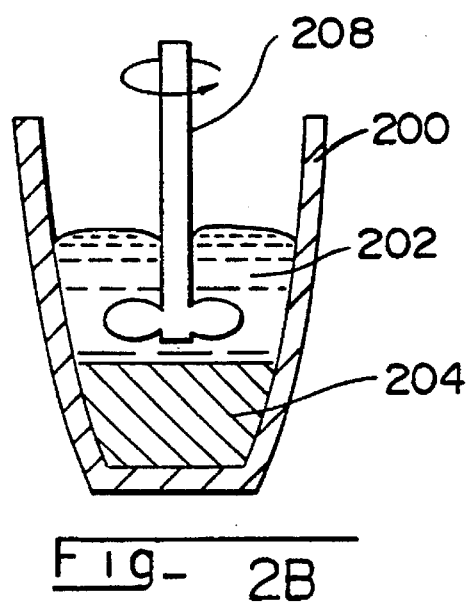
FIG. 2B is a cross-sectional schematic view which shows the introduction of a stirring means into the crucible containing molten first and second matrix metals and the filler material of the highly loaded metal matrix composite material.
Figure 2C:
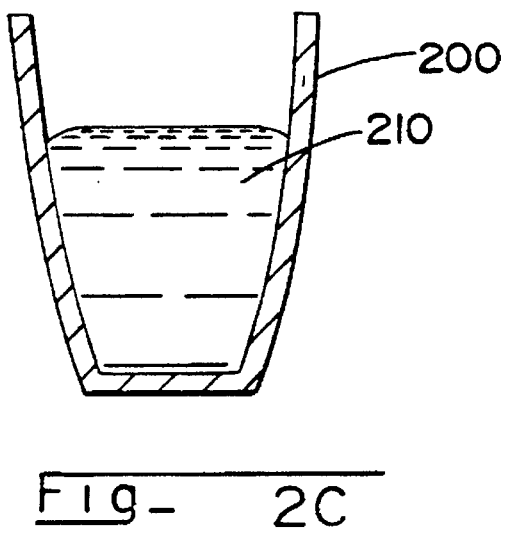
FIG. 2C is a cross-sectional schematic view which shows a formed metal matrix composite suspension.
Figure 2D:
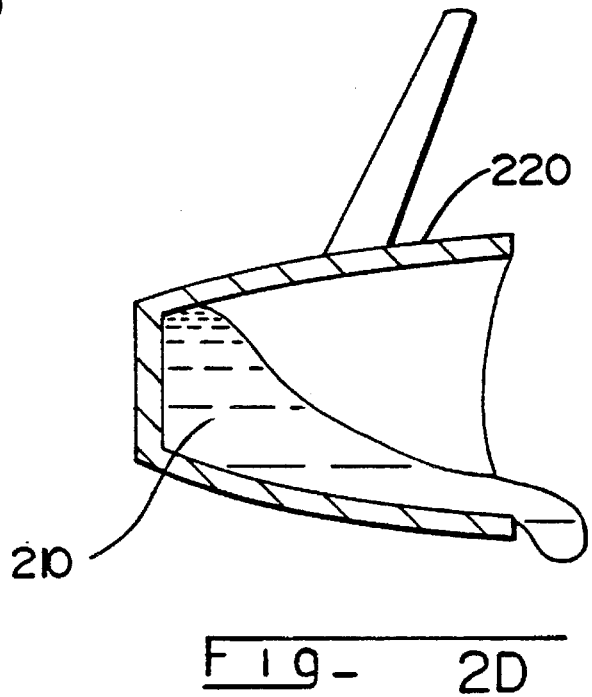
FIG. 2D is a cross-sectional schematic view which shows the pouring of the metal matrix composite suspension from a ladle to form a cast metal matrix composite disk brake rotor.

With reference to FIG. 2A, several second matrix metal ingots weighing about 99 kilograms (218 pounds) and comprising by weight about 10 percent silicon and the balance aluminum were placed into a silicon carbide crucible 200 measuring about 21 inches (533 mm) in inner diameter at the top, about 10 inches (254 mm) in inner diameter at the base, and about 26 inches (660 mm) high. The crucible 200 was in an oil fired remelting furnace chamber. Once the second matrix metal ingots had melted to form a body of molten second matrix metal 202, a rotary graphite lance (not shown in FIG. 2A) was inserted into the bottom of the resultant melt and nitrogen gas was flowed through the melt to degas the melt. Then, surface dross was scraped from the surface of the melt and about 36.3 kilograms (80 pounds) of regularly shaped pieces of highly loaded SiCp/Al MMC 204 (dried overnight at about 300° C. and preheated to about 450° C.), formed as described above, were added to the melt. During the melting of the initial pieces of the highly loaded SiCp/Al MMC 204, additional pieces of the highly loaded SiCp/Al MMC 204 were added to the contents of the crucible and melted. A total of about 173 kilograms (381 pounds) of highly loaded SiCp/Al MMC 204 were added to the body of molten second matrix metal 202 in the crucible. During the melting of the highly loaded SiCp/Al MMC 204, a preheated stainless steel rod 206 (shown in FIG. 2A) coated with commercially available mold wash (to minimize any interactions between the stainless steel rod 206 and the contents of the crucible) and measuring about 1 inch (25 mm) in diameter and about 60 inches (1524 mm) long was inserted into the crucible and used to disperse the highly loaded SiCp/Al MMC 204. The coated stainless steel rod 206 was removed from the crucible and, as depicted in FIG. 2B, a mixing unit 208 was then placed into the crucible, said mixing unit 208 comprising an about 6 inch (152 mm) diameter stainless steel dispersion blade (Hockmeyer Equipment Co., Harrison, N.J., Style F) coated with plasma sprayed alumina (PP-30 by Standard Engineering and Machine Co., Wilmington, Del.) and mounted to an about ⅝ inch (16 mm) diameter, 36 inch (914 mm) long shaft. While maintaining the temperature of the crucible and its contents at about 650° C., the mixing unit 208 was rotated at about 1050 rpm for about 1 hour by using an about 1.5 horsepower air motor (Eclipse System Inc., Franklin, N.J., Model No. 9-4300-14A) attached thereto (not shown in FIG. 2b) and located external to the furnace thereby forming a diluted SiCp-matrix metal suspension 210, depicted in FIG. 2C. The suspension 210 comprised the former highly loaded SiCp/Al MMC 204 now substantially uniformly dispersed within the second matrix metal. The mixing unit 208 was removed from the SiCp-matrix metal suspension 210 and the oxide fillers on top of the suspension was removed by skimming. A portion of the metal matrix composite suspension 210 was cast, using a ladle 220, as depicted in FIG. 2D, into about fifteen conventional sand molds to cast brake rotors or disc for the 1991 model year "ESCORT" compact size automobile. After cooling to substantially room temperature, the about fifteen cast brake rotors or disc comprising the SiCp/Al MMC were removed from the molds. The loading of the silicon carbide filler material in each of the cast SiCp/Al MMC brake rotors or disc was about 30 percent by volume.

EXAMPLE 2

The present Example demonstrates, among other things, a method for forming a metal matrix composite brake rotor or disc with a Maximum Operating Temperature (MOT) of at least about 482° C. (900° F.). The present Example presents the method for forming an aluminum oxide particulate reinforced aluminum metal matrix composite brake rotor or disc. The formation of the aluminum oxide particulate reinforced aluminum metal matrix composite (also designated "$Al_2O_3p$ MMC") rotor or disc includes, among other things, filler material preparation, preform formation, and spontaneous infiltration of the preform with a molten matrix metal. The present Example also presents the Maximum Operating Temperature (MOT) of the $Al_2O_3p$/Al MMC brake rotor or disc as determined by using the modified SAE J212 testing procedure.

A pressing mixture comprising by weight about 94.33 percent C-73 unground aluminum oxide (Alcan Chemicals, a division of Alcan Aluminum Corporation Cleveland, Ohio and hereinafter "C-73 "$Al_2O_3p$"). about 2.83 weight percent −325 mesh (particle diameter less than about 45 microns) ground magnesium powder (Hart Corporation, Tamaque, Pa., and hereinafter "Mgp"), about 2.83 weight percent "LANXIDE" CERASET®-SN" polyureasilazane pre-ceramic polymer (Lanxide Corporation, Newark, Del.) and 0.01 percent "DICUP™-" dicumyl peroxide (Hercules Incorporated, Wilmington, Del.) was prepared.

The preparation of a pressing mixture included the preparation of an C-73 $Al_2O_3p$-Mgp mixture. Specifically, about 6060 grams of a material mixture comprising by weight of about 39.53 percent C-73 $Al_2O_3p$ (Alcan Chemicals of Alcan Aluminum Corporation, Cleveland, Ohio), about 1.19 percent −325 mesh (particle diameter less than about 45 microns) Mgp (Hart Corporation, Tamaque, Pa.) and about 59.29 percent ⅜ inch (9.5 mm) diameter by about ⅜ inch (9.5 mm) long alumina milling media were placed into an about 2-gallon (7.6 liter) capacity ceramic milling jar (Standard Ceramic Supply Co., Pittsburgh, Pa.). The ceramic milling jar and its contents were placed on a jar mill (ROMCO, Poughkeepsie, N.Y.) for about 2 hours. The ceramic jar was then removed from the jar mill and its contents were passed through a 20 mesh (average opening of about 850 microns) sieve to separate the alumina milling media from the C-73 $Al_2O_3p$-Mgp mixture. The C-73 $Al_2O_3p$-Mgp mixture was then set aside.

Simultaneously, a pre-ceramic polymer binder was prepared. Specifically, about 120 grams of a mixture comprised by weight of about 99.5 percent "LANXIDE™ CERASET™-SN" polyureasilazane pre-ceramic polymer and about 0.5 percent "DICUP®-R" dicumyl peroxide were combined in a "NALGENE®" 1-pint (0.47 liter) plastic jar. The sealed plastic jar and its contents were then placed on a jar mill and roll mixed for about 30 minutes, that is, until the dicumyl peroxide had substantially completely dissolved into polyureasilazane pre-ceramic polymer. The contents of the plastic jar were then ready to be combined with the C-73 $Al_2O_3p$-Mgp mixture as a binder.

About 2060 grams of the C-73 $Al_2O_3p$-Mgp mixture were then placed into the mixing bowl of a Model RV02 "EIRICH®" mixer (Eirich Machines, Maple, Ontario, Canada). The speed of the mixing paddles was then set at mixing speed setting 1, low. Simultaneously, the about 120 grams of the binder comprising the pre-ceramic polymer and the dicumyl peroxide were placed into a syphon cup of a Model 62 Binks spray gun (Binks Corporation, U.S.A.). As the C-73 $Al_2O_3$p-Mgp mixture was agitated in the mixing bowl, about 40 grams of the binder were sprayed onto the C-73 $Al_2O_3$p-Mgp mixture at a rate of about 13 grams per minute. The air pressure supply to the spray gun was at about 40 psi (276 kilopascal). After the binder had been sprayed onto the C-73 $Al_2O_3$p-Mgp mixture, the mixer was turned off. The sidewalls of the mixing bowl were then scrapped so that the C-73 $Al_2O_3$p-Mgp-binder mixture was in the bottom of the mixing bowl. The mixing bowl was then covered and the mixer was set at a 4 minutes. The C-73 $Al_2O_3$p-Mgp-binder mixture was then screened through a 20 mesh (average opening of about 850 microns) sieve which produced a pressing mixture. The pressing mixture was then placed into a sealable plastic bags (e.g., "ZIPLOC®" plastic bags) for storage until it could be used for preform formation.

A four-piece pressing mold with major components machined from Grade ATJ graphite (Union Carbide Corp., Cleveland, Ohio) was fabricated to form preforms from the pressing mixture. The pressing mold 501 is depicted in a cross-sectional schematic in FIG. 5 and comprised a base plate 502, a mandrel 504, a mold wall 503, and a mandrel extension 505. The base plate 502, the mandrel 504 and the mold wall 503 were machined from Grade ATJ graphite; however, the mold mandrel extension 506 was machined from commercially available aluminum.

Base plate 502 had an outer diameter measuring about 13 inches (330 mm), an inner diameter of about 1.75 inches (44.5 mm) and a height of about 0.5 inch (13 mm). The base plate 502 also had a lip measuring about 0.25 inch (6.4 mm) high and extending about 0.75 inch (19 mm) in from the 13 inch (330 mm) outer diameter toward the inner diameter. The machined surface finish of the base plate 502 was about 63 rms.

Mandrel 504 comprised a base plate engaging portion, a hub small diameter defining portion and a hub large diameter defining portion. The hub small diameter defining portion was located between the base plate engaging portion and the hub large diameter defining portion. The three portions also shared a common axis of rotational symmetry. The base plate engaging portion measured about 1.75 inches (44.5 mm) in diameter and was about 0.5 inch (13 mm) high. The hub small diameter defining portion measured about 2.125 inches (53.98 mm) in diameter and about 0.46 inch (11.7 mm) high. The hub large diameter defining portion had a diameter measuring about 4.32 inches (109.7 mm) at about 2.75 inches (70 mm) at the end of the mandrel 504 farthermost from the base engaging portion. The hub large diameter defining portion also had an about 5° draft extending from the 4.32 inches (109.7 mm) end toward the hub small diameter defining portion.

Mold wall 502 comprised three defining diameters including an outer diameter, an intermediate diameter and an inner diameter. The outer diameter and the intermediate diameter defined a thin wall portion measuring about 4.25 inches (108 mm) high while the outer diameter and the inner diameter defined thick wall portion measuring about 1.25 inches (31.8 mm) high. The intermediate diameter mold wall 502 measuring about 9.63 inches (245 mm) of was measured about 1.25 inches (31.8 mm) from the portion of the mold wall 502 that engaged the base plate 502. An about 2° draft was machined on the inner diameter of the thick wall portion and the inner diameter of the thin wall portion of the mold wall 502.

The mold mandrel extension 505, as mentioned earlier, was machined from commercially available aluminum.

Mold mandrel extension 505 had a diameter measuring about 4.32 inches (109.7 mm) and a height of about 0.5 inch (13 mm). Machined in the center of mold mandrel extension 505 was alignment pin 506 measuring about 0.25 inches (6.4 mm) in diameter.

Figure 5:
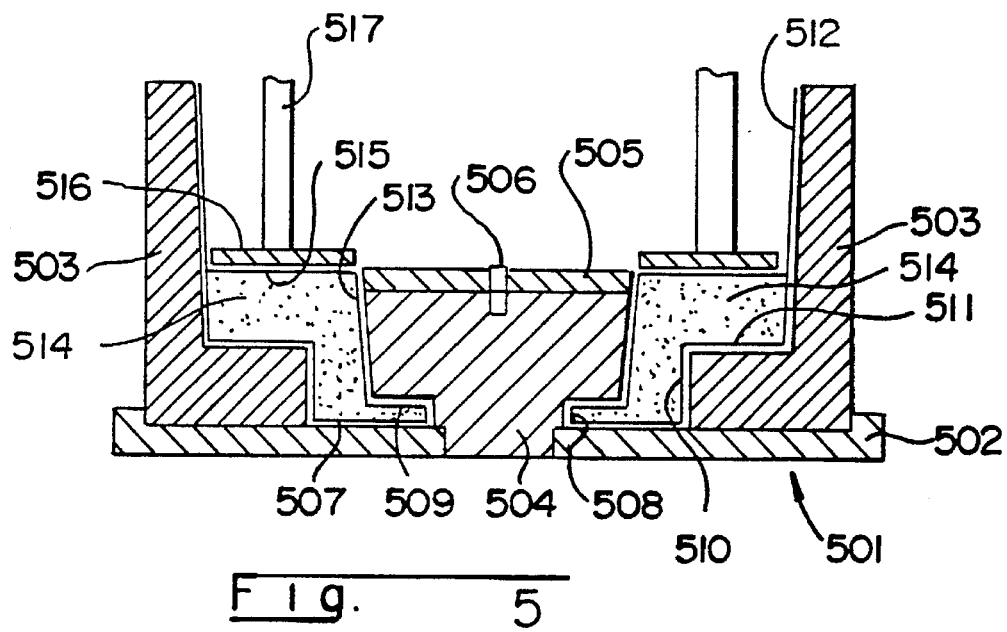
FIG. 5 is a cross-sectional schematic of a pressing mold used in formation of metal matrix composite bodies of Example 2.

Base plate 502, mandrel 504, mold wall 503 and mold mandrel extension 506 were assembled as schematically depicted in FIG. 5 in preparation for pressing a preform from the pressing mixture comprising the C-73 $Al_2O_3$p-Mgp-binder mixture.

In preparation for pressing a green preform, pressing mold 501 was lined with "PERMAFOIL™" graphite foil (TTAmerica, Portland, Oreg.) measuring about 0.010 inch (0.25 mm) thick and designated in FIG. 5 with by numerals 507, 508, 509, 510, 511, 512 and 513. The graphite foil lining of pressing mold 501 facilitated the release of the preform 514 formed from pressing mold 501.

After the pressing mold 501 had been lined with the graphite foil, some pressing mixture was placed into the lower portion of pressing mold 501. The press mixture was gently handpacked around the hub smaller diameter defining portion of mandrel 504. Additional pressing mixture was placed into the pressing mold 501. The additional pressing mixture was then first gently packed using a commercially available foam brush, then leveled and finally tamped using a tamping tool machined from aluminum. The pressing mixture was then leveled to coincide with the top surface of mold mandrel extension 505. An annulus 515 comprising "PERMAFOIL™" graphite foil (TTAmerica, Portland, Oreg.) was then placed onto the pressing mixture. A punch 516, also having an annulus shape, and machined from commercially available aluminum, was engaged with the annulus 515 within the pressing mold 501. Four load transferring rods 517 were then attached to punch 516. The load transferring members 517 were evenly spaced along the annulus of punch 516. Pressing mold 501 and its contents were then placed on a Carver 50-ton laboratory press (Fred S. Carver, Inc., Menome Falls, Wis.). A load was applied to the pressing mixture by engaging the platens of the laboratory press with the mold base 502 and the four load transferring rods 517. The load was adjusted to produce a pressure of about 100 psi (689.5 kPa) on the pressing mixture and was maintained for about 30 seconds.

After the load was removed from the pressing mixture, the pressing mold 501 and its contents were placed into an air atmosphere furnace to cure the pre-ceramic polymer binder within the pressing mixture. The curing was effected by heating the furnace and it contacts at a rate of about 100° C. per hour to about 150° C., holding the furnace and its contents at about 150° C. for about 2 hours and cooling the furnace and its contents to about 85° C. at about 100° C. per hour. Pressing mold 501 and its contents were then removed from the air atmosphere furnace. While still at about 85° C., the pressing mold 501 was disassembled and preform 514 was removed. The shape of preform 514 corresponded to the shape of a brake rotor or disc. Preform 514 was comprised of the C-73 $Al_2O_3$p-Mgp mixture bonded with cured pre-ceramic polymer. Preform 514 was stored at about 85° C. prior to incorporation into a lay-up to form the C-73 $Al_2O_3$p/ Al MMC brake rotor or disc.

Figure 6:
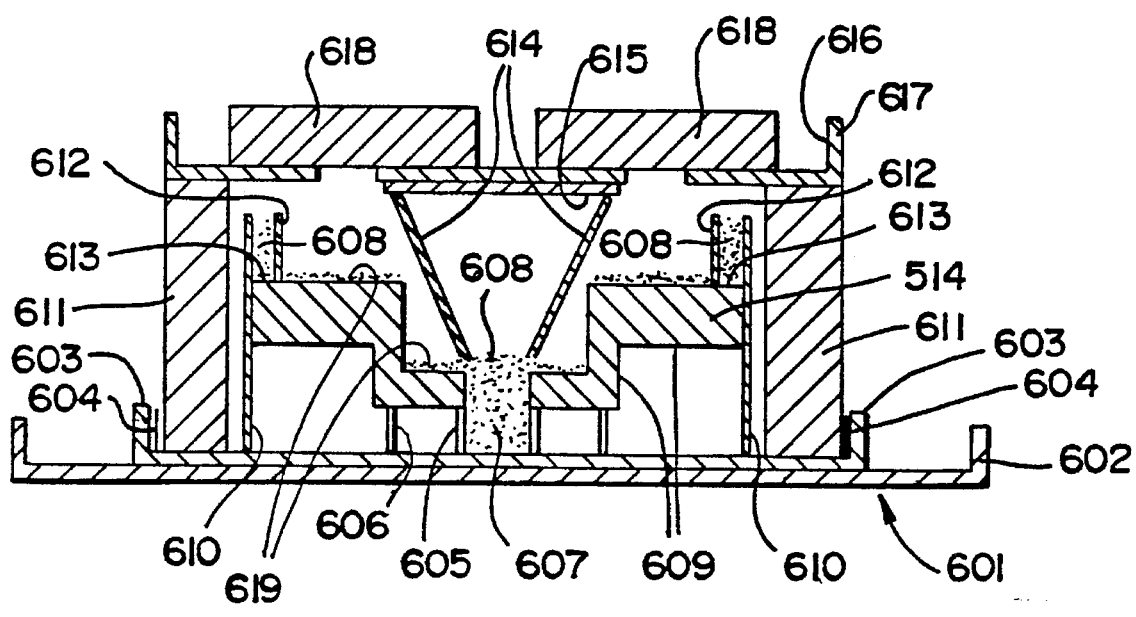
FIG. 6 is a cross-sectional schematic of the lay-up used to form the metal matrix composite brake rotor or disc of Example 2.

Preform 514 was infiltrated with an aluminum matrix metal using the "PRIMEX™" pressureless metal infiltration process to form a C-73 $Al_2O_3$p/Al MMC brake rotor or disc. A cross-sectional schematic of the lay-up 601 used to infiltrate preform 514 is illustrated in FIG. 6. Lay-up 601 comprised preform 514, catch tray 602, setup tray 603, setup tray lining 604, small preform support ring 605, large preform support ring 606, barrier powder 607, barrier mixture 608, barrier coating 609 applied to the outer surfaces of preform 514, cylinder 610, support boxes 611, matrix metal containment 612, sealing beads 613, matrix metal guide cone 614, shim 615, matrix metal supply tray 617, matrix metal supply tray lining 616 and matrix metal ingots 618.

The inner dimensions of catch tray 602 measured about 21.25 inches (539.8 mm) long, 12.5 inches (317.5 mm) wide and about 2 inches (51 mm) high. Catch tray 602 had walls of two thicknesses. The walls along the 21.25 inch (539.8 mm) sides measured about 0.25 inch (6.4 mm) thick, and the walls along the about 11.5 inch (305 mm) sides measured about ⅜ inch (9.5 mm).

Setup tray 603 measured about 19.5 inches (495.3 mm) long, about 9.875 inches (250.8 mm) wide and about 2 inches (51 mm) deep. Unlike catch tray 602, setup tray 603 had walls of a single thickness. The walls measured about 0.25 inch (6.4 mm) thick.

Setup tray lining 604 within setup tray 603 comprised "GRAFOIL®" graphite foil (Union Carbide Corporation, Cleveland, Ohio) measuring about 0.015 inch (0.38 mm) thick. Setup tray lining 604 substantially covered the inner surfaces of setup tray 604.

Small preform support ring 605 and large preform support ring 606 comprised "PERMAFOIL™" graphite foil (TTAmerica, Portland, Oreg.) measuring about 0.01 inch (0.25 mm) thick. Strips of graphite foil measuring about 0.25 inch (6.4 mm) high were cut and shaped into rings corresponding substantially to the inner and outer diameter of the hub portion of the preform 514 (see FIG. 6 for clarification). Small preform support ring 605 and large preform support ring 606 were placed concentrically within setup tray 603 and on setup tray lining 604 to support preform 514 during the pressureless metal infiltration process.

Graphite powder 607 comprised "LONZA®" KS 44 graphite powder (Lonza, Inc., Fairlawn, N.J.).

Barrier coating 609 was applied to preform 514, as is discussed in more detail below, prior to incorporating preform 514 into lay-up 601. Barrier coating 609 comprised at least one of "AERODAG®-G" (Acheson Colloids, Port Huron, Mich.) and "DAG®" 154 colloidal graphite (Acheson Colloids, Port Huron, Barrier mixture 608 comprised by weight about 95 percent 90 grit (average particle diameter of about 216 microns) "38 ALUNDUM®" alumina (Norton Co., Worcester, Mass.) and about 5 percent F-69 glass frit (Fusion Ceramics, Inc., Carllton, Ohio).

Containment cylinder 610 was formed from a piece of "GRAFOIL®" graphite foil (Union Carbide Corporation, Cleveland, Ohio) measuring about 39.4 inches (1000 mm) long, 3.3 inches (80 mm) high and about 0.015 inch (0.38 mm) thick. Containment cylinder 610 was placed concentrically around preform 514 in a manner as depicted in FIG. 6. The graphite foil comprising containment cylinder 610 was secured around preform 514 using commercially available staples by stapling the graphite foil.

Support boxes 611 comprised open ended boxes machined from commercially available graphite and measuring about 6 inches (152 mm) square by about 2.75 inches (69.9 mm) high.

Matrix metal containment wall 612 comprised "PERMAFOIL™" graphite foil (TTAmerica, Portland, Oreg.) material formed into a ring measuring about 1 inch (25.4 mm) tall and placed concentrically with containment cylinder 610 to form a gap measuring about 0.25 inch (6.3 mm) wide along the outermost perimeter of preform rotor 514.

Sealing beads 613 comprised "DAG®" 154 colloidal graphite (Acheson Colloids, Port Huron, Mich.) applied at the outermost perimeter of preform 514 and along the intersection of preform 514 and containment cylinder 610. Barrier material mixture 608 was then placed in the space between matrix metal containment 612 and containment cylinder 610.

Matrix metal guide cone 614 comprised "PERMAFOIL™" graphite foil (TTAmerica, Portland, Oreg.). Matrix metal containment cone 614 was fabricated to facilitate efficient use of molten matrix metal in contact with preform 514 during the pressureless metal infiltration process.

Shim 515 was in engaging contact with matrix metal guide cone 614 and matrix metal supply tray 617 and comprised "PERMAFOIL™" graphite foil (TTAmerica, Portland, Oreg.).

The inner dimension of matrix metal supply tray 617 measured about 13.25 inches (337 mm) long, about 8.5 inches (216 mm) wide and about 1.5 inches (38 mm) deep. As catch tray 602 and setup tray 603, the matrix metal supply tray 617 had walls with two thicknesses. The wall along the 13.25 inch (337 mm) sides measures 0.25 inch (6.3) thick and the walls along the 8.5 inch (216 mm) sides were ⅜ inch (9.5 mm) thick. Within the bottom of matrix metal supply tray 617 were two holes each having about 1 inch (25.4 mm) diameter. The centers of holes were located along the intersection of diagonals in each half of matrix metal supply tray 617. The inner surface of supply tray 617 was lined with matrix metal supply tray lining 616. The supply tray lining comprised "PERMAFOIL™" graphite foil (TTAmerica, Portland, Oreg.) having holes measuring about 1 inch (25.4 mm) diameter and coinciding with the holes within matrix metal supply tray 617.

To prepare preform 514 for incorporation in lay-up 601, all of the surfaces of preform 514 were substantially completely sprayed with a barrier coating 609 comprising "AERODAG®" G colloidal graphite (Acheson Colloids, Port Huron, Mich.). Three applications of "DAG®" 154 colloidal graphite (Acheson Colloids, Port Huron, Mich.) were brushed to the surfaces of preform 514 which would face away from matrix metal ingots 618 when preform 514 was incorporated into lay-up 601. The outer perimeter of preform 514 was also brush coated. Two applications comprising "DAG®" 154 colloidal graphite were brushed onto the surfaces of preform 514 facing matrix metal ingots 518 as depicted in FIG. 6. A third application comprising "DAG®" 154 was brushed onto the surfaces having two applications. While the surfaces were still moist, −50 +100 mesh (having particle diameters between about 150 and 300 microns) magnesium powder was sprinkled onto the surface. This −50 +100 mesh magnesium powder (Hart Co., Tamaqua, Pa.) is designated as 619 in FIG. 6.

After the lay-up 601 was formed, as illustrated in FIG. 6, and comprising a preform 514 weighing about 2000 grams and two matrix metal ingots 618 together weighing about 3500 grams and comprising by weight about 1 weight percent magnesium and the balance aluminum, the lay-up 601 and its contents were placed into a controlled atmosphere furnace. The furnace door was closed, and the furnace and its contents were evacuated to about 30 inches (762 mm) of mercury. The vacuum was ended when nitrogen gas flowing at about 10 liters per minute was introduced into the furnace. The furnace and its contents were then heated from about 150° C. to about 250° C. at about 100° C. per hour, held at about 250° C. for about an hour, heated from about 250° C. to about 450° C. at about 100° C. per hour, held at about 450° C. for about 5 hours, heated from about 450° C. to about 800° C. at about 100° C. per hour and held at about 800° C. for about 6 hours. Throughout the entire heating procedure, a nitrogen flow rate of about 10 liters per hour was maintained. After about 6 hours at about 800° C., the nitrogen flow rate was interrupted and the lay-up 601 was removed from the furnace and transferred to a chill plate. The matrix metal supply tray 617 was removed. A remaining molten matrix metal reservoir was then covered with an about 1 inch (25.4 mm) hot topping mixture comprising "FEEDOL" 9 exothermic hot topping compound (Feesco Corporation, Cleveland, Ohio). The matrix metal that had infiltrated preform 514 was then allowed to solidify during cooling to about room temperature. At about room temperature, lay-up 601 was disassembled further and it was revealed that the matrix metal had infiltrated preform 514 to form a near net shape C-73 $Al_2O_3p/Al$ MMC composite rotor or disc.

The resulting metal matrix composite body was then machined to the specification of front brake rotors or discs compatible with the 1991 Model year Escort automobile (Ford Motor Co., Detroit, Mich.). The surfaces of the brake rotor or disc that would be in contact with braking pads were machined to a surface finish of 63 rms. The thickness of the braking disc measured about 0.8 inch (20 mm).

The brake rotor or disc was subjected to the modified SAE J212 brake system dynamometer test as described in the "Summary of the Invention" and the "Detailed Description of the Invention" sections of the present application. The results of the test indicated that the C-73 $Al_2O_3p/Al$ MMC brake rotor or disc made by the method of the present Example had an unexpected Maximum Operating Temperature (MOT) of about 532° C. (990° F.).

Thus, the present Example demonstrates that a C-73 $Al_2O_3p/Al$ MMC brake rotor or disc (i.e., C-73 UNG alumina embedded by an aluminum magnesium matrix metal) unexpectedly high temperature performance capability. Furthermore, these high temperature performance or operation capabilities indicate that the brake rotor or disc formed by the methods of the present Example are superior to the commercially available metal matrix composite brake rotors or discs. Additionally, these results indicate that brake rotors of disc made by the methods of the present Example can be subjected to higher inertial loading than commercially available metal matrix composite brake rotors or disc.

EXAMPLE 3

The present Example demonstrates, among other things, a method for forming a preform shaped as a brake rotor or disc and spontaneously or pressurelessly infiltrating the shaped preform with molten aluminum alloy to form a silicon carbide particulate reinforced aluminum metal matrix composite (hereinafter in this Example "SiCp/Al MMC") brake rotor or disc that exhibits unexpected superior performance characteristics in accordance with the present invention. Furthermore, the present Example demonstrates that a SiCp/Al MMC brake rotor or disc made in accordance with the present Example has a Maximum Operating Temperature (MOT) of at least about 482° C. (900° C.).

Methods similar to the methods for forming the C-73 $Al_2O_3p/Al$ MMC brake rotor or disc of Example 2 were used to fabricate the rotor of the present Example. The methods of the present Example and Example 2 were identical in at least the following respects: 1) a pressing mixture was prepared; 2) the pressing mixture was formed into a shaped green preform in a pressing mold 501 as depicted in FIG. 5; 3) the green preform was heat treated to form a preform 514 for incorporation into a lay-up similar to the lay-up 601 depicted in FIG. 6; 4) the preform 514 was infiltrated by molten matrix metal by the "PRIMEX™" pressureless metal infiltration process; and 5) the resultant brake rotor or disc was machined prior to subjecting the brake rotor or disc to the modified SAE J212 test to determine the Maximum Operating Temperature (MOT).

The methods of the present Example and Example 2 differed in at least the following respects: 1) the filler material comprised 360 grit (average particle diameter of about 27 microns) "39 CRYSTOLON®" green silicon carbide (Norton Co., Worcester, Mass.); 2) the binder comprised an organic-inorganic binder system comprising a phenolic resin, a diphenyl phosphite and a colloidal silica; 3) the pressed preform was fired at elevated temperatures to at least partially oxidize the silicon carbide filler to give sufficient strength to the preform for handling during incorporation into the infiltration lay-up; 4) the matrix metal comprised an aluminum silicon-magnesium alloy; and 5) the infiltration lay-up did not include the matrix metal supply tray 617 as depicted in FIG. 6, but rather the matrix metal ingot contracted the preform.

The following discussion elaborates on the methods of the present Example which differ from the methods of Example 2.

A first binder mixture was prepared by adding about 7.2 grams of diphenyl phosphite (Aldrich Chemical Co., Milwaukee, Wis.) and about 30 grams of "NYACOL®" 1034A colloidal silica (Nyacol Prod. Inc., Ashland, Mass.) to a plastic jar. After thoroughly mixing the contents of the jar, the first binder mixture was allowed to sit at room temperature for about 30 minutes.

A pressing mixture was prepared by placing about 3000 grams of 360 grit "39 CRYSTOLON®" green silicon carbide particulate (Norton Co., Worcester, Mass.) and about 60 grams of a second binder comprising the developmental "DURITE™" SL-870A liquid phenolic resin (Bordon Chemical, Columbus, Ohio), into the mixing bowl of an Eirich® mixer (Model #RV02, Eirich Machines, Maple, Ontario, Canada). The mixer was turned on low, mixing speed setting 1, and the mixture was subjected to mixing for about 1 minute. After about 1 minute, the mixer was turned off and the mixture was scraped from the sides and bottom of the mixing bowl towards the center of the bowl. Then the mixer was turned onto high, mixing speed setting 2, for about 1 minute. After about 1 minute, the mixer was turned off, the mixture was scraped from the sides and bottom of the mixer bowl towards the center of the bowl and the first binder mixture comprising the diphenyl phosphite-"NYACOL®" 1034A colloidal silica mixture was added to the contents of the mixing bowl. The mixer was turned onto high, mixing speed setting 2, for about 2 minutes. After about 2 minutes, the mixer was turned off and the contents of the mixer bowl was sieved through a 14 mesh (average openings of about 1400 microns) sieve utilizing a RO-TAP® testing sieve shaker (12 inch model, W. S. Tyler, Gastovia, N.C.) to ultimately produce the pressing mixture.

Utilizing a metal spoon, a quantity of the pressing mixture was then placed into the pressing mold 501 depicted in FIG. 5 and described in Example 2. The pressing mixture was leveled within the mold utilizing a soft bristle brush and a straight edge. The pressing mixture within the pressing mold 501 was then compacted into a green preform by subjecting the mixture to a pressure of about 100 psi (689.5 kPa). After subjecting the pressing mixture to a pressure of about 100 psi (689.5 kPa) for about 1 minute, the pressure was released and the pressing mold 501 and its contents were placed into an air atmosphere furnace at temperature of about 150° C. After remaining in the furnace for about 2 hours, the pressing mold 501 and its contents were removed from the air atmosphere furnace, the pressing mold 501 was disassembled and a green preform was recovered.

A bed of 36 grit (average particle diameter of about 710 microns) "38 ALUNDUM®" alumina (Norton Company, Worcester Mass.) was poured into a refractory boat and leveled. The green preform was placed on the bed of 36 grit "38 ALUNDUM®" alumina. The refractory boat and its contents were placed into an air atmosphere furnace at a temperature of about 100° C. The temperature within the furnace was raised from about 100° C. to about 680° C. at about 100° C. per hour, held at about 680° C. for about 5 hours, heated from about 680° C. to about 1200° C. at a rate of about 100° C. per hour. After maintaining a furnace temperature of about 1200° C. for about 5 hours, the furnace and its contents were naturally cooled to about 150° C. and the refractory boat and its contents were removed from the furnace and allowed to cool to about room temperature, thus producing a preform 514.

The preform 514 was incorporated into a lay-up substantially the same as the lay-up 601 depicted in FIG. 6 and discussed in Example 2. However, and as discussed earlier, the matrix metal ingots 618 contacted the preform 514, no −50, +100 mesh Mg powder was applied the surface of the brake rotor or disc preform. The weight of preform 514 comprising fired silicon carbide was about 3000 grams. The weight of the matrix metal was about 4100 grams. The matrix metal used for pressurelessly infiltrating preform 514 comprised by weight about 12 percent silicon, about 5 percent magnesium and the balance comprised aluminum.

The lay-up was then placed into a controlled atmosphere vacuum furnace at a temperature of about 150° C. The furnace and its contents were evacuated to about 30 inches (762 mm) Hg and backfilled with nitrogen gas to about atmospheric pressure. The furnace and its contents were evacuated a second time to about 30 inches (762 mm) Hg and backfilled with nitrogen gas to about atmospheric pressure and a nitrogen gas flow rate of about 10 liters per minute was established through the furnace.

The furnace temperature was increased from about 150° C. to about 825° C. at a rate of about 100° C. per hour. After maintaining a temperature of about 825° C. for about 20 hours, the lay-up was removed from the furnace and treated substantially in accordance with the methods of Example 2.

At room temperature, the lay-up was disassembled to reveal that the aluminum matrix metal had spontaneously infiltrated the preform 514 to form a near-net shape brake rotor or disc. After the brake rotor or disc was machined to the specification for a front brake rotor or disc for a 1991 model year "ESCORT" compact car as described in Example 2, the brake rotor or disc was subjected to testing according to the modified SAE J212 method. The results of that test indicated that the Maximum Operating Temperature for a rotor made according to the methods of the present Example was about 498° C. (928° F.).

While the preceding discussion includes very particular disclosures, various modifications to the disclosure should occur to an artisan of ordinary skill, and all such modifications should be considered to be within the scope of the claims appended hereto.

EXAMPLE 4

The present Example demonstrates the fabrication of cast brake rotors or discs from a metal matrix composite material produced in a "three step" process. The metal matrix composite brake rotors or discs made in accordance with the methods of the present Example comprised composites having filler loadings ranging by volume percent from about 15 percent to about 30 percent at about 5 percent increments. In a first step, a billet comprising highly loaded metal matrix composite integrally attached to excess matrix metal was prepared by spontaneously or pressurelessly infiltrating a sufficient amount of molten matrix metal into a permeable mass of filler material and solidifying the matrix metal. In a second step, the billet comprising the highly loaded metal matrix composite integrally attached to excess matrix metal was reheated above the melting temperature of the matrix metal. The filler material of the highly loaded portion of the billet was then dispersed homogeneously throughout the molten matrix metal, which included some additional matrix metal to produce a lower loaded metal matrix composite. Some of the assemblies for carrying out the first and second steps were substantially the same as those depicted schematically in FIGS. 1, 2A, 2B, 2C and 2D. Some additional assemblies for carrying out the fabrication process are depicted in FIGS. 7, 8, 9A, 9B and 10. In a third or final step, the lower loaded metal matrix composite was remelted and either cast directly into a sand mold to make brake rotors or discs or dispersed further with additional matrix metal before casting into a sand molds to make brake rotors or discs.

About 25.5 kilograms of a filler material mixture comprising by weight about 98% 500 grit (average particle diameter of about 16 microns) round, strong "39 CRYSTOLON®" green silicon carbide particulate (Norton Co., Worcester, Mass., and hereinafter "SiCp") and about 2 percent −325 mesh (particle diameter less than about 45 microns) magnesium powder (Hart Metals Materials, Rumson, N.J.) were blended for about 15 minutes, but no more than about 17 minutes, under an argon-oxygen gas mixture comprising about 2 volume percent oxygen and the balance argon in an approximately 1 cubic foot (28.32 liter) capacity V-blender. This procedure was repeated to produce a sufficient quality of filler material mixture to be used to form billets.

The interior of a graphite mold having inner dimensions measuring about 7.25 inches (184 mm) square and about 7 inches (178 mm) high was lined with a box comprising "PERMA-FOIL™" graphite foil (TTAmerica, Portland, Oreg.). About 4550 grams of the filler material mixture were poured into the lined graphite mold and levelled. About 5.4 grams of −50, +100 mesh of (particle diameters between about 150 microns and 300 microns) magnesium powder (Hart Corporation, Tamaque, Pa.) were sprinkled evenly over the top of the exposed surface of the leveled filler material mixture. Two ingots of matrix metal comprising by weight about 10 percent silicon and the balance aluminum (nominally an Aluminum Association Alloy 360), each measuring about 6 inches (152 mm) square by about 2 inches (51 mm) thick and having a combined weight of about 5460 grams, were stacked on the leveled filler material mixture to form a setup. Five additional and substantially equivalent setups were then formed. The six setups comprising the lined graphite molds and their contents were placed into a graphite tray measuring about 22.25 inches (565 mm) wide, about 42.63 inches (1083 mm) long and about 2 inches (51 mm) high to form a lay-up.

The lay-up comprising the graphite tray and its contents were placed into a retort lined resistance heated furnace. After the retort door was closed, a nitrogen gas flow rate of about 70 standard cubic feet per hour (1982 liters per hour) was established through the retort chamber. The pressure within the retort chamber was maintained at about one pound per square inch (6.895 kPa) above atmospheric pressure. The furnace and its contents were then heated from about room temperature to about 200° C. at a rate of about 200° C. per hour; held at about 200° C. for about 3 hours; heated from about 200° C. to about 550° C. at about 150° C. per hour; held at about 550° C. for about 2 hours; heated from about 550° C. to about 790° C. at about 450° C. per hour; held at about 790° C. for about 16 hours; and cooled from about 790° C. to about 680° C. at about 250° C. per hour. During the heating sequence and while the nitrogen flow rate was maintained, the matrix metal melted and spontaneously or pressurelessly infiltrated the filler material mixture to produce six substantially identical billet comprising highly loaded metal matrix composite integrally attached to excess matrix metal.

The graphite tray and its contents were removed from the furnace at a temperature of about 680° C. and placed on a heat sink comprising graphite slabs. The excess matrix metal of each setup, which was molten, was covered with a commercially available blanket of ceramic insulation to establish a temperature gradient during cooling to directionally solidify and form billets comprising highly loaded metal matrix composite integrally attached to excess matrix metal. After cooling to substantially room temperature, the formed billets were removed from their respective graphite boats. The above procedure was repeated to produce a stockpile of billets to be used as feedstock to produce lower loaded metal matrix composite ingots.

Equipment for producing the lower loaded metal matrix composite is depicted schematically in FIGS. 2A, 28, 2D, 7, 8, 9A, 9B and 10.

Figure 10:
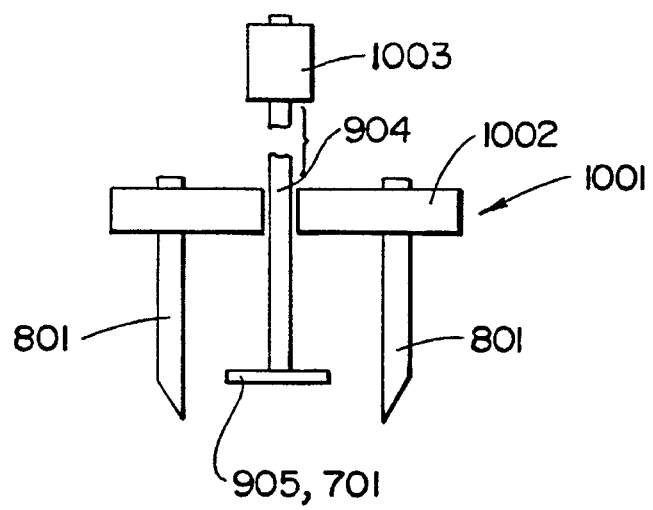
FIG. 10 is a cross-sectional schematic of an impellor furnace cover and attached baffles used in the formation of metal matrix composite bodies according to the methods of Example 4.

FIG. 10 depicts an apparatus 1001 comprising a furnace cover 1002 supporting baffles 801. Furnace cover 1002 was formed from 11 gauge 304 stainless steel. Furnace cover 1002 comprised halves each having an outer diameter of about 28 inches (712 mm) and an inner diameter of about 8 inches (264 mm). Each half of furnace cover 1002 incorporated two slots measuring about 3 inch (76 mm) long and about ¾ inch (19 mm) wide to accommodated baffles 801. The slots were located along a radius about 5.75 inches (146 mm) from the axis of rotational symmetry of furnace cover 1002. The slot spacing was set such that line segments parallel to the 3 inch (76 mm) sides of each slot were perpendicular. Each half of furnace cover 1002 had a thickness of about 1.25 inches (31.8 mm) which was formed by welding about 14 gauge 314 stainless steel strips along its inner and outer diameter. A cover for the hole in furnace cover 1002 was fabricated from a piece of 14 gauge 314 stainless steel measuring about 10 inches (254 mm) square with a slot measuring about 1 inch (25.4 mm) wide and extending from one side of the cover to the center of the cover. This cover aligned with the hole in furnace cover 1002 defined by its 8 inch (204) inner diameter while accommodating the rotating shafts which supported the rotating tools used at least during the dispersion step for forming lower loaded metal matrix composite bodies.

Baffles 801 incorporated in apparatus 1001 were machined from graphite to the configuration depicted in FIG. 8. Prior to incorporation, baffles 801 were subjected to a coating process described commonly owned U.S. Pat. No. 5,242,710, issued Sep. 7, 1993, from U.S. patent application Ser. No. 07/880,479, in the names of Terry Dennis Claar et al. and entitled "Methods for Making Self-Supporting Composite Bodies and Articles Produced Thereby". The subject matter of U.S. Pat. No. 5,242,710 is hereby incorporated by reference in its entirety. The process described in U.S. Pat. No. 5,242,710 was used to produce a titanium carbide coating 802 on substantially all the surfaces of baffle 801. The graphite substrate comprised Grade AXF-5Q graphite (POCO Inc., Decatur, Tex.). To produce the baffle depicted in FIGS. 8 and 10, the graphite was machined about 22 inches (559 mm) long, about 2.75 inches (69.9 mm) wide and about ⅜ inch (9.5 mm) thick. The lower portion 803 of baffle 801 was formed by cutting a segment from the about 22 inches (551 mm) long side to an about 16 inches (406 mm) along opposite side of the graphite piece. Three holes 805 were drilled at the top portion 804 of baffle 801. Each hole had a diameter of about ⅝ inch (15.9 mm).

A first hole 805 was spaced about ¾ inch (19 mm) from the top and about 1.38 inches (35 mm) from each side of baffle 801. A second and a third hole 805 were spaced about 1.75 inches (44.4 mm) from the top and about 0.63 inch (16 mm) from the side of baffle 801. The second and third holes were also spaced about 1.5 inches (38 mm) from each other.

Also depicted in FIG. 10 is rotating means 1003, shaft 904 and blade 905 or 701. Shaft 904 corresponds to the shaft used with blade 905 schematically depicted in FIGS. 9A and 9B. In the present Example, rotating means 1003 comprised a drive unit Model No. HVI-15 (Hockmeyer Equipment Co., Elizabeth, N.C.). Blade 701 is schematically depicted in FIG. 7.

In regard to shaft 904 and blade 905, a more detailed discussion follows. Shaft 904, which measured about 30 inches (762 mm) long and about ⅝ inch (16 mm) in diameter, was cut from 316 stainless steel. Blade 905 had an outermost diameter of about 5 inches (127 mm), for example, the distance between narrowest portion of segments 902D and 902B, and an intermediate diameter of about 3 inches (76 mm), for example, the distance from the axis of rotation of blade 905 to that portion of any of the 902 or 903 which is perpendicular to a diagonal running through the rotational axis. The material used to fabricate blade 905 was about ⅛ inch (3.2 mm) thick. As with shaft 904, blade 905 was fabricated from 316 stainless steel. Shaft 904 was welded to blade 905. Additional features of blade 905 included alternating segments 902 and 903. Segment 903A, 903B, 903C and 903D extend upward while segment 902A, 902B, 902C and 902D extended downward from the plane of blade 905. After blade 905 was welded to shaft 904, both were coated with an alumina material formed by a plasma deposition technique (PP-30 coating applied by Standard Engineering and Machine Co., Wilmington, Del.).

In regard to blade 701 depicted in FIG. 7, blade 701 was machined from commercially available graphite (e.g., Grade AXF-5Q graphite from POCO Graphite Inc., Decatur, Tex.). Blade 701 measured about 6 inches (152 mm) in diameter and about ¾ inch (19 mm) thick. Angles phi and theta marked in FIG. 7 measure about 90° and 45°, respectively. Extensions 703 were formed along blade 701 by machining an about 10/32 inch (7.9 mm) radius 702 every 45° along the outer diameter an about 6 inch (152 mm) diameter disc of graphite. During the machining of radius 702, flat 704 was formed. Flat 704 was substantially perpendicular to radial segment 706. After machining, blade 701 was secured to a ⅝ inch (15.9 mm) diameter rod measuring about 31 inches (787 mm) long and compositionally comprising 316 stainless steel.

About 550 pounds (1213 kg) of ingot casting stock comprising by volume about 30 percent silicon carbide particulate and the balance aluminum matrix metal were produced in accordance with the following discussion. A 600 pound capacity crucible, having an inner diameter measuring about 21 inches (533 mm) and a height measuring about 27 inches (686 mm) made from a commercially available silicon carbide material and contained within an electrical resistance heated furnace, was charged with about 119 pounds (262 kg) of an aluminum alloy comprising by weight about 10 percent silicon and the balance aluminum (nominally Aluminum Association 360 alloy). The crucible, which had been subjected to a prior wash melt in preparation for use, and its contents were heated from about room temperature to about 700° C. in about 12 hours while a cover gas comprising nitrogen flowing at a rate of about 40 standard cubic feet per hour (1133 liters per hour) was provided to the contents of the crucible. Simultaneously, about 486 pounds of billet comprising highly loaded metal matrix composite integrally attached to excess matrix metal were dried by preheating in a second resistance heated furnace to about 300° C. in about 12 hours and then to about 450° C. in about 2 hours.

When the 119 pounds (262 kg) of aluminum alloy continued within the available was molten, the flow of the nitrogen cover gas was stopped and any dross or oxide that may have formed during the melting of the aluminum alloy and present on the surface of the melt was removed from the melt surface using commercially available foundry tools comprising steel coated with a commercially available "ZIRCWASH®" mold wash (ZYP Coatings, Oak Ridge, Tenn.). Incrementally, billets comprising the highly loaded metal matrix composite integrally attached to excess matrix metal preheated to about 450° C. were added to the molten aluminum alloy. Throughout this procedure, an argon cover gas flowing at about 30 standard cubic feet per hour (849.8 liters per hour) was provided to the melt surface. Also, about 30 minutes after the addition to the crucible, the billets were at least partially dispersed into the melt using a plunging lance (for example, lance 206 depicted in FIG. 2A). The procedure was repeated until a total of about 486 pounds (1071 kg) of billet had been added to the contents of the crucible.

After the 486 pounds (1071 kg) of billets were substantially molten, four preheated graphite baffles 801, which had been covered by a commercially available mold wash, were secured to furnace cover 1002. A portion of baffle 801 was submerged into the melt which was at a temperature of about 625° C.

After baffles 801 were sufficiently secured to furnace cover 1002, blade 905 was attached to rotational mean 1003 through shaft 904. Rotation mean 1003 was lowered so that blade 905 was about 12.5 inches (317.5 mm) from the bottom of the containment crucible. Blade 905 was rotated about 650 rounds per minute (rpms) during this step. When it became apparent that the filler material from the highly loaded metal matrix composite was becoming dispersed throughout the melt, blade 905 was lowered from about 12.5 inches (317.5 mm) from the bottom of the containment crucible to about 7 inches (178 mm) from the bottom of the crucible. The rotation speed of shaft 904 and blade 905 was increased from about 650 rpm to about 1000 rpm. Blade 905 was used for about 75 minutes and then removed. Blade 701 was then attached to rotation means 1003. Unlike blade 905, the rotational speed of blade 701 was maintained at about 1600 rpm. Blade 701 was maintained at the 1600 rpm speed for about 60 minutes to produce a molten suspension of castable material.

The castable material, after heating to about 700° C., was then hand ladled (see, for example, FIG. 2D) into ingot molds to form pigs of lower loaded metal matrix composite comprising by volume about 30 percent filler (optionally designated "SiC(30)360").

A similar procedure was employed to produce additional lower loaded metal matrix composites. However, in addition to the about 6 inch (152 mm) diameter blade 701, about 4 inch (102 mm) diameter and about 5 inch (127 mm) blades having a design substantially the same as blade 701 were used. Table 2 below summarizes the parameters relating to the formation of lower loaded metal matrix composite bodies.

TABLE 2

| Volume Percent Filler | Alloy Change Weight lbs. (Kg.) | MMC Billet Charge Weight lbs. (Kg.) | Blade 705 Mixing Time(Speed) | Blade 905 Mixing Time(Speed) | 4" Blade Mixing Time (Speed) | 5" Blade Mixing Time (Speed) |
|---|---|---|---|---|---|---|
| 30 | 486(220.5) | 119(54.0) | 75 min(1000) | 60 min(1600) | — | — |
| 30 | 476(215.9) | 117(53.1) | 65 min(1000) | 60 min(1637) | — | — |
| 25 | 417(189.2) | 176(79.8) | 80 min(1000) | 30 min(1500) | 30 min (2050) | — |
| 20 | 321(145.6) | 242(109.8) | 70 min(1000) | 30 min(1300) | *30 min (2000) | — |

*blade diameter of about 4.75 inches (121 mm).

The pigs of lower loaded metal matrix composite were then used to cast brake rotors or discs. The casting procedure paralleled commercially acceptable casting procedures for aluminum alloy or aluminum metal matrix composites. For example, brake rotors or discs comprising an about 30 volume percent reinforced metal matrix composite (hereinafter either "SiCp/Al MMC" or "SiC(30)/360")were cast into a box mold 1101 as schematically in FIG. 11.

Box mold 1101 comprised cope 1103 and drag 1102 containing metal filter 1108 between gate portion 1107 and gate portion 1109. When vented brake rotor or discs were cast, vent core 1112 was used. In all instances, hub core 1113 was used.

The cope 1103, drag 1102 and hub core 1113 comprised 97.5–99 weight percent foundry grade pure silica sand combined with sodium silicate binder. A vent core 1112 comprises foundry grade silicon sand combined with "PEP-SET" sand binder (Ashland Chemical Co., Columbus, Ohio). The sand sodium silicate used in these items cured or set by exposing it to a carbon dioxide atmosphere.

Figure 11:
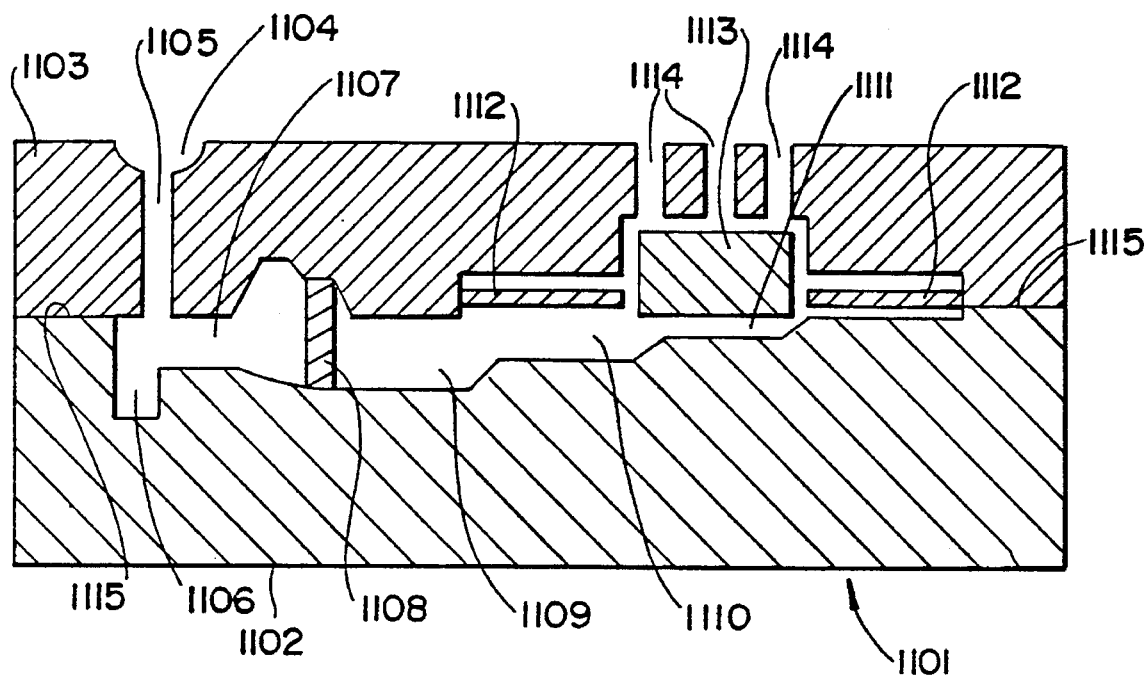
FIG. 11 is a cross-sectional schematic of a box mold used to cast metal matrix composite bodies according to the methods of Example 4.

The 30 volume percent metal matrix composite, SiC(30)/360, was prepared for casting by charging about 520 pounds (236 kg) of pig into an electrical resistance heated melting furnace (Thermtronix, Adelento, Calif.) having an about 530 pound (240 kg) capacity. The furnace and its contents were heated from about room temperature to about 751° C. (1385° F.) under a gaseous argon blanket or shroud. After the 30 volume percent metal matrix composite SiC(30)/360 had substantially completely melted, a mixing blade having a configuration substantially the same as the configuration of blade 701 depicted in FIG. 7 and four (4) baffles 801 were lowered into the molten metal matrix composite. The rotational speed of the blade was then brought to 1400 rpm. The molten metal matrix composite was then mixed for about 46 minutes while maintaining the melt under an argon gas blanket or shroud. The mixing blade and the baffles 801 were then removed and the re-melting furnace was tilted so that the first surface of the melt could be skimmed from the second so that molten metal matrix composite could be ladled into box molds substantially as depicted in FIG. 11. Specifically, molten metal matrix composite was poured into sprue cup 1104. The molten metal matrix composite was flowed into particle trap 1106, runner 1107, filter 1108 (either a 20 pre per inch reticulated ceramic from Foseco, Inc., Cleveland, Ohio, or a 15 pore per inch reticulated ceramic from Selec Corp., Hendersonville, N.C.) runners 1109, 1110 and 1111, past vent core 1112 and hub core 1113 and into rises 1114. The molten metal matrix composite body was at a temperature of about 751° C. (1385° F.) while the box mold 1101 was at about 25° C. After the metal matrix composite solidified, the mold box 1101 was disassembled and the riser, gates, runners and sprue were cut away using diamond saws. The resultant brake rotor or disc, after cleaning to remove any residual mold sand, was machined to substantially the finishes described in Example 2. Additional brake disc or rotors having volume percent loading from about 15 to about 25 volume percent were cast substantially as the 30 volume percent brake rotors or discs except that in some instances liquid argon was used to blanket or shroud the metal matrix metal rather than gaseous argon. Table 3 below summarizes some of the parameters used to form these lower loaded brake rotors or discs.

TABLE 3

| Filler Loading Volume Percent | Blanket or Shroud | Mixing Time | Charge Weight (lbs) | Casting Temperature |
|---|---|---|---|---|
| 30 | gaseous argon | 46 min. | 520 | 752° C. |
| 25 | gaseous argon | 45 min. | 415 | 757° C. |
| 20+ | gaseous argon | 40 min. | 164 | 757° C. |
| 15* | liquid argon | 30 min. | 140 | 757° C. |

*formed by charging 25 vol. % SiCp/Al MMC, 20 vol. % SiCp/Al MMC and additional matrix metal.
*formed by charging 20 vol. % SiCp/Al MMC and additional matrix metal.

The above discussion described the methods used to form brake rotors or discs using a casting technique. Some of the brake rotors or discs produced in accordance with the present Example were subjected to the modified J212 dynamometer test. The results of the tests are discussed in Example 6.

Furthermore, it should be understood that the methods of the present Example may also be employed to form metal matrix composite brake rotor or discs reinforced with, for example, $Al_2O_3$, $MgAl_2O_4$, $Si_3N_4$, etc, in a range of volume percent loadings.

EXAMPLE 5

The present Example demonstrates, among other things, a method for forming a metal matrix composite brake rotor or disc using a loose filler material mixture comprising an alumina particulate ($Al_2O_3p$) combined with a magnesium powder (Mgp). Specifically, the present Example demonstrates formation of a brake rotor or disc by spontaneously infiltrating an $Al_2O_3p$ filler material with a molten aluminum matrix metal and a nitrogenous atmosphere.

Figure 12:
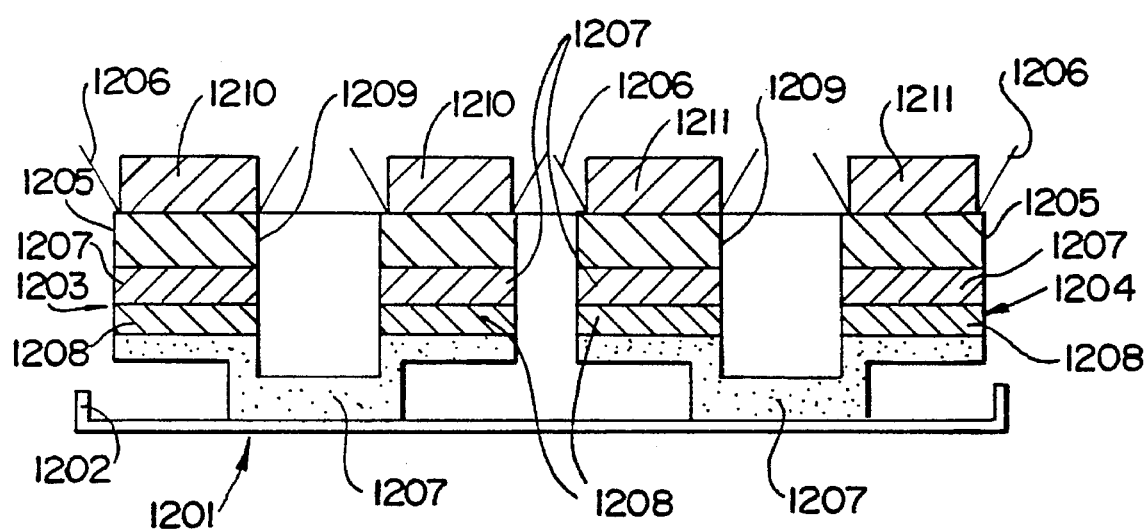
FIG. 12 is a cross-sectional schematic of the lay-up used to form metal matrix composite brake rotors according to the methods of Example 5.

FIG. 12 is a cross-sectional schematic of the lay-up used to form brake rotor or disc of the present Example. Lay-up 1201 comprised a catch tray 1202 containing two molds 1205 fabricated from stainless steel and lined with a commercially available graphite foil (not depicted in FIG. 12). Contained within mold 1205 was a filler material mixture 1207, a graphite core 1208 and a hub insert 1209. Hub insert 1209 was also fabricated from stainless steel and substantially completely lined with commercially available graphite foil (not depicted in FIG. 12). On molds 1205 was placed an alloy trough 1206 for containing matrix metal ingots 1210 and 1211 for setups 1203 and 1204, respectively.

Catch tray 1202 had inner dimensions measuring about 21.25 inches (539.8 mm) long, 12.5 inches (317.5 mm) wide and about 2 inches (51 mm) deep. The wall thickness of catch tray 1202 was about ⅜ inches (9.5 mm).

Mold 1205 was fabricated from stainless steel sheet having a thickness of about 1/16 inch (1.59 mm) thick. The hub diameter of mold 1205 measured about 6.25 inches (158.8 mm), while the rotor diameter of mold 1205 measured about 10 inches (254 mm). The height of the hub portion of mold 1205 was about 1.5 inches (38 mm), while the height of the rotor portion measured about 4.25 inches (108 mm). The hub insert 1209 was also manufactured from 1/16 inch (1.59 mm) thick stainless steel. Hub insert 1209 measured about 4⅞ inches high (123.8 mm) and had an outer diameter of about 4.25 inches (107.9 mm). Graphite core 1208 was machined from commercially available graphite to an outer diameter of about 9⅝ inches (244.5 mm) and an inner diameter of about 4⅝ inches (117.5 mm). Graphite core was about ⅜ inch (9.5 mm) thick. Slots measuring about 1 7/16 inches (36.5 mm) long by about 0.25 inch (6.4 mm) wide were machined to project radially at about 0.25 inch (6.3 mm) from the outer diameter extending in toward the inner diameter. Twenty-nine substantially identical slots were equally spaced along graphite core 1209.

Alloy troughs 1206 were made from commercially available copper foil and spanned the space between the rotor portion of mold 1205 and hub insert 1209. Trough 1206 provide a means for supporting pieces of matrix metal ingots 1210 and 1211.

A filler material mixture 1207 was made by combining by weight about 96 percent Type AS10 alumina (average particle diameter of about 44.3 microns, Showa Denko America Inc., New York, N.Y.) and about 4 percent −325 mesh magnesium powder (particle diameter less than about 45 microns) in a milling jar. The $Al_2O_3p$ was dried under a vacuum of about 30 inches (762 mm) Hg at about 150° C. for about 18 hours. Also placed in the milling jar were alumina milling media measuring about ⅜ inches (9.5 mm) in diameter and about ⅜ inches (9.5 mm) high. The weight of the milling media was twice the weight of the $Al_2O_3p$-Mgp mixture. The jar and its contents were then placed on a jar mill for about 2 hours. To separate the $Al_2O_3$-Mgp filler material mixture from the alumina milling media, the contents of the jar were passed through a 20 mesh sieve.

Simultaneously, two molds 1205 were lined with "PERMAFOIL®" graphite foil (TTAmerica Inc., Portland, Oreg.)

having a thickness of about 0.010 inch (0.25 mm). The outer diameter and bottom surface of hub insert 1209 was lined with the same type of graphite foil. A portion of the $Al_2O_3p$-Mgp filler material mixture was poured into the bottom of molds 1205 to about the height of the hub portion of steel mold 1205. After the filler material mixture 1207 was substantially leveled, hub insert 1209 was placed in contact with the level surface and co-axially with mold 1205. Additional filler material mixture was poured into steel mold 1205 to create an annulus of filler material mixture defined by mold 1205 and hub insert 1209. After that filler material had been substantially completely leveled, graphite core 1208 placed into the steel mold 1205 and on the leveled filler material 1207. Additional filler material mixture was then placed in mold 1205 to substantially completely cover graphite core 1208 and fill the slotted portions of graphite core 1208. Filler material mixture 1207 was placed in mold 1205 to yield equal thicknesses of filler material mixture 1207 on both sides of graphite core 1208. The total amount of filler material mixture per setup comprised about 3500 grams.

Pieces of commercially available copper foil measuring about 0.005 inch (0.127 mm) thick (ALL-FOILS, Inc.) was shaped into a trough 1206 to span the distance between mold 1205 and hub insert 1209. Ingots of matrix metal 1210 in setup 1203 and 1211 in setup 1204 were then placed in trough 1206. Matrix metal ingots 1210 comprises by weight about 3 percent magnesium, 1.7 percent silicon and the balance aluminum, while matrix metal ingots 1211 comprised by weight about 0.8 percent manganese, 0.12 percent chrome and 3 percent magnesium. Total weight of each of matrix metal ingots 1210 and 1211 was about 6000 grams. Setups 1203 and 1204 were then placed on catch tray 1202 to form lay-up 1201.

Lay-up 1201 was then placed into a controlled atmosphere furnace at a temperature of about 150° C. After the furnace door was closed, the furnace and its contents were evacuated to about 30 inches (762 mm) mercury for about 70 hours. The vacuum pump was then disengaged from the furnace and the furnace and its contents, while being heated to about 200° C. at about 100° C. per hour, were exposed to a nitrogen atmosphere flowing at a rate of about 10 liters per minute. Flowing nitrogen gas of about 10 liters per minute was maintained for the remainder of the time that lay-up 1201 spent in the controlled atmosphere furnace. After about 2 hours at about 200° C., the furnace and its contents were then heated from about 200° C. to about 500° C., maintained at about 500° C. for about 5 hours, heated from about 500° C. to about 800° C. at about 100° C. per hour and held at about 800° C. for about 10 hours. After about 10 hours at about 800° C., the power to the furnace was disconnected and the flowing nitrogen gas interrupted. The lay-up 1201 and its contents comprising set-up 1203 and 1204 were then removed from the furnace and hot-topping material as described in Example 3 was placed on molten matrix metal which had now infiltrated the filler material.

After the matrix metal had solidified, set-ups 1203 and 1204 were disassembled to reveal that the matrix metal had spontaneously or pressurelessly infiltrated filler material to form an alumina particulate reinforced aluminum metal matrix composite (hereinafter $Al_2O_3p$-Al MMC). Graphite core 1208 was then removed by sand blasting and the resulting brake rotor or disc was machined for testing according to the methods described in the present application. The results of some of this testing for an $Al_2O_3$/Al MMC, $Al_2O_3(60)$/6061, made in accordance with the methods of the present Example are presented in Example 6.

EXAMPLE 6

Automotive brake rotors or discs produced from metal matrix composites (MMCs) made by the methods of the previous Examples were subjected to dynamometer tests. The thermal response during fade stops, the failure temperature, and the wear performance of the brake rotors or discs were measured as functions of various material and design parameters, such as rotor thickness, composition of the brake rotors or discs, applied inertial load, and cooling air speed. The performance of the MMC brake rotors or discs was also compared with that of commercially available production cast iron brake rotors or discs. Data related to the maximum operating temperature (MOT) as a function of the silicon carbide volume percent loading in a composite brake rotor or disc was obtained. The results of testing demonstrate, among other things, that metal matrix composite materials are strong candidates for brake rotors or discs in future models of motor vehicles.

Use of lightweight materials such as aluminum-based metal matrix composites (MMCs) in brake systems is one of the ways of reducing unsprung weight of motor vehicles. The brake rotor or disc is one of the components widely selected for weight reduction because of significant weight savings brought about by replacing the current brake rotor or disc material, gray cast iron, with a metal matrix composite (MMC) based on an aluminum alloy (e.g., density of cast iron is about 7–8 $g/cm^3$ while the density of an aluminum MMC can be about 2.5 $g/cm^3$ and higher).

Despite the widespread interest in the subject, very few studies dealing with fabricating, machining and performance testing of MMC brake rotors or discs have been reported. Most of the published studies deal with cast silicon carbide reinforced aluminum brake rotors or discs containing less than about 20 volume percent of reinforcement. None of these studies deal with the effect of material parameters, such as alloy chemistry, reinforcement chemistry, reinforcement size and shape, and the volume fraction of reinforcement, on the performance of metal matrix brake rotors or discs. Also, the effects of design parameters, such as inertial load (related to the vehicle weight), brake rotor or disc thickness, and cooling air speed, on brake rotor or disc performance have not been extensively dealt in the open literature and are therefore not understood.

The present Example presents the results of a comprehensive study undertaken to understand the effects of some of the aforementioned parameters on brake rotor or disc performance in dynamometer tests. The dynamometer tests used in the present Example were adopted from SAE J212 (1) with some modifications and were discussed above. The test conditions during each fade segment were as summarized in Table 1 above.

The wear test used in the present Example involved 400 stops from an initial speed of 60 mph (91 km/h) using a deceleration of 12 fpsps (3.7 $m/s^2$). The initial brake rotor or disc temperature was maintained at about 500° F. (260° C.) and the cooling air speed was maintained at about 8 mph (12.8 km/h).

The tests were conducted using compact dynamometers with DC drives at Link Testing Laboratory, Inc. (Detroit, Mich.) and Greening Testing Laboratory, Inc. (Detroit, Mich.). The speed, acceleration (or deceleration), torque, cooling air speed, cooling air temperature, and brake rotor or disc and pad temperatures were continuously monitored and recorded.

Prior to a test, a brake rotor or disc and the mating pads were thoroughly characterized for:

1. weight,
2. dimensions, particularly the brake rotor or disc thickness,
3. surface roughness,
4. density,
5. and microstructure and reinforcement loading.

After the test, all of the above parameters were remeasured to assess the damage and wear to the brake rotor or disc and the pads.

The brake rotors or discs tested in the present Example were of 1991 Ford Escort design. Unless specifically noted, all the brake rotors or discs used in the present Example were the standard vented design. The inertial loads were varied to simulate the operating conditions of both a front and a rear brake rotor or disc.

A number of metal matrix composites were evaluated as a part of the present Example. The metal matrix composites have been designated in the present Example by the reinforcement chemistry, followed by volume percentage of the reinforcement in parentheses and the matrix alloy designation. The alloy designation system adopted by the Society of Automotive Engineers has been used wherever applicable. Following this scheme a 360 alloy reinforced with 30 volume percent of silicon carbide is designated by SiC(30)/360. Similarly, a Al-12% Si-5% Mg alloy reinforced with 40 volume percent silicon carbide will be denoted by SiC(40)/Al-12% Si-5% Mg.

The metal matrix composites tested during this study were produced using both the cast (approximately 10–40 volume percent reinforcement) and the infiltrated (20–70 volume percent reinforcement) compositions produced via the PRIMEX CAST™ casting (see, for example, Example 4) and the PRIMEX™ pressureless metal infiltration processes (see, for example, Examples 3 and 5), respectively. Commercial cast iron brake rotors or discs were tested to serve as the baseline reference and to calibrate the performance of the dynamometers.

The brake pads were supplied by Allied-Signal Corp. and were specially formulated for aluminum-based MMC brake rotors or discs. The brake pad material was designated C0792J. The pads used with the cast iron brake rotors or discs were also supplied by Allied-Signal and were designated XD-7901.

For MMC brake rotors or discs to be adopted in commercial vehicles, they must show performance similar to that of production cast iron brake rotors or discs. For this reason, the performance of the MMC brake rotors or discs was compared to that of the cast iron brake rotors or discs. The key findings of the present Example include:

1. The overall performance of the MMC brake rotor or disc was comparable to the cast iron production brake rotors or discs. This strongly suggests that the metal matrix composite brake rotors or discs may find use in future production vehicles. In fact, the brake rotors or discs successfully passed the SAE J212 test under the loads typically seen in a rear brake rotor or disc (Ford Escort).

2. With appropriately formulated brake pads, the MMC brake rotors or discs yield coefficients of friction between about 0.34 to about 0.40 during all but the fade/recovery segments of the present test. This value of coefficient of friction was noted to be in the same range as that measured for the cast iron brake rotors or discs. During a fade/recovery segment, the MMC brake rotors or discs showed slightly higher fade characteristics. The recovery of the coefficient of friction was rapid during the eight recovery stops of a fade/recovery segment for the MMC brake rotors or discs.

3. The MMC brake rotors or discs were found to quieter than the cast iron brake rotors or discs during all phases of the test. No squeals or groans were noted.

4. In general, the MMC brake rotors or discs showed lower rubbing surface temperatures as compared to the cast iron brake rotors or discs under identical test conditions.

5. The wear losses in the MMC brake rotors or discs were less than those in the cast iron brake rotors or discs.

6. The effectiveness in stopping a vehicle of the MMC brake rotors or discs was comparable to that of the cast iron brake rotors or discs.

7. In tests where the MMC brake rotors or discs were taken to failure, majority of the failures in the MMC brake rotors or discs took place by surface scuffing when the surface temperature (temperature measured 0.040" (1 mm) under the brake rotor or disc surface) exceeded a temperature defined as the 'maximum operating temperature' (MOT). A detailed discussion on the influence of various material parameters on maximum operating temperature will follow in the subsequent paragraphs.

The MOT is one of the key parameters characterizing the performance of a brake rotor or disc material under severe service conditions. The other key factor influencing the performance of a brake rotor or disc is the thermal response of a brake rotor or disc system (rotor/pad combination) as a function of various material and design parameters. That is, how fast does a brake rotor or disc system heat up and how quickly the heat is dissipated under the influence of various material and design parameters. Since this effect is most clearly demonstrated during fade sequence of the modified SAE J212 test, most of the discussion pertains to this phase of testing.

The thermal response of a MMC brake rotors or discs during fade strongly depends on the material chemistry which determines the heat capacity and thermal conductivity of a brake rotor or disc material. Tests were conducted to study differences in thermal response of various brake rotor or disc materials under the test conditions listed in Table 1 (Fade I and II).

Figure 13:
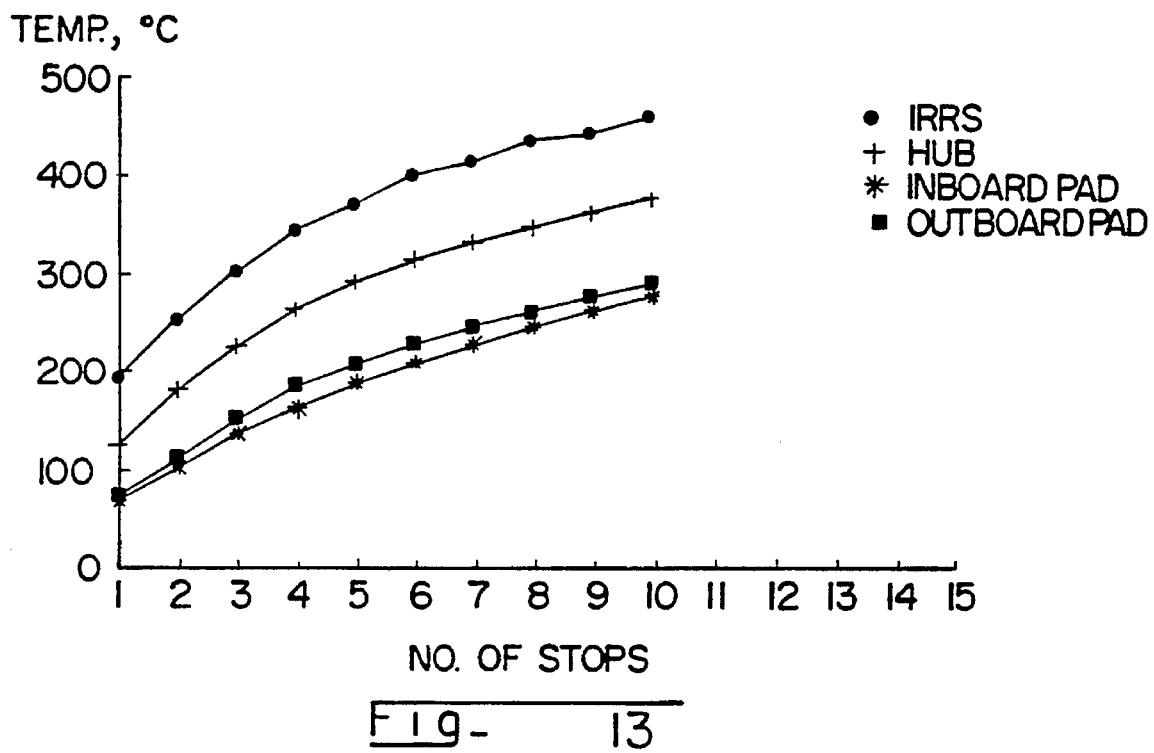
FIG. 13 is a graph of the temperature as a function of number of stops for a metal matrix composite brake rotor tested according to the methods of Example 6.

FIG. 13 shows the rise in inboard brake rotor or disc rubbing surface (IRRS) temperature during fade along with rises in hub, inboard pad and outboard pad for a 25 mm thick brake rotor or disc comprised of a SiC(30)/360. This represents a typical response of a brake rotor or disc produced from a material with high thermal conductivity (160 W/m°K.). The hub and the brake rotor or disc surface temperatures are relatively close to each other because high thermal conductivity enables the material to quickly conduct heat away from the rubbing surfaces.

Figure 14:
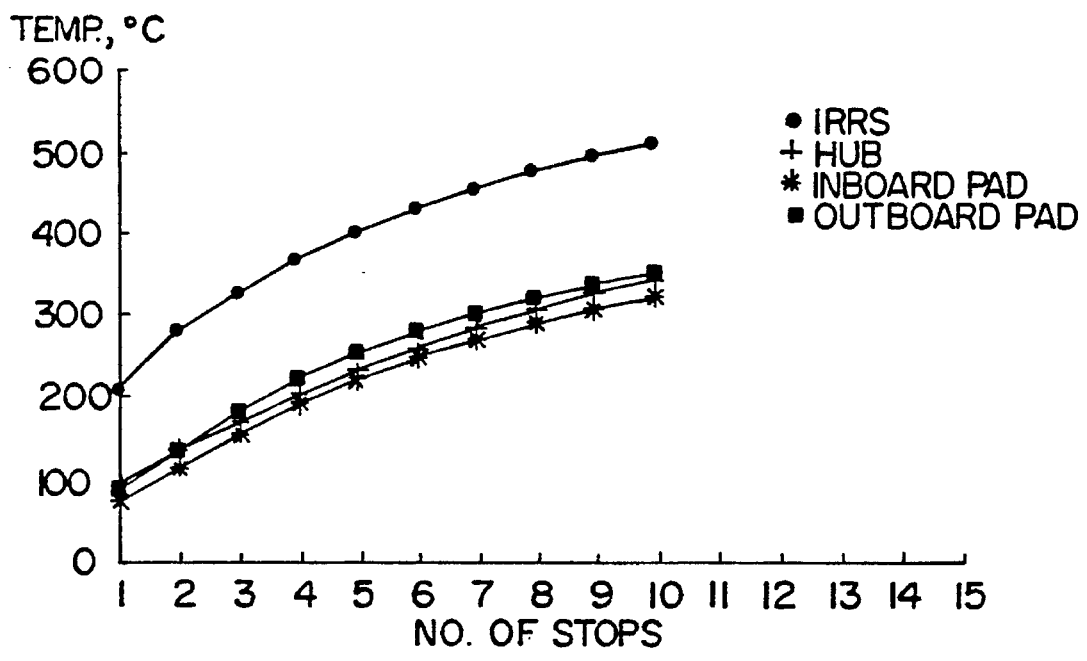
FIG. 14 is a graph of the temperaure of various parts of a cast iron brake rotor tested according to the methods of Example 6.
Figure 15:
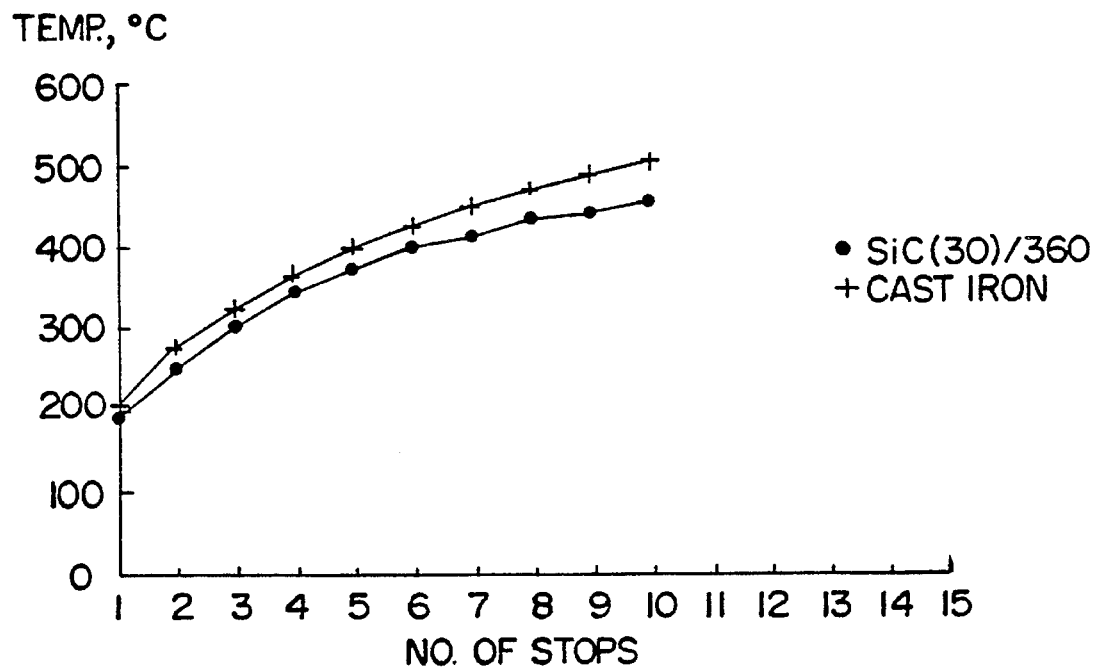
FIG. 15 is a graph of the temperature of same locations in a metal matrix composite rotor and cast iron composite rotor tested according to the methods of Example 6.

The thermal response of a similar cast iron brake rotor or disc under an identical set of test conditions is shown in FIG. 14. Note that due to a lower thermal conductivity (52 W/m°K.), the cast iron brake rotor or disc does not distribute the heat to the hub region, keeping it cooler than the corresponding region in a SiC(30)/360 rotor. As a result, the IRRS temperature of a cast iron brake rotor or disc is higher than that of a SiC(30)/360 rotor by about 50 C. in the later stages of the fade sequence. This is illustrated in FIG. 15.

Figure 16:
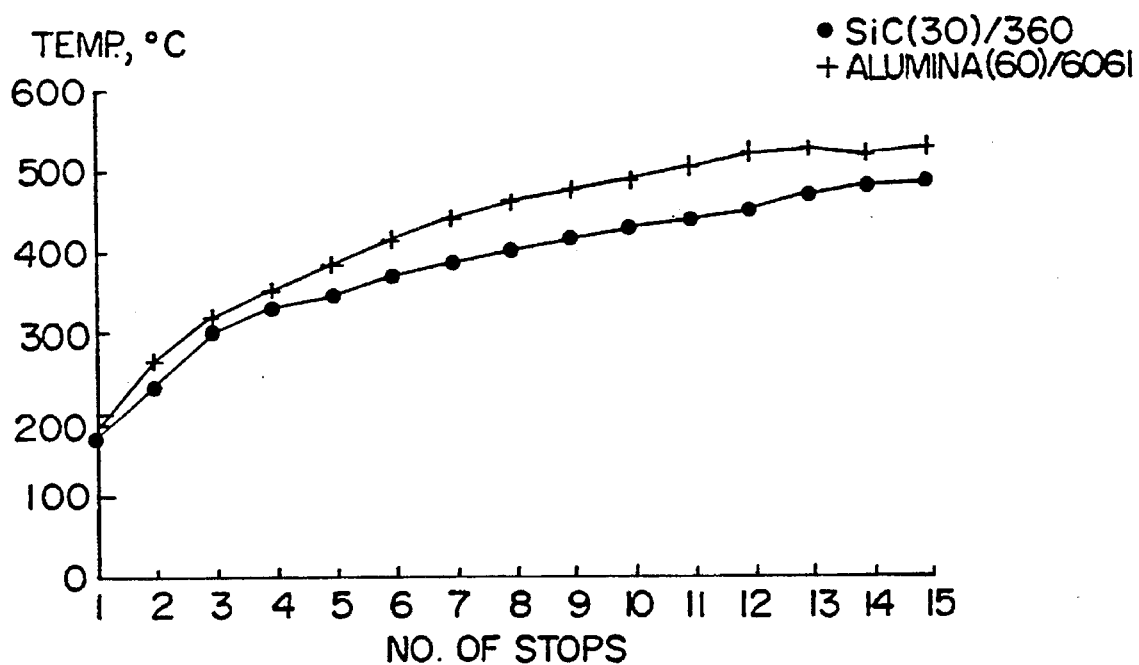
FIG. 16 is a comparison of the IRRS temperature in silicon carbide and alumina reinforced metal matrix composite rotors tested according to the methods of Example 6.

Tests similar to those described above were conducted to compare the thermal response of a 29 mm thick SiC(30)/360 rotor with that of an alumina(60)/6061 rotor of identical dimensions. Again, due to a lower thermal conductivity (55 W/m°K.), the alumina(60)/6061 rotor showed higher IRRS temperatures than the SiC(30)/360 rotor, as shown in FIG. 16.

Figure 17:
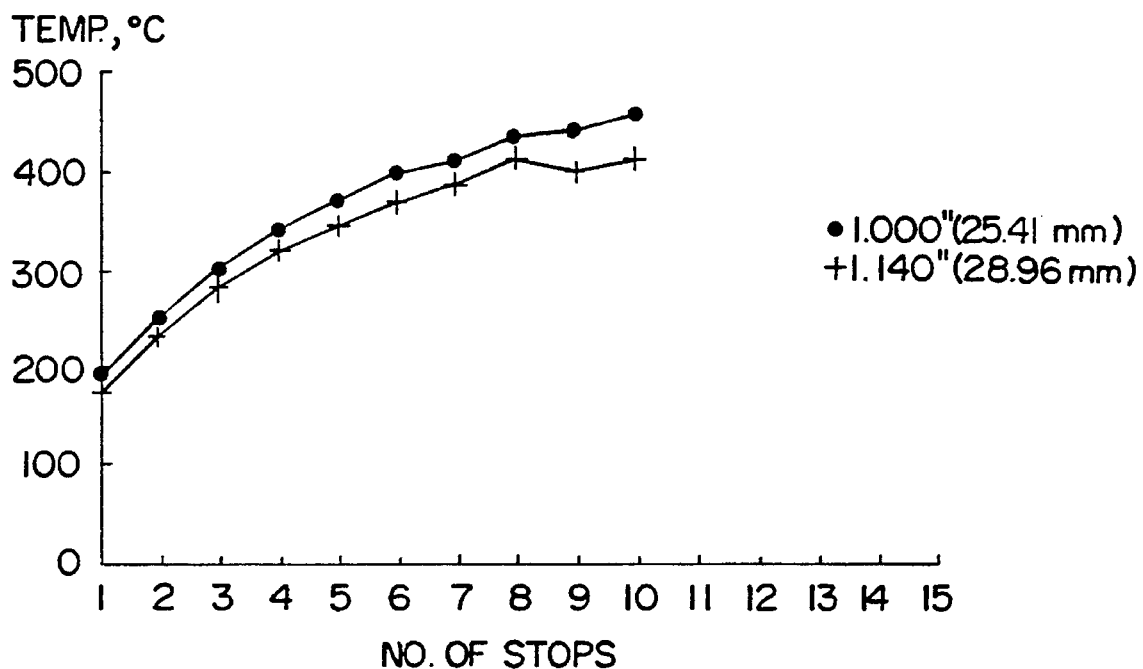
FIG. 17 is a comparison of the IRRS temperature of metal matrix composite rotors having varying thicknesses.

The brake rotor or disc thickness is one of the factors determining the thermal capacity of a brake rotor or disc. The brake rotors or discs with higher thermal capacity are expected to show lower temperature rise during the fade sequence and, thus, be safer to use in severe braking conditions. To study the effect of brake rotor or disc thickness on the thermal response of a brake rotor or disc, two brake rotors or discs, 25.41 and 28.96 mm in thickness, were tested under the conditions described above (Table 1 Fade I and II). The IRRS temperature rise during fade for the two brake rotors or discs is shown in FIG. 17. As expected, the rate of temperature rise and the IRRS temperature were slightly lower for the thicker brake rotor or disc because of its higher thermal capacity. Under the test condition used in this study, a 14% increase in the brake rotor or disc thickness resulted in a 40–50 C. reduction in the IRRS temperature.

The heat generated during a fade stop is dissipated in form of the following three components:

1. heat absorbed by the brake rotor or disc,
2. heat lost to the surroundings via convection,
3. and heat lost to the surroundings via radiation.

A solid brake rotor or disc is expected to have a higher mass and, thus, a higher thermal capacity than a vented brake rotor or disc of the same thickness. Therefore, when the heat absorption into the brake rotor or disc is the predominant mode of heat dissipation, solid brake rotors or discs are expected to show a lower temperature rise than vented brake rotors or discs. This may happen during early fade stops when the brake rotor or disc temperature is close to that of the surroundings and, therefore, convective and radiative components of the heat transfer are small. During the later fade stops, a vented brake rotor or disc is expected to cool faster because of its larger surface area.

Figure 18:
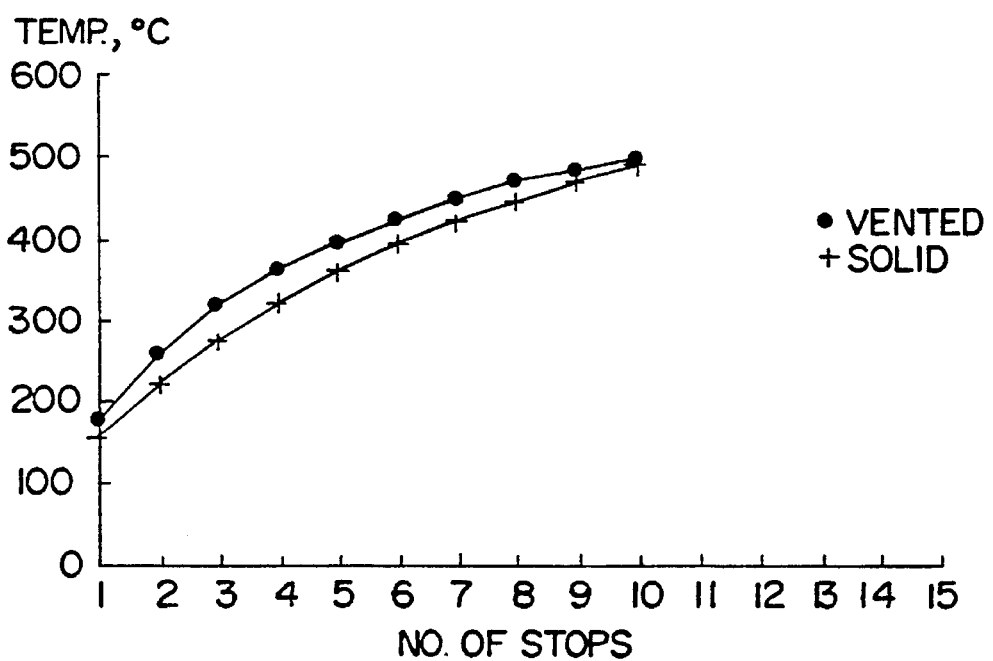
FIG. 18 is a comparison of the IRRS temperature of a vented and a solid silicon carbide reinforced aluminum brake rotors.

To quantify the thermal response of vented and solid brake rotors or discs, two 29 mm thick SiC(30)/360 brake rotors or discs were subjected to identical test conditions during fade sequence described above (Table 1, Fade I). The rise in IRRS temperatures of the two brake rotors or discs are shown in FIG. 18. The temperature of the solid brake rotor or disc was lower in the early stages of the fade sequence, but approached the IRRS temperature of the vented brake rotor or disc during the tenth stop. The trend clearly suggests that in the subsequent stops, the IRRS temperature of the solid brake rotor or disc would have exceeded the IRRS temperature of the vented brake rotor or disc. The rate of temperature rise in the vented brake rotor or disc, particularly towards the later parts of the fade sequence, continues to drop as the brake rotor or disc continues to cool at increasingly fast rates.

In summary, the advantage of a solid brake rotor or disc with higher thermal capacity is lost as the brake rotor or disc temperature rises towards the later part of the fade test sequence.

Figure 19:
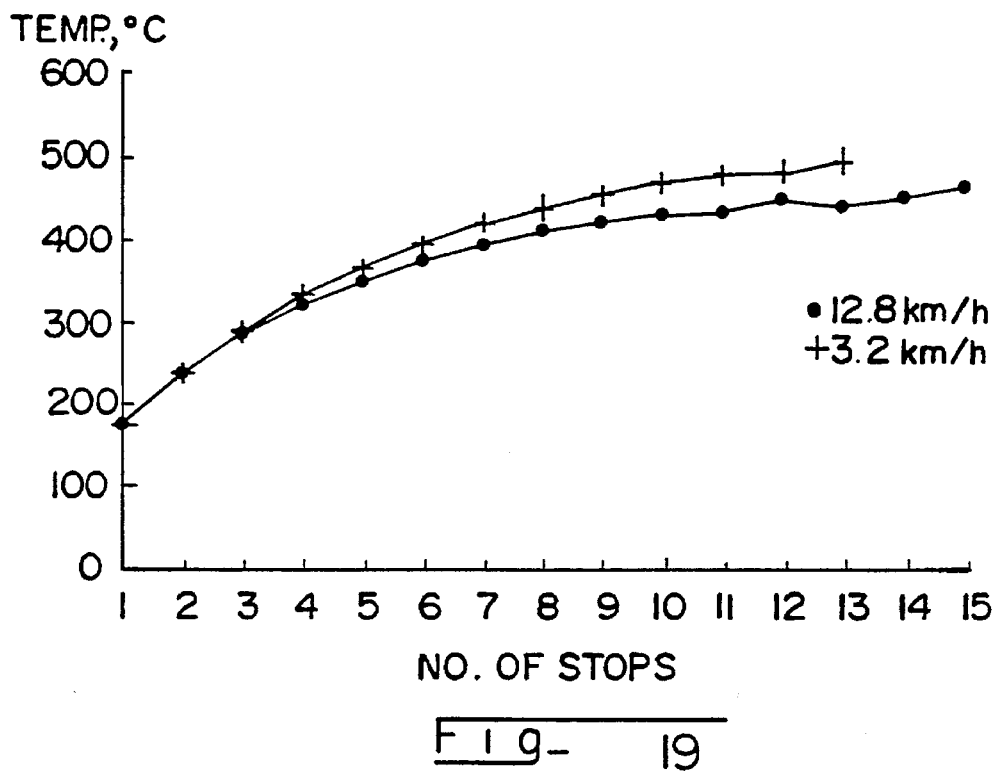
FIG. 19 demonstrates the effect of pulling air velocity of IRRS temperature for silicon carbide reinforced aluminum rotors tested according to the methods of Example 6.

As stated in the previous section, convective heat transfer from the brake rotor or disc surfaces starts to dominate heat dissipation when the brake rotor or disc temperature is high compared to the surroundings and/or the cooling air speed is high. To quantify the effect of the cooling air speed, two identical SiC(30)/360 rotors (29 mm thick) were subjected to identical conditions during fade, except that one of the brake rotors or discs was cooled using a cooling air speed of 2 mph (3.2 km/h) while the other one was subjected to a cooling air speed of 8 mph (12.8 km/h). FIG. 19 shows the IRRS temperatures of the two brake rotors or discs. Clearly in the later stage of the fade sequence when convective heat loss begins to dominate the heat dissipation mechanism, the brake rotor or disc subjected to 12.8 km/h cooling air shows 40–50 C. lower temperature as compared to the brake rotor or disc cooled with 3.2 km/h air. During the early stages of the fade sequence, when heat absorption into the brake rotor or disc is the primary heat dissipation mode, cooling air has virtually no influence on the temperature of the brake rotors or discs.

Figure 20:
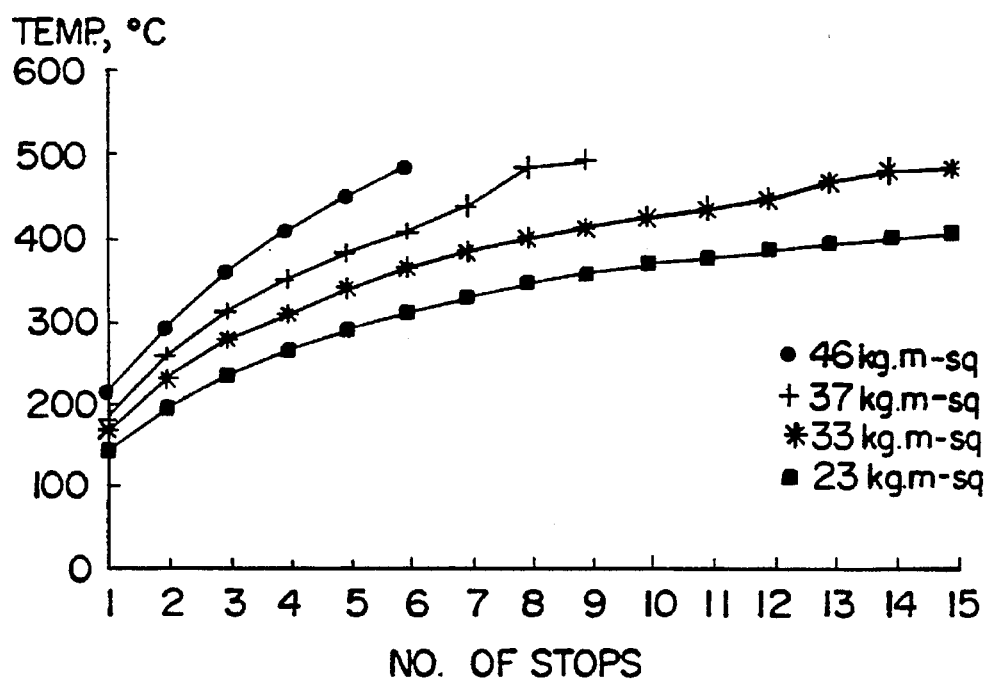
FIG. 20 is a comparison of the IRRS temperature for silicon carbide reinforced aluminum rotors tested using various inertial loadings.

The work done or the heat generated during a fade stop is directly proportional to the inertial load. Therefore, the brake rotor or disc temperatures are progressively increased as the inertial load is increased. During the present study, SiC(30)/360 rotors of 29 mm thickness were tested using four different inertial loads. These were 23, 33, 37, and 46 kg·m$^2$. The cooling air speed was maintained at 8 mph (12.8 km/h) during the fade stops. The inertial load of 46 kg·m$^2$ corresponds to the front brake rotor or disc load of a 1992 Ford Escort whereas 33 kg·m$^2$ corresponds to the projected front brake rotor or disc load of a future model. The rear brake rotor or disc load of the future model is expected to correspond to an inertial load of about 17 kg·m$^2$. As FIG. 20 shows, the inertial load has a great influence on increasing the final IRRS temperatures of the brake rotors. At the two highest inertial loads, the brake rotors or discs failed before the fade sequence was completed. The failure took place between 480 and 490 C. At the lower inertial loads, the brake rotors or discs completed the fade sequence without failure. This indicated that the SiC(30)/360 rotors are likely to operate satisfactorily in the future model of Escort both in front and rear, provided that the brake rotors or discs can be cooled using air at 8 mph (12.8 km/h) or higher.

Figure 21:
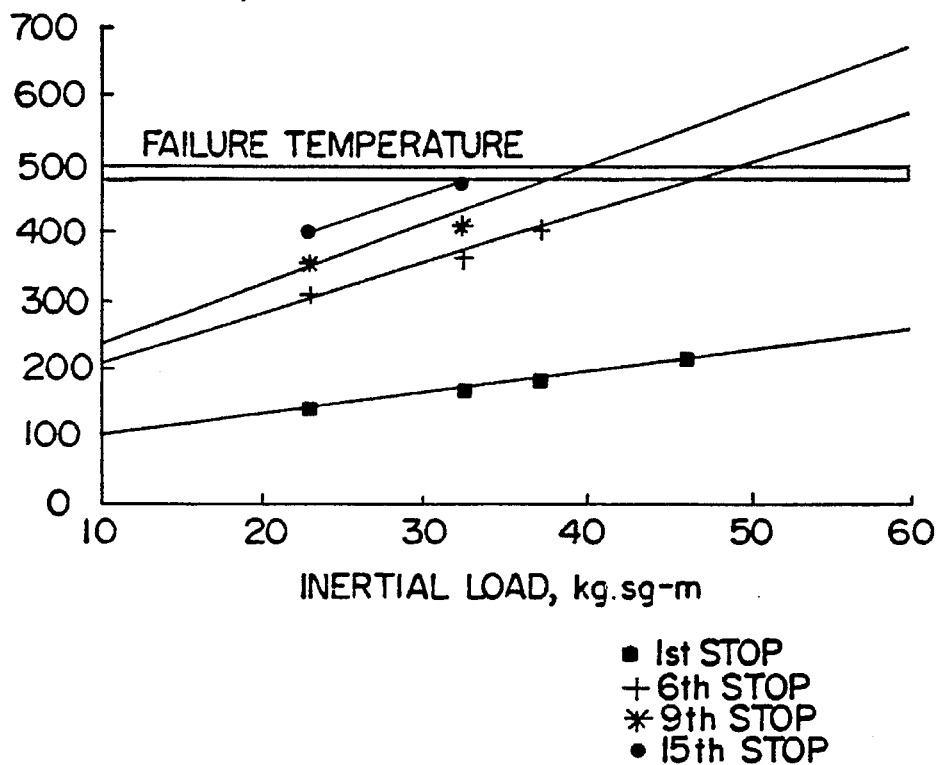
FIG. 21 is a correlation of the inertial load as a function of final IRRS temperature for various silicon carbide reinforced aluminum rotors.

The final IRRS temperature at each fade stop (time elapsed between each consecutive stop is 35 seconds) can be plotted as function of the inertial load, as shown in FIG. 21. The final IRRS temperature was found to be a linear function of the inertial load. Also shown in FIG. 21 is the failure temperature range of the SiC(30)/360 rotors. Clearly, the brake rotors or discs can go through all the 15 fade stops at the lower two inertial loads, as discussed above.

As stated earlier in this application, the predominant failure mode of the MMC brake rotors or discs is by surface scuffing. As a brake rotor or disc is subjected to progressively more severe conditions, the temperature of the brake rotor or disc continues to rise until it reaches a temperature at which the glaze on the brake rotor or disc surface breaks down and scuffing ensues. The temperature at which the breakdown occurs is referred to as the maximum operating temperature (MOT). The breakdown of a brake rotor or disc accompanies excessive noise, sparks and dust. The brake rotor or disc breakdown is followed by rapid wear of the pads and rise in temperatures, as measured by the pad thermocouples. The MOT is primarily dependent on the material composition, and not on the brake rotor or disc design or the test conditions.

The MOT was studied as a function of the volume fraction of reinforcement for the silicon carbide reinforced brake rotors or discs. The compositions studied are shown in Table 4.

TABLE 4

| Maximum Operating Temperatures for Various Compositions | | | |
|---|---|---|---|
| Volume % Silicon Carbide | Matrix Composition | Solidus Temp. of Matrix Alloy (°C.) | MOT (°C.) |
| 20 | 360 | 580 | 449 |
| 30 | 360 | 580 | 482 |
| 47 | Al-12% Si-5% Mg | 535 | 498 |

Figure 22:
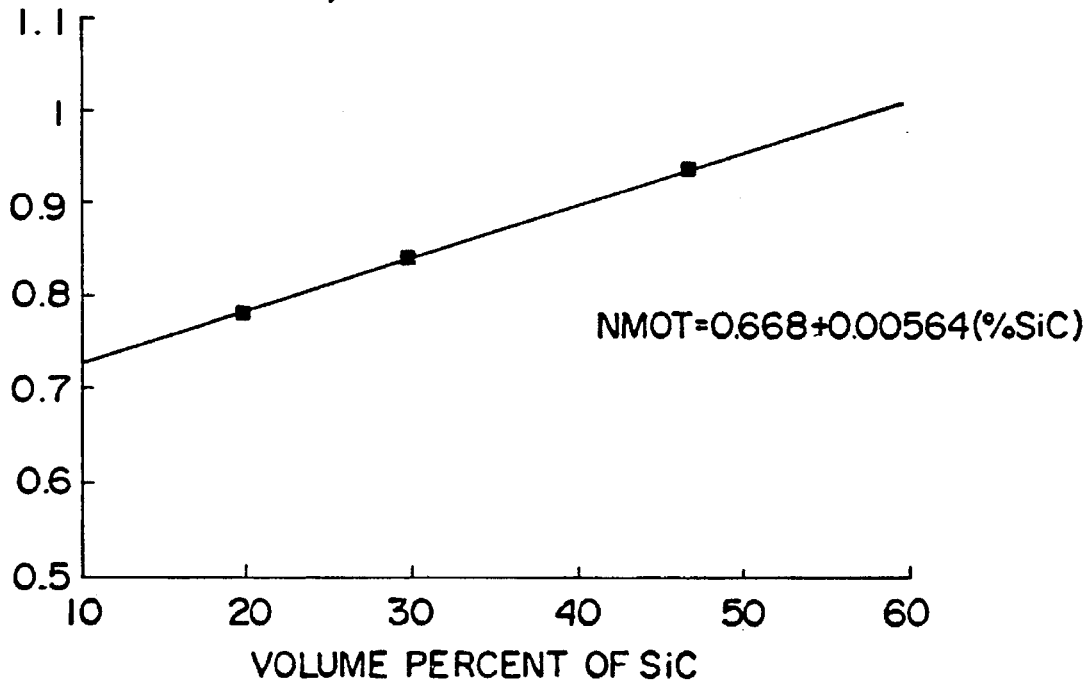
FIG. 22 is a correlation of the normalized maximum operating temperature as a function of volume percent silicon carbide and silicon carbide reinforced aluminum rotors.

The matrix alloys of the composites reinforced with 20 and 30 volume percent silicon carbide were the same, namely alloy 360, whereas the matrix of the composite reinforced with 47 volume percent of silicon carbide consisted of Al-12% Si-5% Mg alloy. The solidus temperatures (ST) of the matrix alloys are listed in Table 4. Since it was expected that the solidus temperature (ST) of the matrix alloy would influence the MOT of a composite brake rotor or disc, the MOT of various compositions were normalized with respect to the solidus temperature by dividing the measured values of MOT by the solidus temperatures of the respective matrix alloys. The normalized MOT (NMOT) is plotted as a function of volume fraction of reinforcement in the composite in FIG. 22. Interestingly, the NMOT is a linear function of the volume fraction of reinforcement in a composite. This relationship between NMOT and the volume fraction of reinforcement is valid for NMOT less than 1 because the MOT is not expected to exceed the solidus temperature of the matrix alloy. Linear regression analysis of the data yields:

NMOT=MOT/ST=0.668+0.00564 (% SiC)

or MOT=ST (0.668+0.00564 (% SiC)).

This data clearly shows that the MOT bears a strong relationship with the volume fraction of silicon carbide and the solidus temperature of the matrix alloy in silicon carbide reinforced brake rotors or discs. Based on this relationship, silicon carbide reinforced brake rotors or discs using 360 alloy as the matrix are predicted to have failure temperatures shown in Table 5. Similar relationships are expected to exist among the composites reinforced with fillers other than silicon carbide.

TABLE 5

Calculated MOT of SiC Reinforced Brake rotors or discs

| Volume % Silicon Carbide | Calculated MOT (°C.) |
| --- | --- |
| 10 | 420 (788° F.) |
| 20 | 453 (847° F.) |
| 30 | 486 (907° F.) |
| 40 | 518 (964° F.) |
| 50 | 551 (1023° F.) |

To study the effect of volume fraction of reinforcement on wear performance of a brake rotor or disc system, brake rotors or discs containing 15, 20, 25, 30, and 35 volume % silicon carbide in 360 alloy matrix were cast (see, for example, Example 4). These brake rotors or discs were then subjected to the wear test described in a previous section. The initial brake rotor or disc temperature was maintained at 260 C. (500 F.). The final brake rotor or disc temperature at the end of each stop was approximately 349 C. (660 F.) and was relatively independent of the volume fraction of reinforcement.

Figure 23:
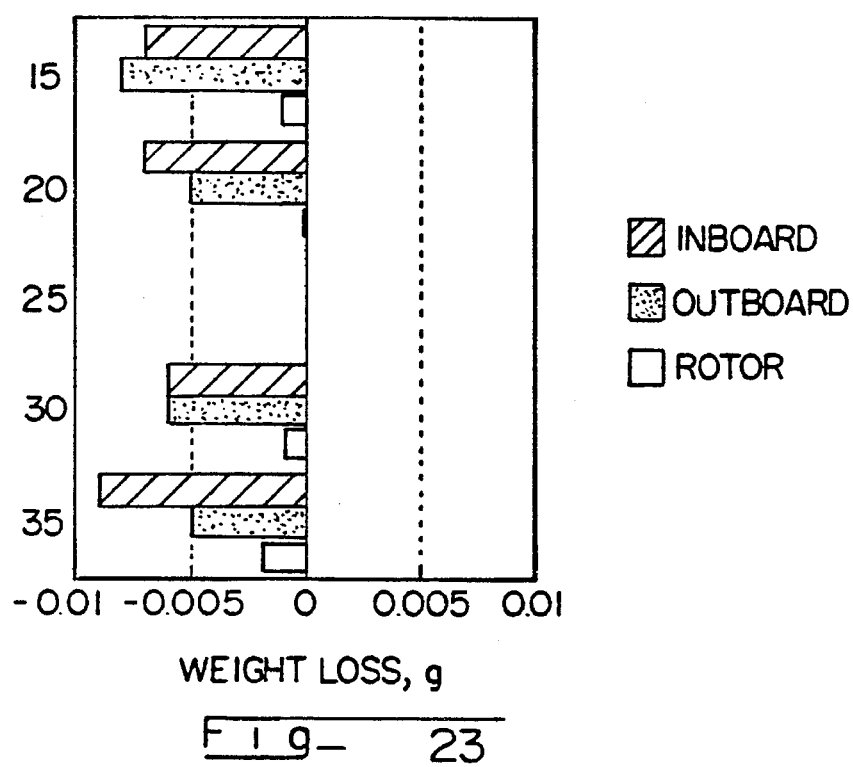
FIG. 23 is a comparison of the weight loss experienced by variously loaded silicon carbide reinforced aluminum metal matrix composite bodies tested in accordance to the methods of Example 6.
Figure 24:
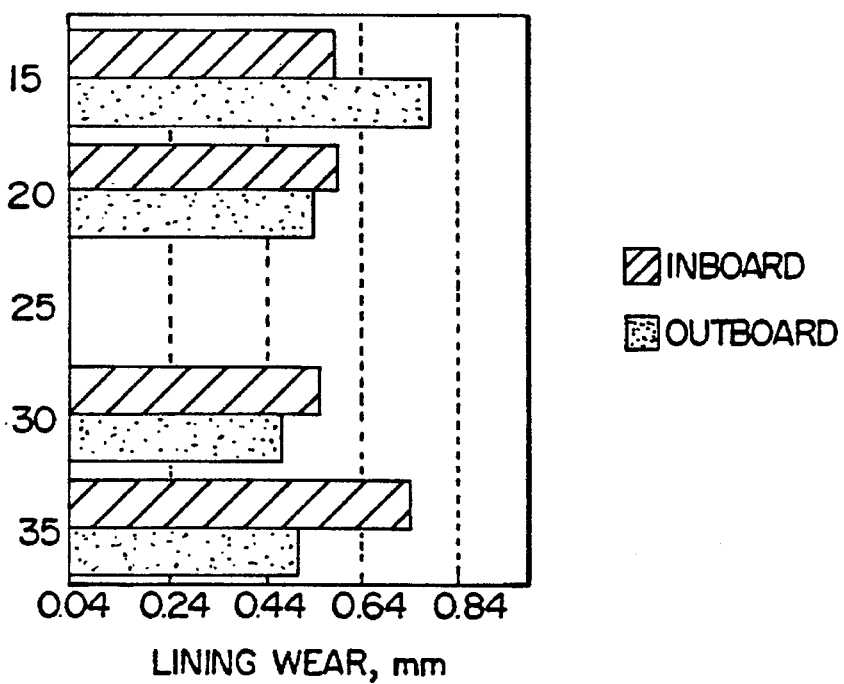
FIG. 24 is a plot of brake lining wear for metal matrix composite rotors reinforced with varying amounts of silicon carbides and tested according to the methods of Example 6.

The weight losses from the brake rotors or discs and the corresponding linings are shown in FIG. 23. FIG. 24 shows the reduction in lining thickness as a function of volume fraction of silicon carbide. From these results it appears that the overall wear of the rotor/lining system is very small and relatively independent of the silicon carbide level under the test conditions used in this study. At higher initial temperatures wear levels are likely to increase but are expected to remain low.

A comprehensive investigation was undertaken to study the effect of various material and design parameters on the thermal response, failure temperatures, and the wear performance of metal matrix composite brake rotors. The results related to the effects of various material and design parameters on the thermal response of MMC brake rotors or discs indicated that:

1. the brake rotors or discs with lower thermal conductivities show higher temperatures at the two rubbing surfaces; however, the hub temperatures are lower, 2. a solid brake rotor or disc shows higher surface temperatures when convective heat transfer is the primary heat dissipation mode as compared to a vented brake rotor or disc of the same thickness.

3. the brake rotor or disc temperatures increase as the thickness of the brake rotor or disc and the cooling air speed are decreased, 4. the brake rotor or disc rubbing surface temperatures increase as the inertial loads increase, There is a strong correlation between the solidus temperature (ST) and the volume fraction of silicon carbide and the maximum operating temperature (MOT) of silicon carbide reinforced brake rotors or discs. This relationship is given by:

MOT=ST (0.668+0.00564 (% SiC)).

Figure 25:
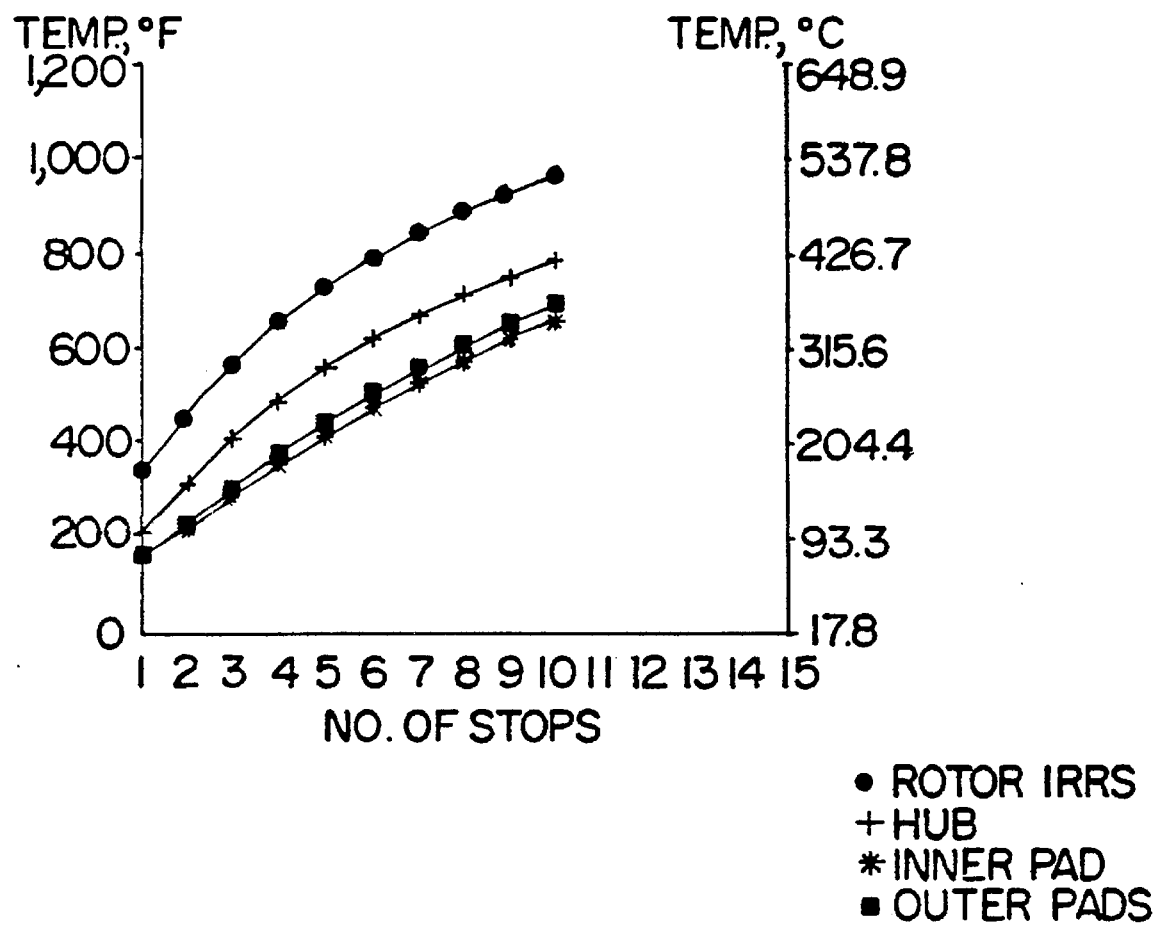
FIG. 25 presents the temperature in various locations of an alumina reinforced high melting point aluminum alloy brake rotor or disc made according to the method of Example 2 and tested according to the methods of Example 6.

A similar relationship is expected to exists in MMC systems involving other reinforcements (see, for example, FIG. 25 which presents the results for the MOT testing of a brake rotor or disc formed in accordance with the methods of Example 2).

Wear of the MMC brake rotor or disc systems (brake rotors or discs and pads) was found to be very small under the test conditions used in this Example. The wear resistance of the brake rotor or disc systems was relatively insensitive to the silicon carbide levels in the composites.

The MOT of highly loaded SiCp/Al MMC has been determined to be superior to lower loaded MMCs.

While the preceding discussion includes very particular disclosures, various modifications to the disclosure should occur to an artisan of ordinary skill, and all such modifications should be considered to be within the scope of the claims appended hereto.

What is claimed is:

1. A brake rotor consisting essentially of a metal matrix composite material having a maximum operating temperature of at least about 482° C. (900° F.), wherein said metal matrix composite material comprises a preform infiltrated with a matrix metal comprising aluminum, said preform comprising at least one filler material bonded with a cured preceramic polymer, wherein said at least one filler material makes up at least about 20% by volume of said metal matrix composite material.

2. The brake rotor according to claim 1, wherein said metal matrix composite material comprises at least one filler comprising at least about 26% by volume of said composite.

3. The brake rotor according to claim 2, wherein said at least one filler comprises at least about 28% by volume of said at least one composite.

4. The brake rotor of claim 1, wherein said at least one filler material comprises 45% by volume of said at least one metal matrix composite material.

5. The brake rotor according to claim 1, wherein said at least one filler material comprises a size of about 1 to about 5000 microns.

6. The brake rotor according to claim 5, wherein said at least one filler material comprises a size from about 5 to about 500 microns.

7. The brake rotor according to claim 1, wherein said at least one filler material comprises alumina, and further wherein said at least one alumina filler material makes up at least about 26 percent by volume of said metal matrix composite material.

8. The brake rotor according to claim 1, wherein said brake rotor comprises a vented structure.

9. A metal matrix composite brake rotor comprising a metal matrix composite substrate material comprising a matrix metal embedding at least one filler material, wherein said at least one filler material comprises at least about 45% by volume of said metal matrix composite substrate material, wherein said metal matrix composite substrate material possesses a maximum operating temperature of at least about 482° C. (900° F.).

10. The metal matrix composite brake rotor of claim 9, wherein said matrix metal comprises at least one metal selected from the group consisting of aluminum, magnesium and titanium.

11. The metal matrix composite brake rotor of claim 9, wherein said at least one filler material comprises a material selected from the group consisting of aluminum oxide and silicon carbide.

12. The metal matrix composite brake rotor according to claim 9, wherein said metal matrix composite substrate material is integrally bonded or attached to at least one other material selected from the group consisting of at least one ceramic material, at least one ceramic matrix composite material, and at least one metal.

13. The metal matrix composite brake rotor of claim 9, for use in front brake applications.

14. The metal matrix composite brake rotor of claim 9, for use in rear brake applications.

15. A substantially homogeneous brake rotor comprising an unvented, metal matrix composite rotor which comprises at least about 30 percent by volume of at least one substantially non-reactive filler material dispersed substantially uniformly throughout a matrix metal comprising aluminum, wherein said metal matrix composite rotor possesses a maximum operating temperature of at least about 482° C. (900° F.).

16. The brake rotor of claim 15, wherein said metal matrix composite rotor further comprises a thermal conductivity of at least about 55 watts per meter per degree Kelvin.

17. The brake rotor of claim 15, wherein said metal matrix composite rotor possesses a maximum operating temperature of at least about 524° C. (975° F.).

18. The brake rotor of claim 15, wherein said at least one filler material comprises bodies bonded to one another with a preceramic polymer.

19. The brake rotor of claim 15, wherein said at least one filler material comprises particulate.

20. The brake rotor of claim 19, wherein said particulate is substantially equiaxial.

* * * * *